US008661409B2

(12) United States Patent
Austin

(10) Patent No.: US 8,661,409 B2
(45) Date of Patent: Feb. 25, 2014

(54) EDITING A GRAPHICAL DATA FLOW PROGRAM IN A BROWSER

(75) Inventor: Paul F. Austin, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1169 days.

(21) Appl. No.: 12/572,455

(22) Filed: Oct. 2, 2009

(65) Prior Publication Data

US 2010/0293526 A1 Nov. 18, 2010

Related U.S. Application Data

(60) Provisional application No. 61/179,282, filed on May 18, 2009, provisional application No. 61/230,947, filed on Aug. 3, 2009.

(51) Int. Cl.
*G06F 9/44* (2006.01)

(52) U.S. Cl.
USPC ........... 717/113; 717/105; 717/125; 717/131; 717/140; 709/203; 709/217; 715/760

(58) Field of Classification Search
None
See application file for complete search history.

(56) References Cited

U.S. PATENT DOCUMENTS

| | | | | |
|---|---|---|---|---|
| 5,913,195 A * | 6/1999 | Weeren et al. | ................ | 704/270 |
| 5,926,176 A * | 7/1999 | McMillan et al. | ........... | 715/764 |
| 5,946,485 A * | 8/1999 | Weeren et al. | ................ | 717/109 |
| 6,016,474 A * | 1/2000 | Kim et al. | ..................... | 717/125 |
| 6,151,609 A * | 11/2000 | Truong | ......................... | 715/205 |
| 6,275,956 B1 * | 8/2001 | On et al. | ........................ | 717/125 |
| 6,412,106 B1 * | 6/2002 | Leask et al. | ................... | 717/124 |
| 6,473,894 B1 | 10/2002 | Shrader et al. | ............... | 717/126 |
| 6,802,053 B1 * | 10/2004 | Dye et al. | ...................... | 717/113 |
| 7,134,109 B2 * | 11/2006 | Hayles | .......................... | 716/102 |
| 7,480,906 B2 * | 1/2009 | Joffrain et al. | ............... | 717/171 |

(Continued)

FOREIGN PATENT DOCUMENTS

| | | | | |
|---|---|---|---|---|
| WO | 9909473 | 2/1999 | ............... | G06F 9/44 |
| WO | 0068788 | 11/2000 | ............... | G06F 9/44 |
| WO | 0114963 | 3/2001 | ............... | G06F 9/44 |
| WO | WO 0114963 A1 * | 3/2001 | | |

OTHER PUBLICATIONS

Wikipedia's article 'Uniform Resource Identifier'from Apr. 23, 2009.*

(Continued)

*Primary Examiner* — Steven Snyder
(74) *Attorney, Agent, or Firm* — Meyertons Hood Kivlin Kowert & Goetzel, P.C.; Jeffrey C. Hood; Mark S. Williams

(57) ABSTRACT

System and method for performing program-related operations over a network via a web browser. A network connection is established between a server computer and a client computer over a network. A universal resource identifier (URI) is sent from the client computer to the server computer over the network, where the URI indicates a program, e.g., a graphical program (GP), or at least a portion of a graphical program interactive development environment (GPIDE), e.g., a graphical program editor, an execution engine, a static or dynamic analyzer, and/or compiler. The at least a portion of the GPIDE is received from the server computer over the network in response to the URI, and executed in a web browser of the client computer to perform some specified functionality with respect to the GP.

55 Claims, 36 Drawing Sheets

(56) References Cited

U.S. PATENT DOCUMENTS

| | | | | |
|---|---|---|---|---|
| 7,596,620 | B1* | 9/2009 | Colton et al. | 709/226 |
| 7,954,097 | B2* | 5/2011 | Joffrain et al. | 717/171 |
| 8,074,203 | B2* | 12/2011 | Dye et al. | 717/113 |
| 8,239,824 | B2* | 8/2012 | Cifra et al. | 717/109 |
| 2002/0004804 | A1* | 1/2002 | Muenzel | 707/513 |
| 2002/0184301 | A1* | 12/2002 | Parent | 709/203 |
| 2003/0061349 | A1* | 3/2003 | Lo et al. | 709/225 |
| 2004/0034696 | A1* | 2/2004 | Joffrain et al. | 709/217 |
| 2004/0158804 | A1* | 8/2004 | Hayles | 716/6 |
| 2004/0158812 | A1* | 8/2004 | Dye et al. | 717/105 |
| 2004/0235384 | A1* | 11/2004 | Reich et al. | 445/24 |
| 2005/0138601 | A1* | 6/2005 | Simonoff et al. | 717/105 |
| 2007/0044072 | A1* | 2/2007 | Hayles | 717/113 |
| 2007/0055740 | A1* | 3/2007 | Luciani et al. | 709/217 |
| 2007/0079282 | A1 | 4/2007 | Nachnani et al. | 717/106 |
| 2008/0034121 | A1* | 2/2008 | Dove et al. | 709/249 |
| 2009/0024981 | A1* | 1/2009 | Dye et al. | 717/105 |

OTHER PUBLICATIONS

Wikipedia's article on 'Sandbox (computer security)' from Dec. 30, 2008.*

Wikipedia's article on 'Sandbox (software development)' from Feb. 9, 2009.*

Wikipedia's article on 'Web Browser' from Apr. 22, 2009.*

'Server Side Verses Client Side' by Jonathan Commons from 2005.*

William Ryan; "Web-Based Java Integrated Development Environment"; University of Edinburgh Division of Informatics; Feb. 28, 2007; 83 pages.

Boris Bokowski; "Eclipse in the Cloud"; Feb. 17, 2009; 5 pages. Retrieved from Internet: <http:// borisoneclipse.blogspot.com/2009/02/eclipse-in-cloud.html>.

"Introducing Bespin"; Mozilla Labs; Feb. 12, 2009; 14 pages. Retrieved from Internet: <https://mozillalabs.com/blog/2009/02/introducing-bespin/>.

International Search Report and Written Opinion for Application No. PCT/US2010/035299 mailed on Aug. 18, 2010; 15 pages.

Milan Brejl and Andrzej Lara; "Simulink Web Explorer"; XP007914336; Motorola Czech Systems Laboratories; 2001; 4 pages.

Stein; "Web Applets: Java, JavaScript and ActiveX"; GenetWork; Trends in Genetics, Elsevier Science Publishers, vol. 12, No. 11; Nov. 1996; 2 pages.

Jose Sanchez, Sebastian Dormido, Rafael Pastor, and Fernando Morilla; "A Java/Matlab-Based Environment for Remote Control System Laboratories: Illustrated with an Inverted Pendulum"; IEEE Transactions on Education, vol. 47, No. 3, Aug. 2004; 10 pages.

* cited by examiner

EDITING A GRAPHICAL DATA FLOW PROGRAM IN A BROWSER

PRIORITY DATA

This application claims benefit of priority to U.S. Provisional Application Ser. No. 61/179,282, titled "Graphical Data Flow Program Operations in a Browser", filed May 18, 2009, whose inventors were Paul F. Austin, Ramprasad Kudukoli, and Diya Mukherji, and further claims benefit of priority to U.S. Provisional Application Ser. No. 61/230,947, titled "Graphical Data Flow Program Operations in a Web Browser", filed Aug. 3, 2009, whose inventors were Paul F. Austin, Ramprasad Kudukoli, Christopher G. Cifra, Brock J. Reeve, Malcolm I. Smith, Mohammed Kamran Shah, John D. Stanhope, and Duncan G. Hudson III, both of which are hereby incorporated by reference in their entirety as though fully and completely set forth herein.

FIELD OF THE INVENTION

The present invention relates to the field of programming, and more particularly to a system and method for performing graphical or data flow program related operations in a web browser.

DESCRIPTION OF THE RELATED ART

Data flow programming is a programming approach or protocol with many industrial (and other) applications. In data flow (or dataflow) programming, the program architecture is that of a directed graph specifying the flow of data through the program. In data flow programs functions execute whenever the necessary input data are available. Data flow programs can be contrasted with procedural programs, which specify an execution flow of computations to be performed.

Graphical programming has become a powerful tool available to programmers. Graphical programming environments such as National Instruments Corporation's LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Graphical data flow programs or diagrams, such as Lab-VIEW, combine the above two paradigms. A graphical program or diagram includes a plurality of interconnected nodes (or blocks), where at least a subset of the connections among the nodes visually indicate that data produced by one node is used by another node. A LabVIEW virtual instrument (VI) is one example of a graphical data flow program; a Simulink block diagram is another example of a graphical data flow program.

The development of the Internet and the World Wide Web (WWW) has extended communication capabilities in virtually all areas of society and the economy, generating significant opportunities for innovation in many fields, including industrial design, measurement, automation, and control, among others.

SUMMARY OF THE INVENTION

Various embodiments of a system and method for performing program operations, e.g., graphical data flow program operations, over a network via a web browser are presented below. Note that in various embodiments, any of the features and techniques disclosed herein may be used with respect to any of the methods described herein.

In one embodiment, a network connection may be established between a client computer and a server computer over a network. For example, a user may open a web browser on the client computer and direct the browser to the server computer.

A universal resource identifier (URI) may be sent from the client computer to the server computer over the network, where the URI indicates a graphical data flow program (GDFP) or a graphical data flow program editor (GDFP editor) for creating or editing the GDFP. Note that in some embodiments, these steps may be performed together. For example, the user of the client computer may click on a link or may otherwise indicate the URI, which may automatically invoke the connection with the server computer.

The GDFP editor may be sent from the server computer to the client computer, i.e., may be received by the client computer from the server computer over the network in response to the URI. In one embodiment, the GDFP is a pre-existing GDFP, where the GDFP editor is associated with the pre-existing GDFP, and where the URI specifies the pre-existing GDFP, thereby also indicating the associated GDFP editor. In this embodiment, the GDFP may also be received from the server computer in response to the URI. Alternatively, in embodiments where the GDFP is not a pre-existing GDFP, the URI may specify the GDFP editor, and the GDFP editor may be executable in the web browser to receive user input specifying creation of the GDFP, and create the GDFP in response to the user input.

The GDFP editor may be executed in a web browser. In some embodiments, the GDFP editor may be configured to execute in a sandbox, where the sandbox is or includes a secure execution environment for the GDFP editor. Thus, executing the GDFP editor in the web browser may include executing the GDFP editor in the sandbox. Note that the sandbox may be implemented in any of a variety of ways. For example, in one embodiment, the sandbox may be implemented by a plugin, and so executing the GDFP editor in the sandbox may include executing the GDFP editor in the plugin.

The GDFP may be displayed in the web browser, where the GDFP includes a plurality of interconnected nodes or icons which visually indicate the functionality of the program. User input may be received to the GDFP editor executing in the web browser, where the user input indicates one or more edit operations to be performed on the GDFP, and the GDFP may be edited in the web browser via the GDFP editor in accordance with the one or more edit operations, thereby generating an edited GDFP. For example, the user may "drag and drop" various graphical function nodes onto a block diagram and "wire" the nodes together. The edited GDFP may be displayed in the web browser, e.g., an edited block diagram of the GDFP may be displayed. Displaying the edited block diagram in the web browser may include displaying edited block diagram in a GUI presented in the web browser, e.g., an editor window.

In another embodiment, instead of a GDFP editor, the universal resource identifier (URI) may indicate a GDFP execution engine for executing the GDFP. In other words, the GDFP may require the GDFP execution engine to execute.

Thus, the GDFP execution engine (which may include a GDFP editor) may be received by the client computer from the server computer over the network in response to the URI.

The GDFP may be executed in a web browser via the GDFP execution engine. In other words, the GDFP execution engine may execute the GDFP within the web browser. In one embodiment, the method may include receiving user input to the web browser invoking execution of the GDFP, and the GDFP may be executed in the browser in response to the received user input.

In one embodiment, e.g., where the GDFP is not pre-existing, and the user creates the program, the method may include sending the (created) GDFP to the server computer for compilation, and receiving an executable for the GDFP from the server computer (e.g., generated via compilation on the server computer). Thus, after compilation, the server may send the resulting executable back for execution, e.g., at the request of the user via the web browser, or automatically. Alternatively, the GDFP execution engine may further include a compiler, e.g., as part of a GDFP development environment downloaded with the GDFP execution engine, and the GDFP (in the form of graphical source code) may be compiled to create the executable. Thus, executing the GDFP in the web browser may include the GDFP execution engine executing the executable of the GDFP in the web browser. Alternatively, the GDFP execution engine may be or include an interpreter, and so executing the GDFP may include interpreting the (graphical source code of) the GDFP. This feature may also be applied to any of the other methods disclosed herein, as desired.

An indication of executing the GDFP may be displayed in the web browser. For example, output from the program may be displayed in the web browser, e.g., in a GUI, e.g., front panel, of the GDFP. More generally, a graphical user interface (GUI) of the GDFP may be displayed in the web browser on a display, where the GUI may be configured to display results of the GDFP execution, or receive user input specifying input to the GDFP.

Some client systems may not have the capability to execute the GDFP, e.g., may not include software that supports or includes the above-mentioned sandbox or plugin, e.g., may not be capable of executing the GDFP execution engine; but there still may be a need or desire to view such graphical programs. For example, client users may wish to view the above edited GDFP, even though they cannot execute it. Thus, in one embodiment, the GDFP may have an associated representation implemented in a browser supported format, e.g., one or more of: HTML an image format, or PDF, among other browser supported/accessible formats, where the representation of the GDFP does not include the GDFP. In other words, the server may store not only the GDFP, but also may store a downloadable representation of the GDFP that may be viewable in a web browser. Thus, the representation of the GDFP may be downloadable to client systems for display in browsers on the client systems, including browsers that do not support execution of the GDFP. Moreover, the representation of the GDFP may be indexable for searching by search engines, and so may be findable via web search technologies. In various embodiments, the representation of the GDFP may include one or more of comments in the GDFP, an indication of components referenced by the GDFP with links to the referenced components, or notes regarding the GDFP, among other items, e.g., metadata related to the program.

Accordingly, in some embodiments where the GDFP is edited and transmitted back to the server, the method may further include receiving the edited GDFP from the client system, and generating and storing such an associated representation of the edited GDFP, i.e., where the representation of the edited GDFP does not include the edited GDFP, and where the representation of the GDFP is downloadable to client systems for display in browsers on the client systems, including browsers that do not support execution of the edited GDFP.

In another embodiment, the URI may indicate a graphical program (GP) or a graphical program analyzer or debugger for analyzing GPs, which in some embodiments may be or include an editor (GP editor) for creating, editing, and analyzing the GP. The GP analyzer may be received by the client computer from the server computer over the network in response to the URI. The GP may be a pre-existing GP, where the GP analyzer is associated with the pre-existing GP, and where the URI specifies the pre-existing GP, thereby also indicating the associated GP analyzer. In this embodiment, the GP may also be received from the server computer in response to the URI. Alternatively, in embodiments where the GP is not a pre-existing GP, the URI may specify the GP analyzer, which, as indicated above, may be or include a GP editor, and the GP analyzer may be executable in the web browser to receive user input specifying creation of the GP, and create and edit the GP in response to the user input.

The GP analyzer may be executed in a web browser, e.g., in a sandbox, i.e., a secure execution environment, possibly implemented as a plugin. Executing the GP analyzer in the web browser may thus occur in the sandbox, thus preventing interference from or interfering with other programs executing on the (client) computer. Note that in some embodiments, the analyzer may be executed within the web browser as part of editor functionality, e.g., as part of the editing or development process.

The GP may be displayed in the web browser, e.g., via the GP analyzer, where the GP comprises a plurality of interconnected nodes or icons which visually indicate the functionality of the program. For example, a GUI, e.g., a window, may be displayed in the web browser, and the GP may be displayed in the GUI. In some embodiments, the graphical program may be or include a graphical data flow program (GDFP), i.e., may have an architecture and behavior in accordance with a data flow model of computation. Accordingly, in such embodiments, the analyzer may be or include a graphical data flow program analyzer (and/or editor).

The GP may be analyzed in the web browser via the GP analyzer, and results of analyzing the GP may be displayed in the web browser. For example, the GP analyzer may analyze the GP graphical source code, including, for example, performing type propagation in the GP, or constant folding in the GP, among other aspects of the GP graphical source code. Similar to the display of the GP itself, the analysis results may be displayed in a GUI, e.g., a window, in the web browser. In various embodiments, the results of analyzing the GP may be stored locally, and/or may be sent to the server or another device over the network for storage, analysis, or use by other users.

Note that the analysis referred to is static analysis, e.g., performed at edit and/or compile time. In other words, the analysis may be performed on or with respect to the source code of the GP, not with respect to its behavior during execution, referred to as dynamic analysis, which is discussed below.

In a further embodiment, the URI may indicate a GP execution engine for executing and analyzing the (executing) GP, i.e., dynamically. In other words, the GP may require the GP execution engine to execute, and may be dynamically analyzed via the GP execution engine. Thus, the GP execution engine may be or include a GP dynamic analyzer. As with the above method, the GP may include a plurality of interconnected nodes that visually indicate functionality of the program, and in some embodiments, may be or include a graphical data flow program, i.e., may have an architecture and behavior in accordance with a data flow model of computation, although any other types of graphical programs may be used as desired.

The GP execution engine may be received from the server computer over the network in response to the URI. If the GP is a pre-existing GP, the URI may specify the pre-existing GP, thereby also indicating the associated GP execution engine, where, for example, the GP may also be received from the server computer in response to the URI, or alternatively, if the GP is not a pre-existing GP, the URI may specify the GP execution engine, and the GP execution engine may be executable in the web browser to receive user input specifying creation of the GP, and create (and edit) the GP in response to the user input, i.e., the execution engine may include or be associated with a GP editor (and in some embodiments, a GP compiler or interpreter).

The GP may be executed and dynamically analyzed in a web browser via the GP execution engine, i.e., the GP execution engine may analyze the GP during execution. In other words, the GP execution engine may execute the GP within the web browser, and analyze the GP during execution, e.g., dynamically. Analyzing the GP during execution may include analyzing one or more of: performance of the executing GP, usability of the executing GP, or execution speed of the GP, among other aspects of the GP execution. In one embodiment, the method may include receiving user input to the web browser invoking execution of the GP, and the GP may be executed and dynamically analyzed in the browser in response to the received user input.

Results of analyzing the GP may be displayed in the web browser. For example, output from dynamically analyzing the program may be displayed in a GUI displayed in the web browser. The analysis results may be stored locally, and/or may be transmitted back to the server (or another device) for storage and/or provision to the other client computers.

In one embodiment, the created GP may be sent to the server computer over the network for compilation, i.e., the server computer may receive the created GP from the client computer over the network, and may compile the GP to generate an executable of the GP, which may be sent to the client computer over the network. In another embodiment, the GP execution engine may include a compiler that is executable in the web browser to compile the created GP in the web browser (on the client computer), thereby generating an executable of the created GP, where the GP execution engine being executable in the web browser to execute the GP includes the GP execution engine being executable in the web browser to execute the executable of the created GP. Alternatively, in some embodiments, the GPDE or GP execution engine is or includes an interpreter, and executing the GP (and/or the edited GP) in the web browser includes the GP execution engine interpreting the GP (and/or the edited GP).

In a more general embodiment, the URI may indicate a program or an integrated development environment (IDE). The IDE may be received from the server computer over the network in response to the URI. The IDE may be executable in a web browser to create, edit, compile, execute, and debug (and possibly optimize) programs in the web browser, via any of the techniques described herein, as applied more generally to programs that may textual, graphical, data flow, and/or graphical data flow programs, as desired. Thus, in some embodiments, the program may be or include a graphical program (GP), and the IDE may be or include a graphical program development environment (GPDE). In other embodiments, the graphical program may be or include a graphical data flow program (GDFP), and the IDE may be a graphical data flow program development environment (GDFPDE). The IDE may include an editor, edit-time analyzer, compiler, interpreter, execution engine, and/or dynamic analyzer/debugger, and thus, may be referred to as an editor, a static analyzer, a compiler, interpreter, an execution engine, and/or a dynamic analyzer or debugger, depending on the functionality being considered. In some embodiments, the IDE may be further executable to automatically parallelize one or more portions of the graphical program in response to analyzing the program, and/or otherwise optimize the program.

Various of the techniques disclosed herein may also be utilized with respect to embedded devices.

For example, in one embodiment, a network connection may be established between a client computer and an embedded device over a network via a universal resource identifier (URI) associated with the embedded device, e.g., a user may open a web browser and direct the browser to the embedded device. The embedded device may store a graphical program (GP) and a graphical program execution engine (GPEE), where the GP requires the GPEE to execute.

In one embodiment, the URI specifies the GP, thereby also indicating the associated GPEE, while in another embodiment, the URI specifies the GPEE, and the associated GP is automatically indicated as a result. In yet another embodiment, the URI may simply specify the embedded device, and the GPEE and associated GP are automatically indicated via their association with the embedded device.

The embedded device may include a web server, e.g., may be configured to store and serve web pages and/or other web content over a network. The embedded device may include limited display capabilities, or may not even include a display, i.e., may be "headless", in that the device may not include a monitor or other display capabilities.

As noted above, the GP may include a plurality of interconnected nodes that visually indicate functionality of the program, and in some embodiments, the graphical program may be or include a graphical data flow program (GDFP), and the GP execution engine may be or include a graphical data flow program execution engine (GDFPEE), or a graphical data flow development environment (GDFE). More generally, in some embodiments, the GP execution engine may be or be included in an interactive development environment (IDE), which may be executable in the web browser to create, edit, analyze/debug, compile or interpret, optimize, and/or execute the GP. The GP execution engine and the GP may be received from the embedded device over the network in response to the URI.

The GP may be executed in a web browser via the GP execution engine to control the embedded device in response to user input to the GP executing in the web browser, or to monitor activity or performance of the embedded device, including analyzing and displaying output from the embedded device in the web browser, e.g., in a GUI displayed in the web browser. As with the above methods, the GP execution engine may be configured to execute in a sandbox. User input may be received to the GP executing in the web browser to control the embedded device, and in response, the GP may be executable to send commands to the embedded device over the network in response to the user input. In correspondence with the client computer sending commands to the embedded device over the network in response to the user input to control the embedded device, the method may include (the embedded device) receiving the commands, and configuring the embedded device to operate in accordance with the commands.

In a further embodiment directed to embedded devices, the embedded device may store a graphical program (GP) and a graphical program editor/execution engine (GPEEE). The embedded device may be or include a web server, e.g., may be configured to store and serve web pages and/or other web content over a network, and may store a graphical program (GP), e.g., an embedded device application, that the embedded device executes to perform one or more functions, as well as a graphical program editor/execution engine (GPEEE). In other words, the GP may require the GPEEE to execute, and may also be edited in the GPEEE. In various embodiments, the embedded device may be configured to execute the GP to perform a measurement task, a control task, a simulation task, or an automation task, among others.

The GPEEE and the GP may be received from the embedded device over the network in response to the URI, and the GPEEE may be executed within the web browser to display the GP in the web browser, receive user input indicating one or more edit operations to be performed on the GP, edit the GP in the web browser in accordance with the one or more edit operations, thereby generating an edited GP, display the edited GP source code in the web browser, and compile or interpret, execute, and/or debug (and possibly optimize) the edited GP.

Moreover, in some embodiments, the method may also include deploying the edited GP to the embedded device, where the updated GP may be executable (which may include interpretation by an interpreter) by the embedded device to perform updated one or more functions. Thus, the application on the embedded device may be updated by the client computer via a web browser.

In one embodiment, a network connection may be established between a client computer and a device, e.g., a server computer, where the device (e.g., server computer) stores a plurality of graphical data flow programs (GDFPs), as well as a graphical data flow program execution engine (GDFP execution engine) required by the GDFPs to execute. The server computer may also store version histories of the GDFPs and corresponding versions of the GDFPs. Note that the plurality of GPs may include one or more of a measurement program, a control program, a simulation program, or an automation program, among others. However, it should be noted that in other embodiments, any type of graphical data flow programs may be stored as desired.

A universal resource identifier (URI) may be received by the server computer from the client computer over the network, where the URI may indicate a GDFP of the plurality of GDFPs, and the GDFP and the GDFP execution engine may be sent to the client computer over the network in response to the URI, where the GDFP execution engine may be executable in a web browser on the client system to execute the GDFP in the web browser, and display an indication of executing the GDFP in the web browser. Similar to the above methods, in some embodiments, the GDFP execution engine may be configured to execute in a sandbox.

In some embodiments, the GDFP execution engine may include an editor that executes in the web browser on the client computer to receive user input editing the GDFP, thereby generating an edited GDFP, and display the edited GDFP in the web browser. Additionally, the method may include the server computer receiving the edited GDFP from the client computer and storing the edited GDFP, where the edited GDFP is available for download by other users. The method may further include updating the version history of the GDFP. Thus, in some embodiments, a (subsequent) user may access the server computer and download a specific version of a GP on the server, e.g., based on the version history.

Moreover, the editor may be executable in the web browser to receive user input specifying creation of a new GDFP, create the new GDFP in response to the user input, and display the new GDFP in the web browser, in which case, the method may also include receiving the new GDFP from the client computer and storing the new GDFP, e.g., for download by other users. The method may also include creating and storing a version history of the new GDFP. Thus, new programs may be added to the repository.

In some embodiments, the GDFP execution engine may include a compiler that is executable in the web browser to compile the edited GDFP, thereby generating an executable of the edited GP. The GP execution engine may then be executable in the web browser to execute the executable of the edited GP in the web browser.

Alternatively, in some embodiments, the GPDE or GP execution engine is or includes an interpreter, and executing the GP (and/or the edited GP) in the web browser includes the GP execution engine interpreting the GP (and/or the edited GP).

More generally, in some embodiments, the GDFP engine may be comprised in an interactive development environment (IDE) executable in the web browser to edit, analyze, compile, or interpret, the GDFP in the web browser.

In a further embodiment, a network connection may be established between a device, e.g., a server computer, and each of a plurality of client computers over a network. The server computer may store a plurality of graphical data flow programs, as well as a graphical data flow program execution engine (GDFP execution engine) required by the GDFPs to execute. In various embodiments, the plurality of GPs may include one or more of a measurement program, a control program, a simulation program, or an automation program, although any other type of graphical program may be included as desired.

A universal resource identifier (URI) may be received from each of the client computers over the network, where the URI indicates a GDFP of the plurality of GDFPs, and the GDFP and the GDFP execution engine may be sent to each client computer over the network in response to the URI. As described above, the GDFP execution engine may be configured to execute in a sandbox, e.g., a secure execution environment, possibly implemented by a plugin. The GDFP execution engine (which may be or include an interpreter) may be executable in a web browser on each client computer to execute the GDFP in the web browser, thereby generating execution results, and to send the execution results for the GDFP over the network to the server computer.

The execution results for the GDFP may be received by the server computer from each client computer over the network, and the received execution results may be analyzed, thereby generating analysis results. In other words, the server computer may execute analysis software to analyze the execution results for the GDFP from the plurality of client computers. The analysis results may be stored, e.g., in a memory medium of the server computer, or some other computer, e.g., a data repository.

In some embodiments, the analysis results may be sent to each client computer over the network for display in the client computers' browsers. Accordingly, in some embodiments, the GDFP execution engine may execute in the web browser of each client computer to receive the analysis results over the network, and display the analysis results in the web browser.

The GDFP execution engine may be executable in the web browser to display a graphical user interface (GUI) in the web browser on a display, e.g., to display results of the GDFP execution, or receive user input specifying input to the GDFP. In one embodiment, the GDFP may be embedded in a web page, where the URI references the web page, thereby indicating the GDFP, and where sending the GDFP execution engine to the client computer over the network in response to the URI includes sending the web page to the client computer over the network, including the GDFP and the GDFP execution engine. Accordingly, executing the GDFP in a web browser may include the GDFP execution engine executing the GDFP in the web page, in which case, GDFP execution engine may also display results of executing the GDFP in the web page on the display.

The above embodiments are described with respect to a single GDFP; however, the method is generally applicable to multiple client computers executing different GDFPs, as well. Thus, the multiple URIs may specify different GDFPs, the same GDFPs, or any combination of the two. In other words, various of the client computers may specify different GDFPs via respective URIs.

In another embodiment, a network connection may be established with a client computer over a network, e.g., between the client computer and a device, e.g., a server computer, where the server computer stores a plurality of graphical data flow programs (GDFPs), where each GDFP comprises a respective plurality of interconnected nodes or icons which visually indicate the functionality of the program, as well as a graphical data flow program execution engine (GDFP execution engine) required by the GDFPs to execute. The server computer may also store specification of intellectual property rights and licensing for each of the GDFPs. The plurality of GPs may include one or more of a measurement program, a control program, a simulation program, or an automation program, although any other type of graphical program may be included as desired.

A universal resource identifier (URI) may be received by the server computer from the client computer over the network, where the URI indicates a graphical data flow program (GDFP) or a GDFP execution engine for executing the GDFP.

The specification of intellectual property rights and licensing for the GDFP may be analyzed. For example, the specification of intellectual property rights and licensing for the GDFP may be analyzed with respect to constraints regarding terms of use of the GDFP, e.g., who may download the program, whether the program may be edited, whether or how the program may be used for commercial purposes, and so forth.

A determination may be made based on the analysis as to whether the specification of intellectual property rights and licensing for the GDFP permits sending the GDFP to the client computer. If the specification of intellectual property rights and licensing for the GDFP permits, the GDFP may be sent to the client computer over the network in response to the URI (and in accordance with the specification of intellectual property rights and licensing for the GDFP), where the GDFP execution engine may be executable in a web browser on the client system to execute the GDFP in the web browser, and display an indication of executing the GDFP in the web browser. For example, the GDFP execution engine may be executable in the web browser to display a GUI in the web browser on a display, where the GUI is configured to display results of the GDFP execution, or receive user input specifying input to the GDFP.

If, on the other hand, the specification of intellectual property rights and licensing for the GDFP does not permit (the sending of the GDFP and the GDFP execution engine), an indication to that effect may be sent to the client computer over the network. In other words, the method may indicate to the client computer that the specification of intellectual property rights and licensing for the GDFP does not permit sending the GDFP and the GDFP execution engine to the client computer, e.g., by sending a message for display on the client computer.

In one embodiment, graphical data flow programs and related tools may be provided for charge. For example, the server computer may store a plurality of graphical data flow programs, e.g., web applications, and possibly software tools, and so forth, where each GDFP is accessible and useable via web browsers executing on client computers. The server computer may also store a GDFP execution engine, where the GDFPs require the GDFP execution engine to execute. Note that in other embodiments only one GDFP may be stored on the server computer.

The GDFPs may be of any type or functionality desired. For example, in various embodiments, the GDFPs may include or be task or domain specific programs or applications for industrial, scientific, or even entertainment purposes, e.g., data analysis and processing, measurement, testing, control, or automation, among others. For example, the GDFP may be or include a measurement application, where the measurement application is executable in the web browser on the client computer to perform a specified measurement function. In another embodiment, the GDFP may be a model of a hardware device, e.g., useable to observe or test the functionality of the device without the device itself, where, for example, the model may "stand in" for the device during operation of a system, e.g., a measurement system, e.g., to determine the appropriateness (or not) of the device for the system. In some embodiments, the model may be of a hardware system, e.g., that includes multiple devices.

Thus, a universal resource identifier (URI) may be received from the client computer over the network, where the URI indicates a GDFP of the plurality of GDFPs, and the GDFP and the GDFP execution engine may be sent to the client computer over the network in response to the URI. The GDFP execution engine may be executable in a web browser to execute the GDFP to perform the specified functionality of the GDFP.

A charge for use of the GDFP on the client computer may be assessed. Note that charging for use of the GDFP may be accomplished in any way desired, e.g., charging a client account, charging/billing for a subscription service, charging/billing per use, e.g., "a la carte", and so forth.

Other embodiments may be directed to web-based program development for particular types of programs.

For example, in one embodiment, a universal resource identifier (URI) may be sent by a client computer to a server computer over the network, where the URI indicates a graphical program (GP) or at least a portion of an integrated development environment (IDE), which may be referred to simply as the IDE for convenience. The at least a portion of the IDE may be executable to develop, e.g., to create, edit, analyze, execute, or debug, graphical programs that include two or more computational models. Similarly, the graphical program (which may or may not already exist) may include two or more computational models, e.g., graphical data flow (e.g., LabVIEW)/procedural, graphical data flow/simulation (e.g., Simulink), graphical data flow/textual (e.g., MathScript), and so forth. In some embodiments, the graphical program is or includes a graphical data flow program (GDFP), and the IDE is or includes a graphical data flow program development environment (GDFPDE). In other words, at least one of the models of computation may be graphical data flow.

In one embodiment, at least one of the two or more models of computation may include or be a physical domain, e.g., the physical domain may include one or more of an electrical domain, a chemical domain, a mechanical domain, an electromagnetic domain, a hydraulic domain, an acoustic domain, an optical domain, or a thermodynamic domain, among others.

The IDE may be received from the server computer over the network in response to the URI, i.e., may be sent from the server computer to the client computer, and may be executable in a web browser (e.g., in a sandbox, possibly implemented by a plugin) to create, edit, compile or interpret, execute, analyze, test, optimize, and/or debug graphical programs in the web browser, via any of the techniques described herein (or others), as applied to graphical programs that contain multiple computational models (i.e., models of computation). Thus, the (at least a portion of the) IDE may include one or more of an editor, edit time analyzer, compiler, execution engine (which may be or include an interpreter), and/or dynamic (run time) analyzer, among others, as desired.

The IDE may execute in the web browser to perform various functions, e.g., for developing graphical programs with multiple computational models. For example, in one embodiment, the IDE is executable in the web browser to display the graphical program in the web browser, receive user input indicating one or more edit operations to be performed on the graphical program, edit the graphical program in the web browser in accordance with the one or more edit operations, thereby generating an edited graphical program, display the edited graphical program (e.g., edited graphical source code) in the web browser, and compile or interpret, execute, and analyze (and possibly optimize) the edited graphical program. In some embodiments, the IDE may be further executable to automatically parallelize one or more portions of the graphical program in response to analyzing the program, and/or otherwise optimize the program.

Note that in various embodiments, to debug the graphical program the IDE may statically analyze the graphical program at edit time, and/or dynamically analyze the graphical program at run time, i.e., during execution. In other embodiments, the (at least a portion of the) IDE may provide any functionality desired. Note that the IDE may facilitate development of portions of the graphical program under respective computational models, and thus, for example, in one embodiment, the IDE may allow both graphical program editing, as well as textual editing, or graphical data flow development and simulation development, or graphical data flow development and domain specific application development, and so forth. Thus, the editing or development capabilities of the (at least a portion of the) IDE may support program development under multiple models of computation.

Moreover, in one embodiment, the IDE may execute in the web browser to display the graphical program in the web browser where respective portions of the graphical program are in accordance with the two or more computational models, and where the IDE displaying the graphical program in the web browser includes visually indicate each respective portion of the program in accordance with its model of computation. For example, in an exemplary embodiment where the graphical program includes graphical data flow and textual procedural models, the textual procedural program code may be visually demarcated, e.g., contained or enclosed in a rectangular box, from the graphical data flow code. Other exemplary visual designations or indications may utilize color, segregation/grouping within a single window or in respective windows, labeling, and so forth, although it should be noted that any techniques may be used to display or visually denote the computational model-specific program code, as desired.

In another embodiment, the URI may indicate a graphical program that implements a physical model (PM) or a PM execution engine (PMEE) stored on the server. The GPEE may be executable in a web browser to execute physical models that include two or more physical domains, e.g., two or more of electrical, chemical, mechanical, hydrodynamic, thermodynamic, and so forth. Similarly, the physical model (which may or may not already exist) may include two or more physical domains. Note that the physical model may be implemented using any of a variety of approaches, e.g., graphical programming, graphical data flow (e.g., LabVIEW), simulation (e.g., Simulink), textual programming, state machines, etc., as desired. In some embodiments, a model of a physical phenomenon may be or include a simulation or emulation of the phenomenon, depending on the resolution and/or basis of the model.

The GPEE may be received from the server computer (received by the client computer) over the network in response to the URI, and may be executable in a web browser to execute multi-domain physical models in the web browser, via any of the techniques described herein (or others), as applied physical models that contain multiple physical domains. Thus, in one embodiment, the GPEE may include respective portions or functionalities for executing respective physical domain specific portions of the physical model.

In various embodiments, the GPEE may include further functionality, e.g., may include (possibly for each physical domain): a graphical program/physical model editor, a graphical program/physical model compiler or interpreter, a graphical program/physical model analyzer, a graphical program/physical model optimizer, and so forth, and so may be or include at least a portion of an IDE, e.g., a graphical program/physical model IDE (PMIDE), as desired.

As with the above methods, the GPEE may be configured to execute in a sandbox, and so executing the GPEE in the web browser may include executing the GPEE in the sandbox. In embodiments where the sandbox is implemented as or by a plugin, the GPEE may be executed in the plugin.

In embodiments where the GPEE is a PMIDE, the PMIDE may be executable in the web browser to perform various functions for developing (graphical programs that implement) physical models with multiple physical domains. For example, in one embodiment, the PMIDE is executable in the web browser to display the graphical program/physical model in the web browser, receive user input indicating one or more edit operations to be performed on the graphical program/physical model, edit the graphical program/physical model in the web browser in accordance with the one or more edit operations, thereby generating an edited graphical program/physical model, display the edited graphical program/physical model (e.g., edited graphical source code) in the web browser, and compile or interpret, execute, and analyze (and possibly optimize, e.g., automatically parallelize) the edited graphical program/physical model. Note that in some embodiments, the PMIDE may be configured to statically analyze the graphical program/physical model at edit time, and/or dynamically analyze the graphical program/physical model at run time, i.e., during execution. In other embodiments, the (at least a portion of the) PMIDE may provide any other functionality related to the program and/or model desired.

In yet another embodiment, the method may be directed to cooperative execution of graphical data flow programs in multiple web browsers, from the perspective of a client computer.

For example, a network connection may be established between a client computer and a server computer, or, between each of a plurality of client computers and the server computer. The server computer may store a graphical data flow program (GDFP), where the GDFP includes a respective plurality of interconnected nodes or icons which visually indicate the functionality of the program, as well as a graphical data flow program execution engine (GDFP execution engine) required by the GDFP to execute. Additionally, the server computer may store a data set for which processing or analysis is desired. The GDFP may be executable in respective web browsers of the client computers to analyze or otherwise process respective portions of the data set.

A universal resource identifier (URI) may be sent to the server computer from the client computer, or, in some embodiments, from each of the client computers over the network, where the URI indicates the GDFP, the GDFP execution engine, the data set, and/or the server itself, and the GDFP and the GDFP execution engine may be sent from the server computer to the client computer, or in some embodiments, to each client computer, over the network in response to the URI. The GDFP execution engine may be configured to execute in a sandbox, e.g., a secure execution environment, possibly implemented by a plugin. Moreover, a respective portion of the data set may also be received by the client computer, or in some embodiments, respective portions of the data set may be received by each of the plurality of client computers.

The GDFP execution engine may execute in a web browser of the client computer to analyze the respective portion of the data set, thereby generating analysis results. In plural client system embodiments, the GDFP execution engine may be executed in a respective web browser of each of the plurality of client computers to analyze the respective portion of the data set, thereby generating respective analysis results.

The analysis results for the portion of the data set may be sent to a repository, e.g., on a server computer, over the network, which in some embodiments may be the server computer. In plural client system embodiments, the respective analysis results for the respective portions of the data set may be sent to the repository over the network, e.g., for collection, assembly, storage, and possibly further analysis.

In some embodiments, the GDFP execution engine may further execute in the web browser of each client computer to receive analysis results for the data set (or portions of the data set) over the network, and display the analysis results in the web browser. More generally, in one embodiment, the method may include displaying a representation of the data set (or portion of the data set) in the web browser, or displaying the analysis results for the portion of the data set in the web browser.

Once the portion of the data set has been analyzed, an indication of completion of the analysis of the portion of the data set may be sent to the server computer. Another portion of the data set may then be received from the server computer over the network, and the GDFP may be executed in the web browser via the GDFP execution engine to analyze the other portion of the data set, thereby generating analysis results for the other portion of the data set, and the analysis results for the other portion of the data set sent over the network to the repository. Moreover, the sending an indication, receiving another portion, executing the GDFP, and sending the analysis results, may be repeated for further portions of the data set in an iterative manner. In other words, as each client computer finishes analyzing its respective portion of data, it may send an indication to that effect to the server computer, which may send further data for analysis in response, where this process is repeated one or more times in an iterative manner.

Thus, in various embodiments, programs, e.g., graphical programs, may be created, edited, executed, analyzed, or otherwise operated on, via a web browser executing on a client computer.

BRIEF DESCRIPTION OF THE DRAWINGS

A better understanding of the present invention can be obtained when the following detailed description of the preferred embodiment is considered in conjunction with the following drawings, in which.

Figure 1A:
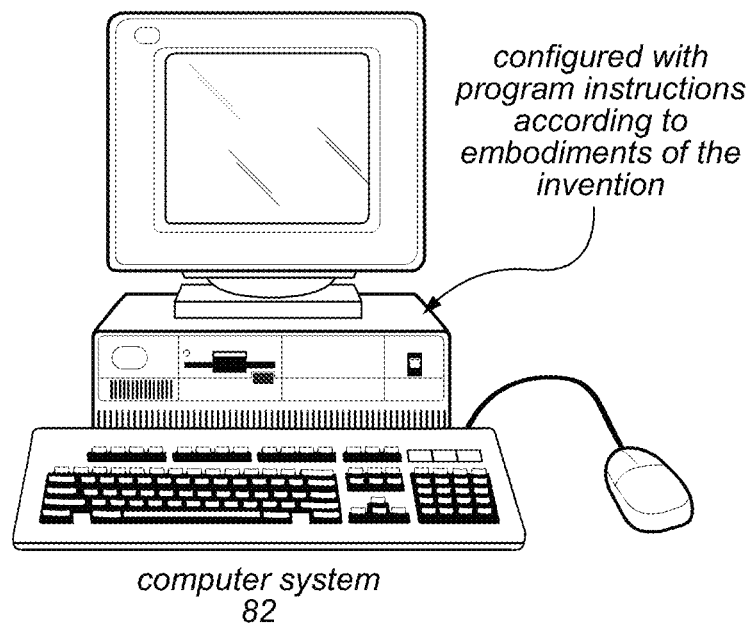
FIG. 1A illustrates a computer system configured to implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application 60/179,282, titled "Graphical Data Flow Program Operations in a Browser", filed May 18, 2009.

U.S. Provisional Application 61/230,947, titled "Graphical Data Flow Program Operations in a Web Browser", filed Aug. 1, 2009.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20070244990 (Ser. No. 11/396,740) titled "Simultaneous Update of a Plurality of User Interface Elements Displayed in a Web Browser," filed Apr. 3, 2006.

U.S. Pat. No. 7,506,304, titled "Graphical Data Flow Programming Environment with First Model of Computation that Includes a Structure Supporting Second Model of Computation", filed on Jun. 16, 2004.

U.S. Patent Application Publication 2008/0270920, titled "Automatically Generating a Graphical Program with a Plurality of Models of Computation", filed on Apr. 24, 2007.

U.S. patent application Ser. No. 11/609,928, titled "Coupling a Virtual Instrument to a Circuit Diagram", filed Dec. 13, 2006.

U.S. patent application Ser. No. 11/396,740, titled "Web Browser Graph User Interface Element with Rich Interactive Capabilities", filed Apr. 3, 2006.

U.S. patent application Ser. No. 11/396,652, titled "Simultaneous Update of a Plurality of User Interface Elements Displayed in a Web Browser", filed Apr. 3, 2006.

U.S. Patent Application Publication 2008/0109779, titled "System Simulation and Graphical Data Flow Programming in a Common Environment", filed Apr. 2, 2007.

U.S. Pat. No. 7,302,675, titled "System and Method for Analyzing a Graphical Program Using Debugging Graphical Programs", filed Apr. 10, 2002.

U.S. Pat. No. 7,024,660, titled "Debugging A Program Intended to Execute on a Reconfigurable Device Using a Test Feed-Through Configuration", filed Oct. 29, 2001.

U.S. Pat. No. 6,064,409, titled "System and Method for Providing AutoProbe and Debugging Features in a Graphical Data Flow Program", filed Feb. 14, 1997.

U.S. Pat. No. 6,715,139, titled "System and Method for Providing and Displaying Debugging Information of a Graphical Program on a First Computer During Execution of the Graphical Program on a Second Computer", filed Aug. 3, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Model of Computation (or Computational Model)—a model for visually specifying or visually representing program code to a user. A "model of computation" may also be considered as a set of program semantics of a programming language. Examples of "models of computation" include various forms of graphical data flow, such as data driven data flow (e.g., LabVIEW), demand driven data flow, and statically-scheduled data flow (including, but not limited to, synchronous data flow, heterochronous data flow, cyclo-static data flow, parameterized synchronous data flow, and discrete time data flow); synchronous reactive; process network; state diagram; control flow diagram; simulation diagram models (continuous time simulation data flow); various forms of text-based code (such as Matlab and MathScript, C, C++, etc.); and/or physical simulation (including physical domains such as circuits, hydrodynamics, mechanics, device modeling, thermodynamics, etc.), among others. "Statically-scheduled data flow" is data flow in which the firing pattern (i.e. execution order) of nodes is data-independent and can, therefore, be determined before run-time, e.g. at compile time. A "process network" is a set of deterministic sequential processes communicating through FIFO channels. "Synchronous reactive" can refer to a program where operations are given a certain amount of time to react, and if this constraint holds, the rest of the system appears synchronous.

A program portion may be visually represented on a display in a first computational model, but may in fact be actually implemented in the computer using a different computational model that may be hidden from the user. For example, Matlab is a text-based scripting language that is implanted in the C programming language. As another example, MathScript is a text-based scripting language implemented in the LabVIEW graphical programming language. A program portion may be represented in a first model of computation to provide a more intuitive visual representation of the functionality of the program portion, e.g., to allow the user to more readily understand and/or edit the program portion.

FIG. 1A—Computer System

FIG. 1A illustrates a computer system 82 configured to perform data flow program operations, e.g., editing, executing, analyzing, etc., a data flow program via a web browser. Embodiments of methods for editing, executing, or analyzing graphical programs (among other functionalities) via a web browser are described below.

As shown in FIG. 1A, the computer system 82 may include a display device configured to display the graphical program as the graphical program is created, edited, executed, or analyzed, among other functions, e.g., in a web browser. Note that as used herein, the term "web browser" has the full extent of its ordinary accepted meaning. The display device may also be configured to display a graphical user interface or front panel of the graphical program during execution of the graphical program. The graphical user interface may comprise any type of graphical user interface, e.g., depending on the computing platform, and may be comprised or implemented via the web browser, as will be described in more detail below.

The computer system 82 may include at least one memory medium on which one or more computer programs or software components according to one embodiment of the present invention may be stored. For example, the memory medium may store a web browser, and one or more programs, e.g., graphical programs, for performing the methods described herein. Additionally, the memory medium may store an interactive development environment (IDE), e.g., a graphical programming development environment application, used to create, edit, execute, and/or analyze such graphical programs, or other types of programs. The memory medium may also store operating system software, as well as other software for operation of the computer system. Various embodiments further include receiving or storing instructions and/or data implemented in accordance with the foregoing description upon a carrier medium.

Figure 1B:
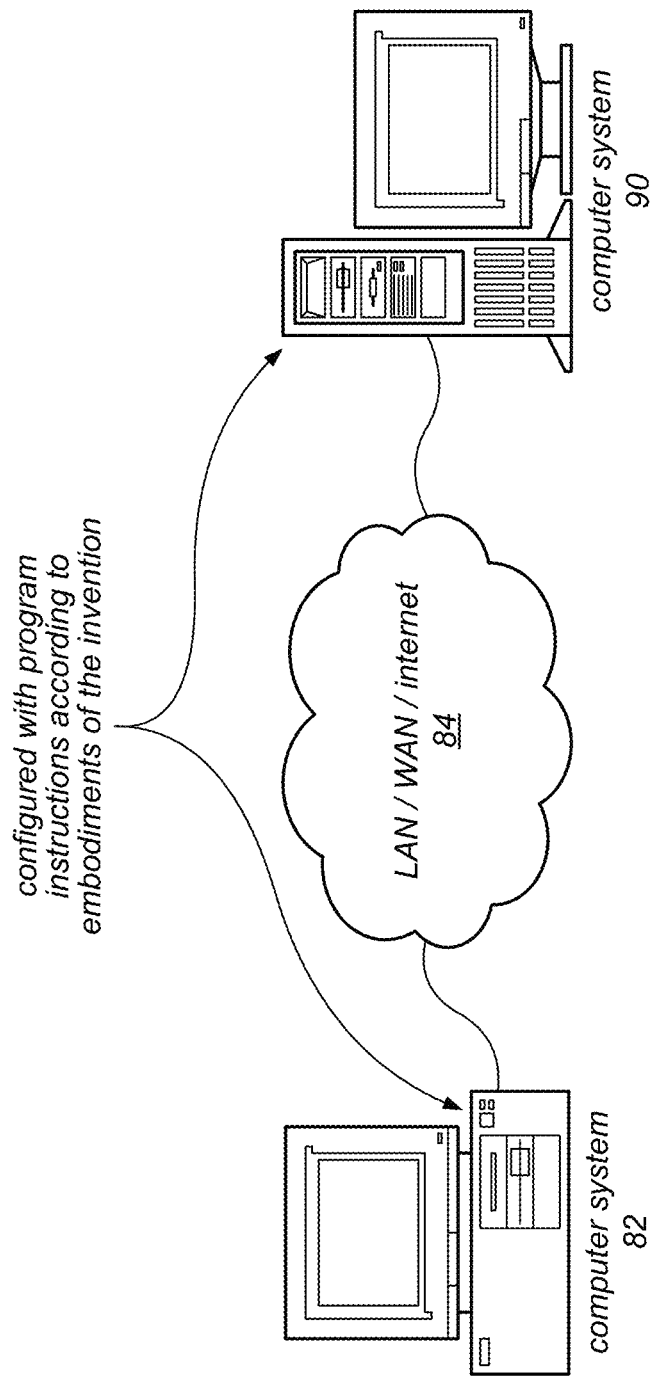
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program (or other type of program) in a distributed fashion. For example, computer systems 82 and 90 may operate as a client/server system, where a first computer (e.g., computer 82) may execute a web browser whereby a user may interact with, e.g., control and/or communicate with a second computer (e.g., computer 90), e.g., via a browser. The second computer may store various software components according to embodiments of the present invention, e.g., web-server programs, application programs, e.g., graphical data flow programs, and so forth. In some embodiments, the second computer may also store other components, such as an interactive development environment (IDE), or portions thereof, e.g., a graphical data flow program execution engine, and one or more analysis programs for analyzing programs, e.g., graphical data flow programs. In one embodiment, the second computer may store programs (and data) implementing other applications or tools, such as a graphical data flow program repository, etc., according to various embodiments of the present invention.

Moreover, as shown in FIGS. 2A, 2B, 3A, and 3B, the client and/or server computer(s) may be coupled to any of a variety of other devices, e.g., measurement, automation, and/or control devices, depending upon the particular application to which the graphical data flow program relates. In other embodiments, computer 90 may comprise an embedded device. In one embodiment, the device may include a programmable hardware element and/or may include a processor and memory medium which may execute a real time operating system. Thus, for example, computer system 90 may be an embedded server, and thus may have limited or even no display capabilities.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, data processing, etc.

Figure 2A:
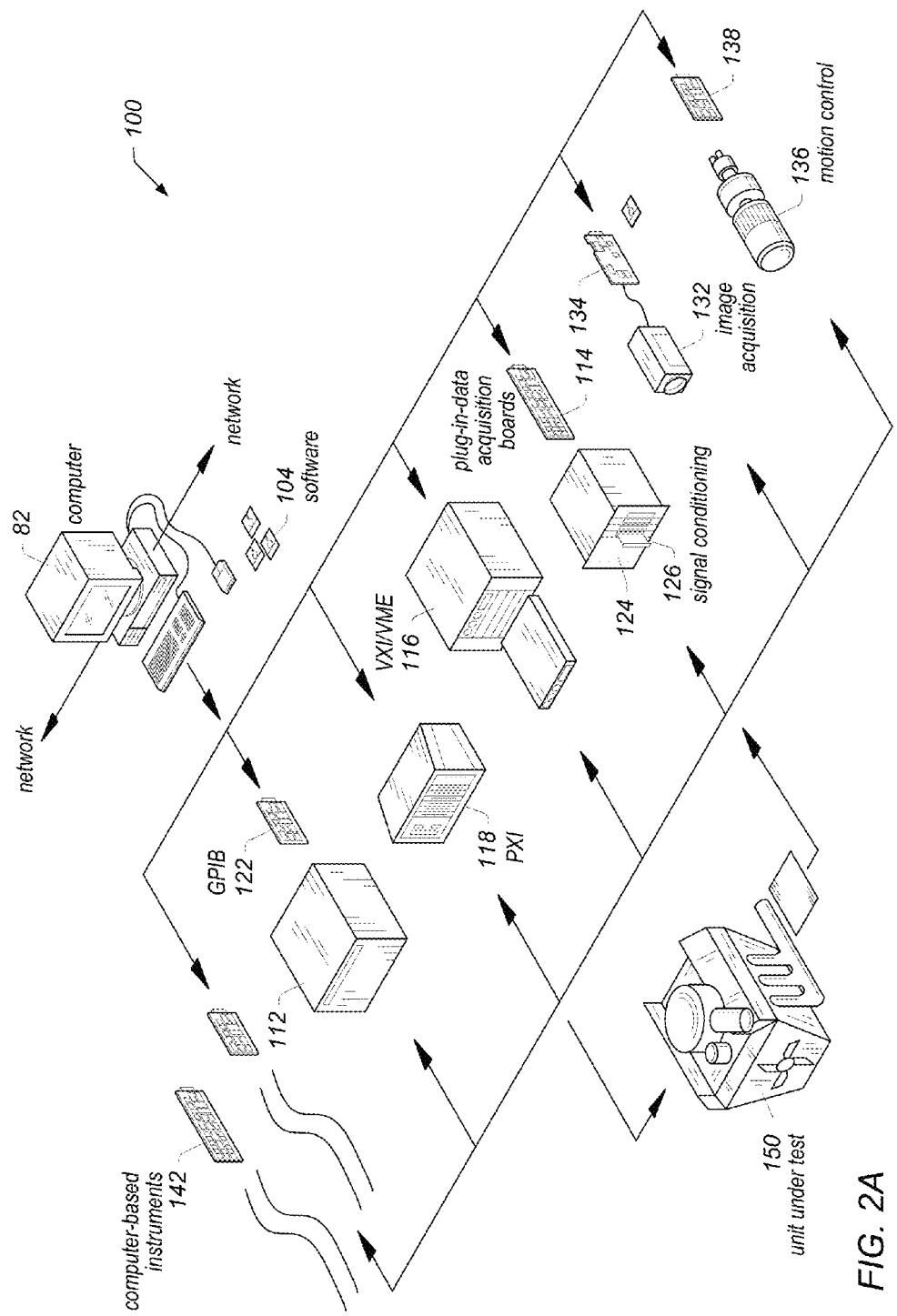
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
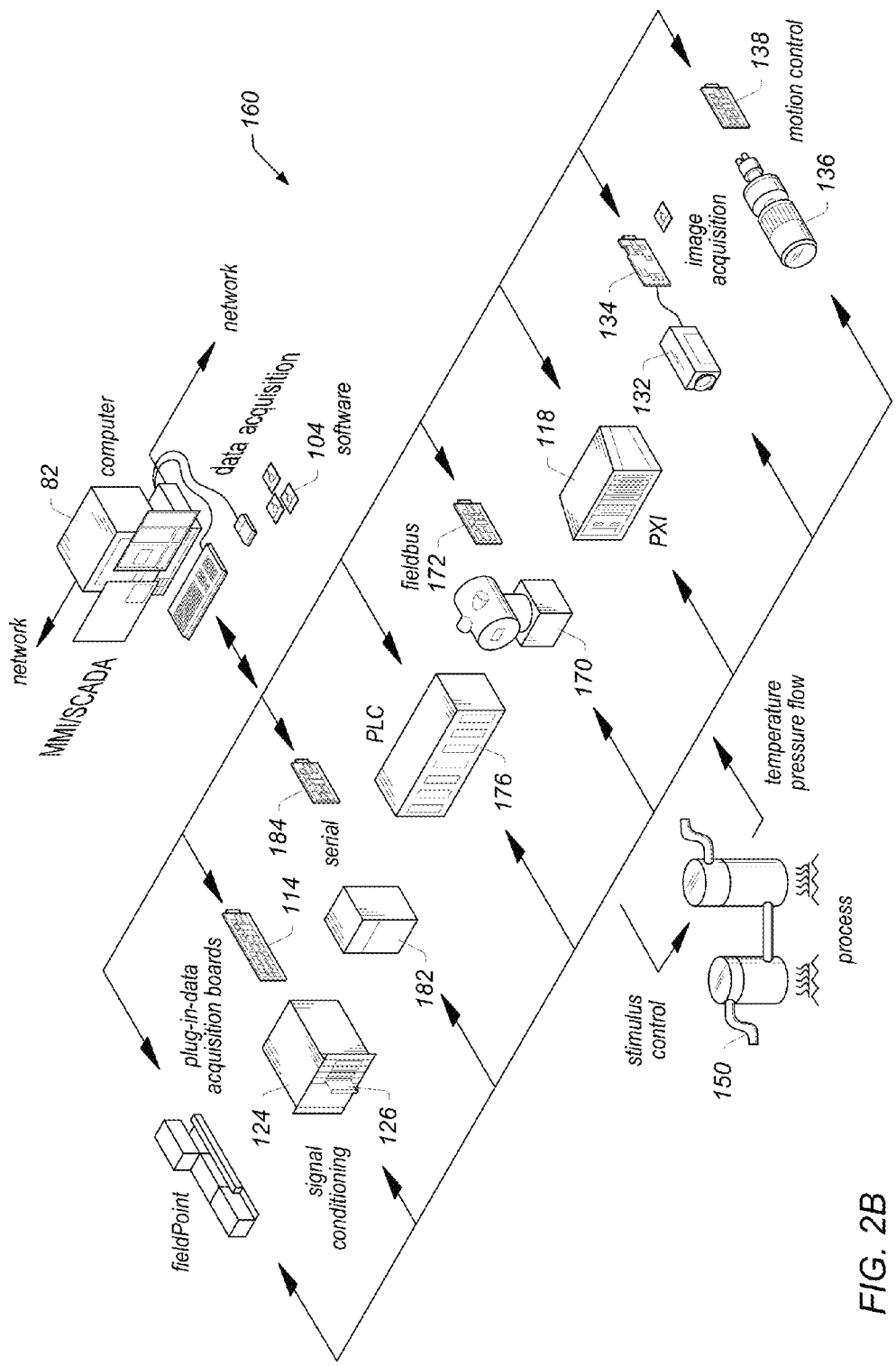
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
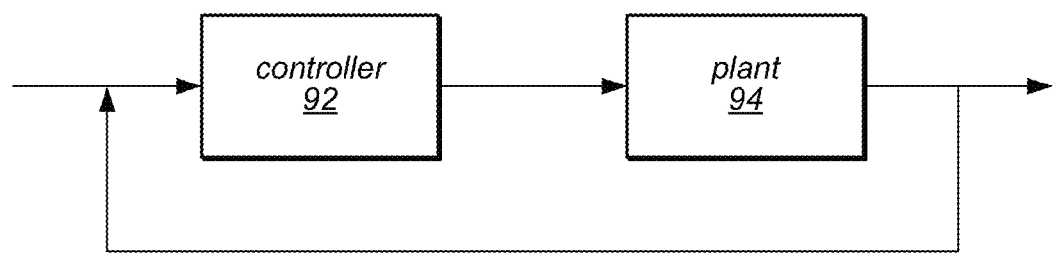
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
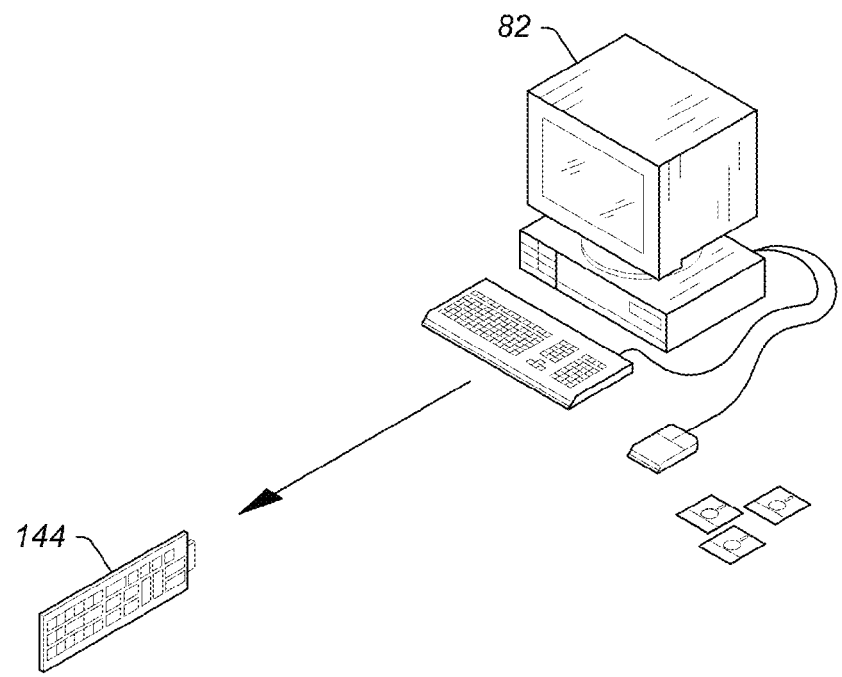
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

It should be noted that while many of the embodiments described herein are directed to graphical programs, such as graphical data flow programs, in various other embodiments, the techniques disclosed herein may be used or implemented with respect to other types of programs, e.g., textual programs, textual data flow programs, simulations, models, e.g., physical models (i.e., models of physical phenomena or systems), and so forth, as desired.

Figure 4:
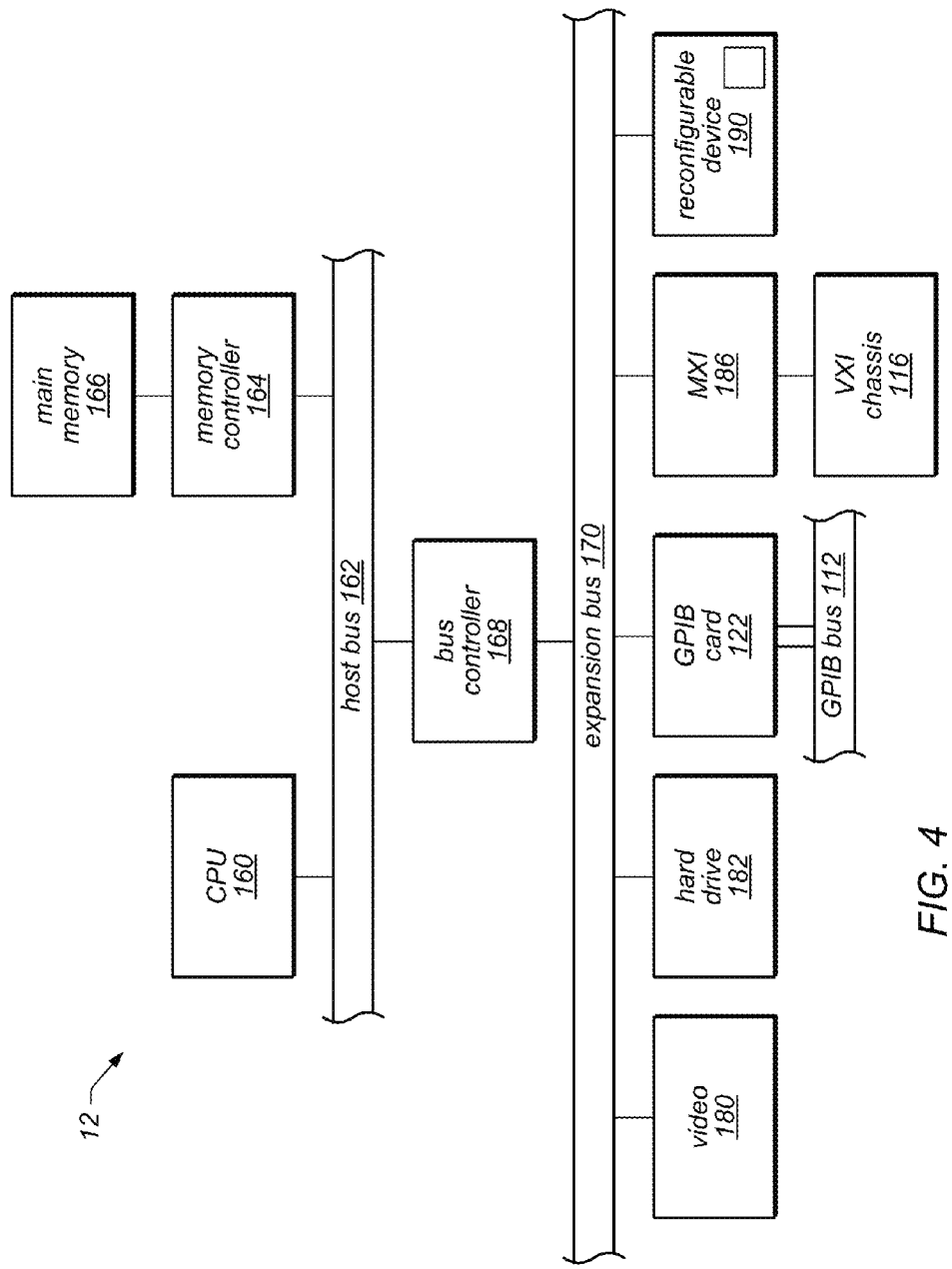
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program to be edited, executed, and/or analyzed (e.g., debugged), among other functions, via a web browser, as well as software supporting such web-based interactions, which may include an IDE under which the graphical program may be developed, edited, executed, analyzed, etc. The main memory may also store operating system software, as well as other software for operation of the computer system. In another embodiment, the computer may store and execute a web browser via which a user may interact with a another computer, e.g., for downloading and executing one or more of the above software items, e.g., as web applications, as well as other software necessary or desired for operation of the computer, as described above with respect to computers 82 and 90. In embodiments where the computer is a server computer, e.g., computer 90, the computer may store web server software, whereby the server computer may interact with client computers via web browsers executing on the client computers, as well as application software implementing specified web hosted functionality, e.g., program repositories, downloadable IDE web applications, and so forth. Further embodiments are described below.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, and as indicated above, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190, where a user of the computer may interact with the graphical program via a web browser. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. In other embodiments, the device may perform other software functions, as will be described in more detail below.

Note that the software facilitating or implementing the web browser based interactions may take any number of forms, and may be distributed between the computers as desired. For example, in one embodiment, the browser may invoke or utilize one or more locally executed programs (on the client computer system), e.g., graphical data flow programs, execution engines, development systems, plug-ins, etc., that may facilitate or implement at least a part of the functionality of the system, and that may be downloaded from a server computer over a network for execution, as will be described below in more detail. More generally, the embodiments contemplated range from an embodiment in which all functionality, including program editing, execution, or analysis, is implemented on the client computer system (but still interfaced via a web browser), to embodiments in which some or substantially all the functionality is implemented on the second (or more) computer(s), e.g., where the client computer executes the web browser and minimal supporting software for interactions with the second, e.g., server, computer, where the primary functionality is implemented.

In yet another embodiment, various of the functionalities described above may not only be distributed across multiple computers, but may be replicated on multiple machines. More generally, multiple instances of various software components implementing portions of the functionality described herein may be deployed and executed on respective computers, e.g., for cooperative development or analysis of graphical programs, e.g., graphical data flow programs, or data. Thus, for example, multiple users may utilize web browsers to execute or interact with multiple graphical programs, IDEs, analysis tools, and so forth, thus forming an interactive community of designers, developers, and users, whereby large complex systems may be developed, executed, debugged, and managed cooperatively, or where graphical data flow programs may be shared among developers or users of the community.

The following describes various embodiments of editing, analyzing or debugging, and executing programs, e.g., graphical data flow programs, via web applications downloaded from a server computer. It should be noted that in various embodiments, any of the techniques disclosed herein may be used in any combinations desired. It should be further noted that an application such as an IDE that performs a specified functionality may be referred to by that functionality, e.g., an IDE that includes editing functionality may be referred to as an editor; an IDE or other program that includes editing, execution, and/or analysis functionality may be referred to as an IDE, an execution engine, and/or an analyzer, as desired.

Figure 5A:
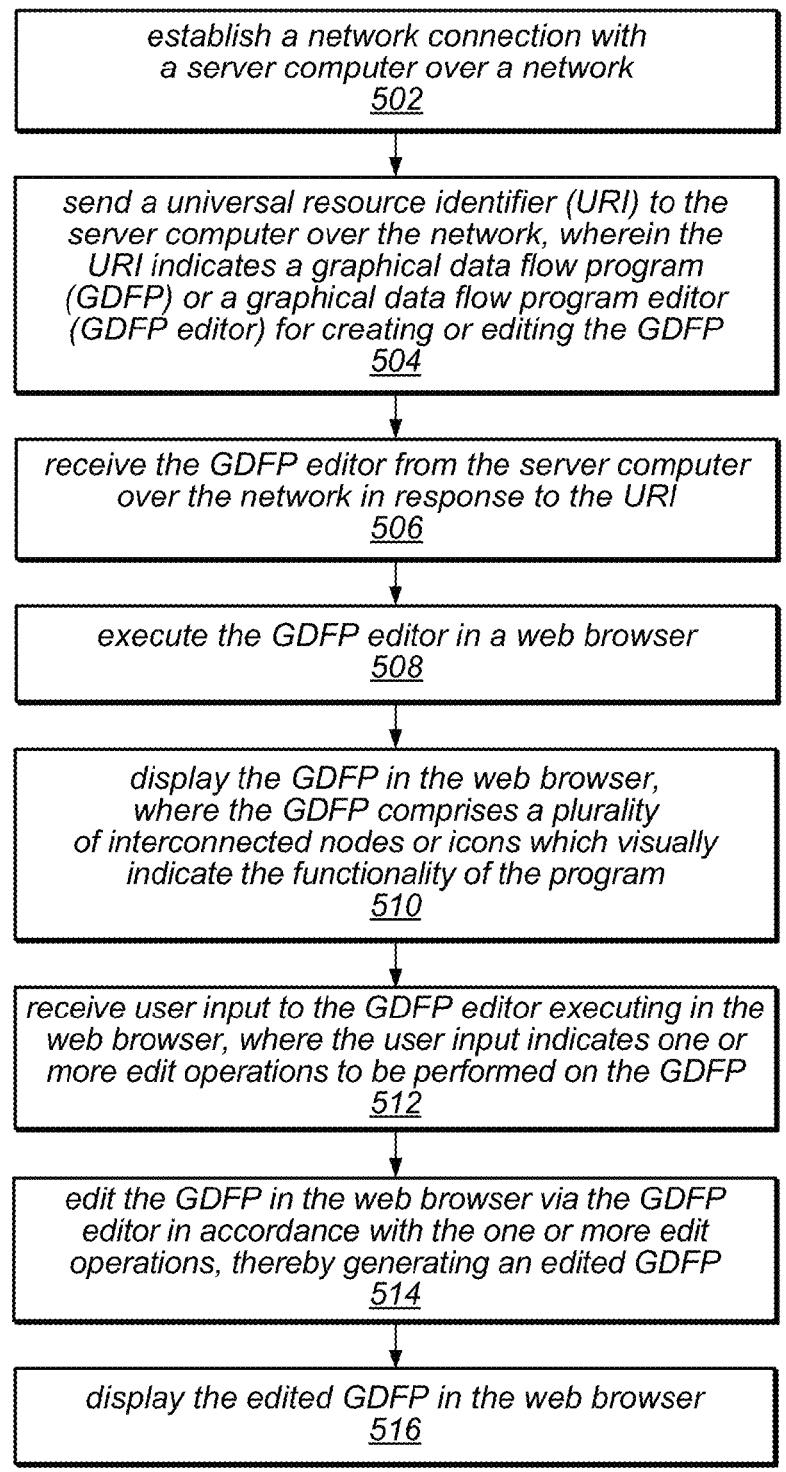
FIGS. 5A and 5B are a flowchart diagrams illustrating embodiments of a method for editing a graphical data flow program over a network via a web browser.

FIG. 5A—Flowchart of a Method for Editing a Graphical Program Over a Network Via a Web Browser—Client Side FIG. 5A is a flowchart diagram illustrating one embodiment of a method for editing a graphical program over a network via a web browser, from the perspective of a client computer, e.g., computer 82, or another computer. The method shown in FIG. 5A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer over a network. For example, a user may open a web browser and direct the browser to the server computer.

In 504, a universal resource identifier (URI) may be sent to the server computer over the network, where the URI indicates a graphical data flow program (GDFP) or a graphical data flow program editor (GDFP editor) for creating or editing the GDFP. Note that in some embodiments, method elements 502 and 504 may be performed together. For example, the user may click on a link or may otherwise indicate the URI, which may automatically invoke the connection with the server computer.

In 506, the GDFP editor may be received from the server computer over the network in response to the URI. In one embodiment, the GDFP is a pre-existing GDFP, where the GDFP editor is associated with the pre-existing GDFP, and where the URI specifies the pre-existing GDFP, thereby also indicating the associated GDFP editor. In this embodiment, the GDFP may also be received from the server computer in response to the URI. Alternatively, in embodiments where the GDFP is not a pre-existing GDFP, the URI may specify the GDFP editor, and the GDFP editor may be executable in the web browser to receive user input specifying creation of the GDFP, and create the GDFP in response to the user input. Note that in embodiments where the GDFP is a pre-existing GDFP, the editor may load with the indicated GDFP, whereas in embodiments where the GDFP is not a pre-existing GDFP, the editor may load empty or with a new (e.g., blank or templated) document or program file.

In 508, the GDFP editor may be executed in a web browser. In some embodiments, the GDFP editor may be configured to execute in a sandbox, where the sandbox is or includes a secure execution environment for the GDFP editor. Thus, executing the GDFP editor in the web browser may include executing the GDFP editor in the sandbox. Note that the sandbox may be implemented in any of a variety of ways. For example, in one embodiment, the sandbox may be implemented by a plugin, and so executing the GDFP editor in the sandbox may include executing the GDFP editor in the plugin.

Examples of plugins for executing web applications include Adobe Flash™ and Microsoft Corporation's Silverlight™ framework or system, as well as plugins implemented via the JAVA programming language. In some embodiments, the plugin may operate as a virtual machine, e.g., providing an execution infrastructure or environment within which the application may execute. In some embodiments, if the plugin is not already resident on the client computer, the user may be directed (e.g., via a text message, a link, etc.) to a source from which the plugin may be downloaded.

Note that there are numerous benefits to executing applications as web applications via plugins. For example, with conventional applications, much of the functionality required for operation must be provided by the application itself, which may result in large application sizes. For example, in the case of a conventional program editor, the application must generally implement functionality for handling (alphanumeric) strings, file I/O, memory management, and various other infrastructure functionalities, and so downloading and installation of the application may require significantly more time and resources to accomplish. In contrast, with a web application that executes in a web browser, e.g., via a plugin, the plugin may provide some, most, or even all, of this functionality, leaving the web application (e.g., the editor) to provide the application functionality, e.g., "functional" operations, e.g., in the editor case, editor functionality.

Figure 20:
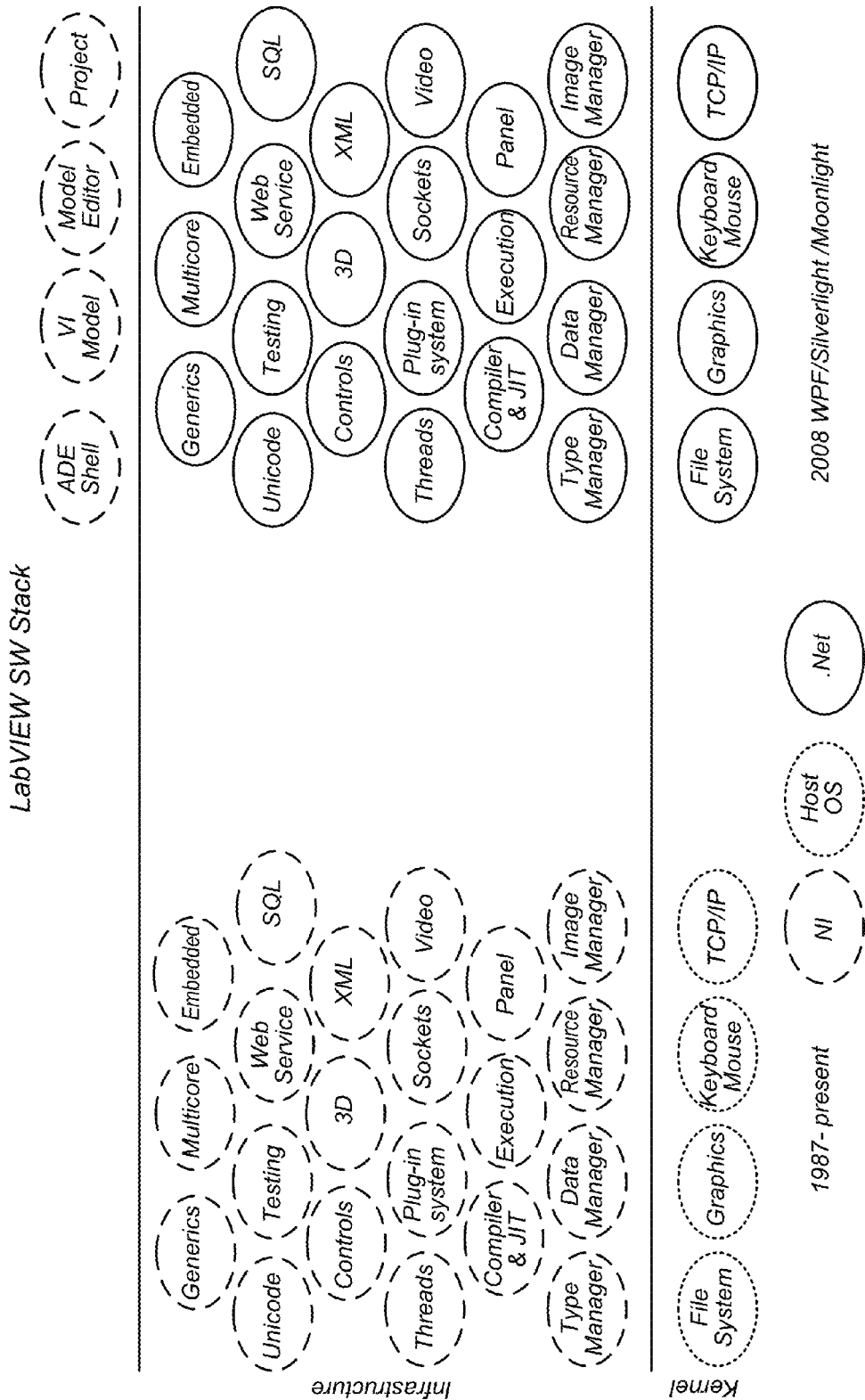
FIG. 20 compares exemplary distribution of software functionality in a conventional desktop application and a corresponding implementation using web plugin technology, according to one embodiment.

FIG. 20 illustrates this concept, comparing an exemplary set of application software functions or modules required by and included in a standalone installation of a graphical program development environment (left), including application functionality, infrastructure, and kernel functions or modules, with the same functions or modules divided between a corresponding web application and a plugin, according to one embodiment. More specifically, FIG. 20 illustrates an exemplary distribution of functionality or software components with respect to a LabVIEW software stack for a typical standalone application, and for one embodiment of an implementation that leverages the functionality of a plugin, specifically, the Microsoft .Net-based Silverlight™ system.

As may be seen, in the conventional or standalone implementation, the application (denoted as a source by "NI" ovals, per the legend at the bottom of the figure) must provide the "pure" application functions, as well as a host of infrastructure modules or components, leaving only kernel functionality to be provided by the host operating system (denoted by "Host OS" ovals, per the legend). In direct contrast, in the plugin implementation, the application is only responsible for the "pure" application functionality, where both the infrastructure and kernel functions are provided by the plugin system, in this case, .Net/Silverlight/Moonlight software (denoted by ".Net" ovals, per the legend). It should be noted that the functions or modules shown are meant to be illustrative only, and do not necessarily represent all functionality or software components of the application.

Note that in this exemplary embodiment, the kernel requires approximately 100 k of memory, the infrastructure requires approximately 5M, and the "pure" application functions require approximately 1-2M. Thus, the size of the application to be downloaded to the client computer may be reduced from approximately 6-7M to approximately 1-2M by utilizing the plugin technology. Thus, significantly less storage space, and correspondingly shorter download times, are required for the plugin implementation. Additionally, note that in the conventional (desktop) implementation, many subsystems may have their own unique architectures (e.g., strings, memory management, API conventions), some of which may be written by the developer/vendor, and some of which may be third party components encapsulated in wrappers. Many of the internal API functions may not be accessible from the development environment/language, and thus may put developers at a disadvantage. Additionally, the use of wrappers may entail significant added overhead.

In contrast, in the .NET stack the memory management, API, and thread tools and reflection may be consistent. The term "reflection" is a term of art referring to the ability to dynamically determine properties, methods, and events, without the need for a separate descriptor file (which could be out of date). A net effect of this feature is that it removes the need for wrappers and allows calling the API with no performance penalty.

Thus, in some embodiments, the application may be implemented as a web application, written in such a way as to take advantage of plugin technology, and thus benefiting from a consistent infrastructure, and smaller footprint and download times. Moreover, note that offloading kernel and infrastructure responsibilities to the plugin system greatly simplifies further development and maintenance of the application, since the developers need not maintain the functionality provided by the plugin technology itself. Note that the particular plugin systems described herein are intended to be exemplary only, and that any other plugin or virtual machine technologies may be used as desired, e.g., Moonlight (open source implementation of Silverlight for GNU/Linux systems), Microsoft Corporation's Windows Presentation Foundation, and so forth.

Figure 21:
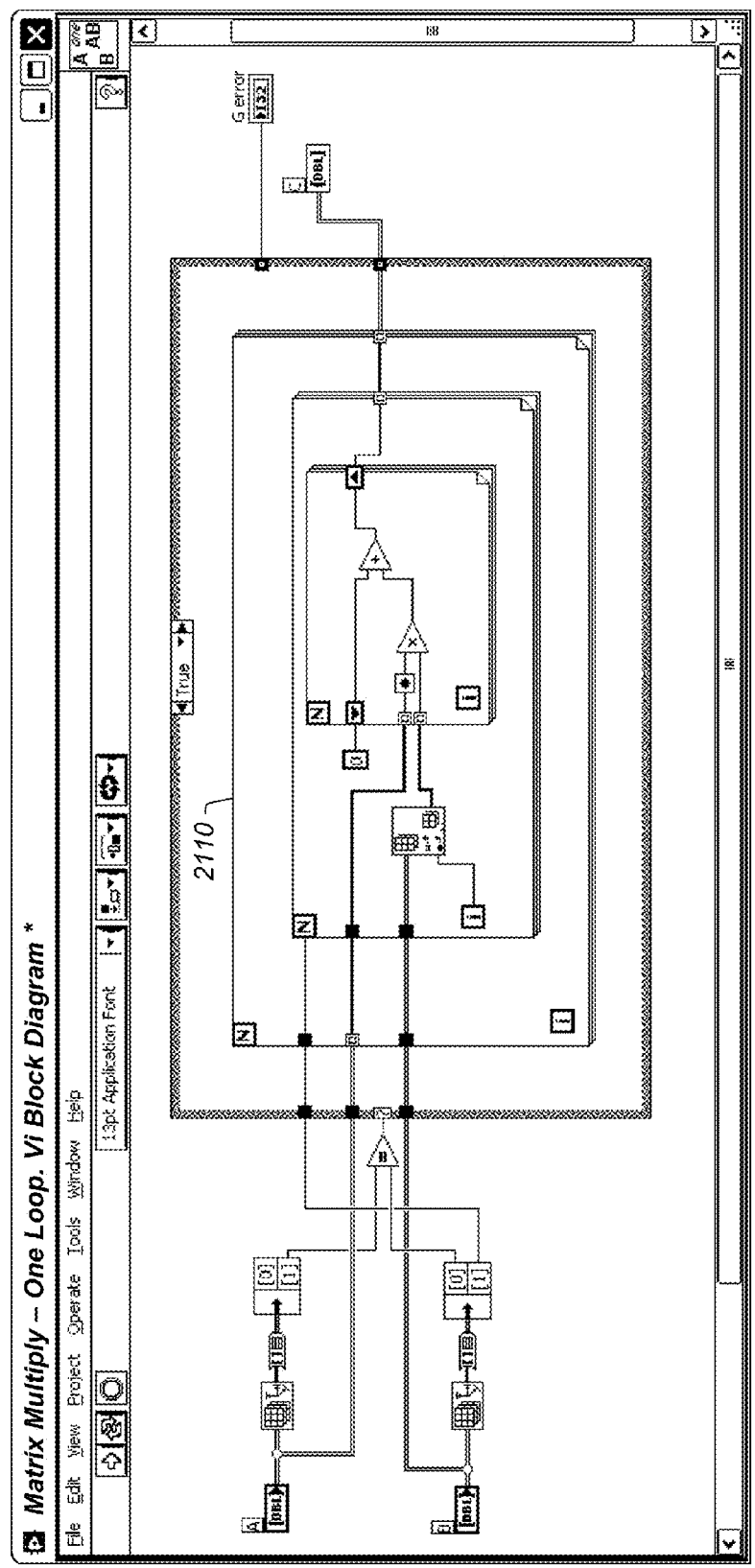
FIG. 21 illustrates an exemplary graphical program, according to one embodiment.

In 510, the GDFP may be displayed in the web browser, where the GDFP includes a plurality of interconnected nodes or icons which visually indicate the functionality of the program. FIG. 21 illustrates an exemplary graphical data flow program that includes a graphical iterative structure, e.g., a graphical FOR loop 2110, used to implement a matrix multiplication, which, as may be seen, contains two further FOR loops, i.e., nested FOR loops. It should be noted, however, that the GDFP of FIG. 21 is intended to be exemplary only.

In 512, user input may be received to the GDFP editor executing in the web browser, where the user input indicates one or more edit operations to be performed on the GDFP, and in 514, the GDFP may be edited in the web browser via the GDFP editor in accordance with the one or more edit operations, thereby generating an edited GDFP. For example, the user may "drag and drop" various graphical function nodes onto a block diagram and "wire" the nodes together. Further details regarding creation and editing of graphical programs is provided below under the heading "Creation of a Graphical Program".

In 516, the edited GDFP may be displayed in the web browser. For example, an edited block diagram of the GDFP may be displayed (see, e.g., FIG. 21). Displaying the edited block diagram in the web browser may include displaying edited block diagram in a GUI presented in the web browser, e.g., an editor window.

Further Embodiments

In some embodiments, the method may include sending the edited GDFP to a computer system for storage, compilation, analysis, or download by other users. In one embodiment, receiving the GDFP editor from the server computer over the network may include receiving a GDFP execution engine from the server computer over the network. The method may include sending the edited GDFP to the server computer for compilation, and receiving an executable for the GDFP from the server computer (e.g., generated via compilation on the server computer). The executable of the edited GDFP may then be executed in the web browser via the GDFP execution engine. Thus, after compilation, the server may send the resulting executable back for execution, e.g., at the request of the user via the web browser, or automatically.

In other embodiments, the GDFP editor may be included in a graphical program development environment (GPDE), receiving the GDFP editor from the server computer over the network may include receive the GPDE from the server computer over the network. The GPDE may include a GDFP compiler and a GDFP execution engine. The GDFP compiler may be executable in the web browser to compile the edited GDFP in the web browser, thereby generating an executable of the edited GDFP, and the GDFP execution engine may be executable in the web browser to execute the executable of the edited GDFP in the web browser.

In further embodiments, the GDFP execution engine is or includes an interpreter, and executing the GDFP in the web browser may include the GDFP execution engine interpreting the GDFP. Thus, rather than compiling the graphical source code of the GDFP to generate an executable, the GDFP execution engine may interpret the (graphical source code of the) GDFP at runtime, i.e., making a compiler unnecessary.

In some embodiments, the edited GDFP may be deployed to one or more target devices. For example, the graphical source code of the edited GDFP or the executable may be sent to a target device for execution. In embodiments where the graphical source code is sent, the target device may be required to compile the program. The target device may be specified by the user via the web browser.

Figure 5B:
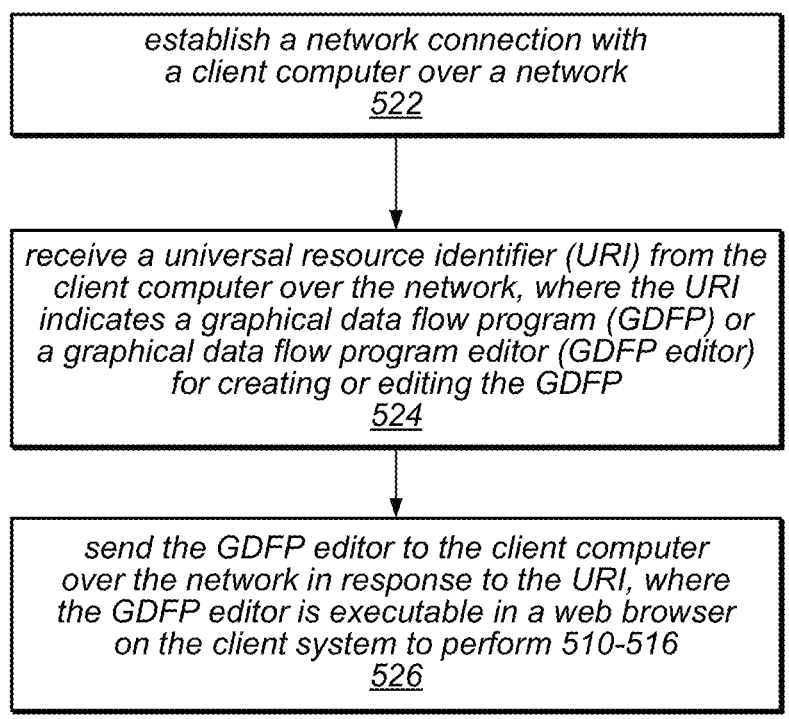

FIG. 5B—Flowchart of a Method for Editing a Graphical Program over a Network Via a Web Browser—Server Side FIG. 5B is a flowchart diagram illustrating one embodiment of a method for editing a graphical program over a network via a web browser, from the perspective of a server computer, e.g., computer 90, or another computer. The method shown in FIG. 5B may be used in conjunction with any of the computer systems or devices shown in the above Figures, among other devices. In various embodiments, some of the method elements shown may be performed concurrently, in a different order than shown, or may be omitted. Additional method elements may also be performed as desired. Descriptions of method elements described previously (e.g., with respect to other methods) may be abbreviated. As shown, this method may operate as follows.

In 522, a network connection may be established with a client computer over a network, and in 524, a universal resource identifier (URI) may be received from the client computer over the network, where the URI indicates a graphical data flow program (GDFP) or a graphical data flow program editor (GDFP editor) for creating or editing the GDFP. Note that in some embodiments, method elements 522 and 524 may be performed together. For example, the user of the client computer may click on a link or may otherwise indicate the URI, which may automatically invoke the connection with the server computer.

In 526, the GDFP editor may be sent to the client computer over the network in response to the URI. As described above, the GDFP editor may be executable in a web browser to edit the GDFP. As also described above, the GDFP editor may be configured to execute in a sandbox, e.g., a secure execution environment, e.g., implemented by, as, or via, a plugin. As described above, if the plugin is not already resident on the client computer, the user may be directed (e.g., via a text message, a link, etc.) to a source from which the plugin may be downloaded.

Operation of the GDFP editor and additional aspects and features of the method according to various embodiments are described above with reference to FIG. 5A, where, for example, features or attributed described from the point of view of the client computer, may be considered from the perspective of the server computer. For example, instead of the client computer receiving the GDFP compiler or execution engine, as described above with respect to the method of FIG. 5A (client side), in corresponding embodiments of the method of FIG. 5B (server side), the server computer sends the GDFP compiler or execution engine. Similarly, whereas one embodiment of the method of FIG. 5A includes (the client computer) sending the edited GDFP to the server computer for compilation, and receiving an executable for the GDFP from the server computer, a corresponding embodiment from the server side may include receiving the edited GDFP from the client computer for compilation, compiling the edited GDFP, thereby generating an executable for the edited GDFP, and sending the executable for the GDFP to the client computer, and so forth. As also indicated above, in some embodiments, the GDFP execution engine is or includes an interpreter, and executing the GDFP in the web browser includes the GDFP execution engine interpreting the GDFP, making a compiler unnecessary.

In other words, some of the embodiments of the method of FIG. 5B may be complementary with respect to corresponding embodiments of the method of FIG. 5A. This pattern of paired methods covering client and server functionality is repeated below with respect to other web-based methods.

Other embodiments of the server side method of FIG. 5B may include the (the server computer) receiving the edited GDFP from the client computer, and deploying the edited GDFP to one or more target devices, e.g., as opposed to the client computer doing so.

Some client systems may not have the capability to execute the GDFP, e.g., may not include software that supports or includes the above-mentioned sandbox or plugin, e.g., may not be capable of executing the GDFP execution engine; but there still may be a need or desire to view such graphical programs. For example, client users may wish to view the above edited GDFP, even though they cannot execute it. Thus, in one embodiment, the GDFP may have an associated representation implemented in a browser supported format, e.g., one or more of: HTML an image format, or PDF, among other browser supported/accessible formats, where the representation of the GDFP does not include the GDFP. In other words, the server may store not only the GDFP, but also may store a downloadable representation of the GDFP that may be viewable in a web browser. Thus, the representation of the GDFP may be downloadable to client systems for display in browsers on the client systems, including browsers that do not support execution of the GDFP. Moreover, the representation of the GDFP may be indexable for searching by search engines, and so may be findable via web search technologies. In various embodiments, the representation of the GDFP may include one or more of comments in the GDFP, an indication of components referenced by the GDFP with links to the referenced components, or notes regarding the GDFP, among other items, e.g., metadata related to the program.

Accordingly, in some embodiments where the GDFP is edited and transmitted back to the server, the method may further include receiving the edited GDFP from the client system, and generating and storing such an associated representation of the edited GDFP, i.e., where the representation of the edited GDFP does not include the edited GDFP, and where the representation of the GDFP is downloadable to client systems for display in browsers on the client systems, including browsers that do not support execution of the edited GDFP.

Described in a slightly different way, a memory medium, e.g., of or for a server computer, may store a graphical data flow program editor (GDFP editor), where the GDFP editor is executable in a web browser on a client system to display the graphical data flow program (GDFP) in the web browser. User input may be received indicating one or more edit operations to be performed on the GDFP, and the GDFP may be edited in the web browser in accordance with the one or more edit operations, thereby generating an edited GDFP, after which the edited GDFP may be displayed in the web browser. Moreover, the memory medium may store program instructions executable by a processor to establish a network connection with a client computer over a network, receive a universal resource identifier (URI) from a client computer over the network, where the URI indicates the GDFP or the GDFP editor for creating or editing the GDFP, and send the GDFP editor to the client computer over the network for execution in the web browser of the client computer.

Thus, in one embodiment, a user may open a browser and access a URI at a server, where the URI may reference the graphical program editor (with no existing graphical program), or the URI may reference a previously created graphical program, along with its editor (or development environment. The server may provide a graphical data flow program development environment (GPDE), including a graphical data flow program editor, and possibly an execution system. The user can create or edit a graphical program in the browser. The editor may thus be fully brought client side and run locally, e.g., in a sandbox on the client.

Figure 6A:
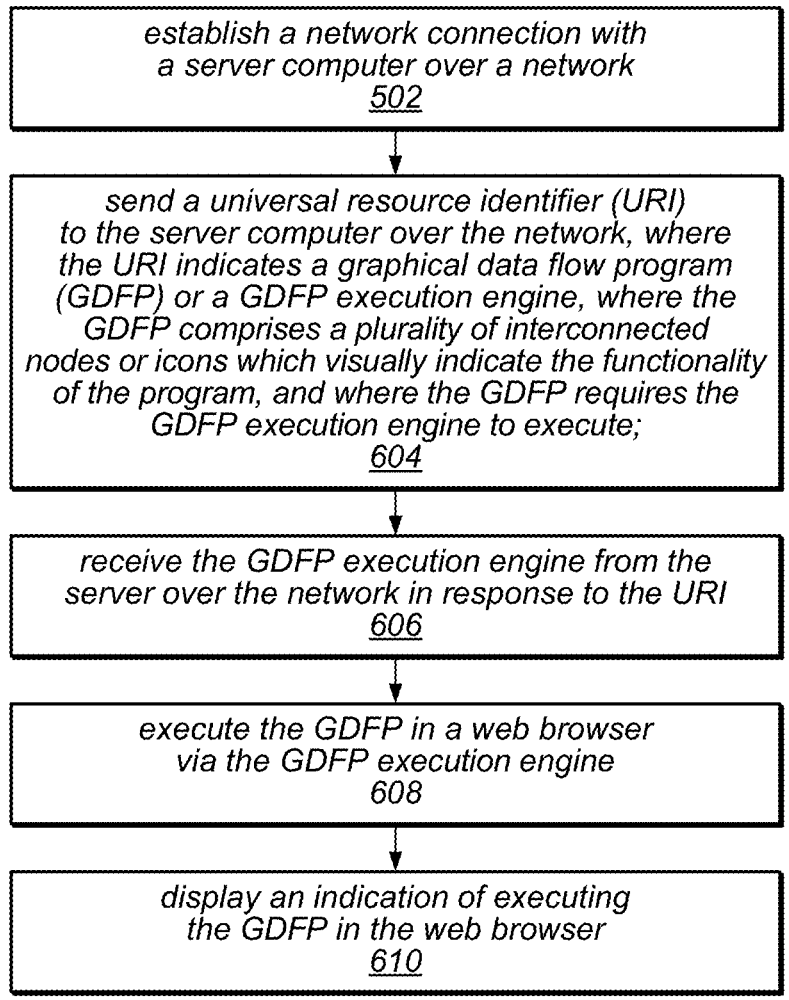
FIGS. 6A and 6B are flowchart diagrams illustrating embodiments of a method for executing a graphical data flow program over a network via a web browser.

FIG. 6A—Flowchart of a Method for Executing a Graphical Data Flow Program in a Web Browser—Client Side FIG. 6A is a flowchart diagram illustrating one embodiment of a method for executing a graphical program over a network via a web browser, from the perspective of a client computer, e.g., computer 82, or another computer. The method shown in FIG. 6A may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that for brevity, in all the methods presented herein, the descriptions of method elements previously presented may be abbreviated. As shown, this method may operate as follows.

In 502, a network connection may be established with a server computer over a network, e.g., a user may open a web browser and direct the browser to the server computer.

In 604, a universal resource identifier (URI) may be sent to the server computer over the network, where the URI indicates a graphical data flow program (GDFP) or a GDFP execution engine for executing the GDFP. In other words, the GDFP may require the GDFP execution engine to execute. Method elements 502 and 604 may be performed together, e.g., the user of the client computer may click on a link or may otherwise indicate the URI, which may automatically invoke the connection with the server computer.

In 606, the GDFP execution engine may be received from the server computer over the network in response to the URI. In one embodiment, the GDFP is a pre-existing GDFP, where the GDFP execution engine is associated with the pre-existing GDFP, and where the URI specifies the pre-existing GDFP, thereby also indicating the associated GDFP execution engine, as discussed above with respect to the GDFP editor, where, for example, the GDFP may also be received from the server computer in response to the URI (along with the GDFP execution engine), or alternatively, in embodiments where the GDFP is not a pre-existing GDFP, the URI may specify the GDFP execution engine, and the GDFP execution engine may be executable in the web browser to receive user input specifying creation of the GDFP, and create the GDFP in response to the user input, i.e., the execution engine may include or be associated with (and received with) a GDFP editor.

In 608, the GDFP may be executed in a web browser via the GDFP execution engine. In other words, the GDFP execution engine may execute the GDFP within the web browser. In one embodiment, the method may include receiving user input to the web browser invoking execution of the GDFP, and the GDFP may be executed in the browser in response to the received user input.

In one embodiment, e.g., where the GDFP is not pre-existing, and the user creates the program, the method may include sending the (created) GDFP to the server computer for compilation, and receiving an executable for the GDFP from the server computer (e.g., generated via compilation on the server computer). Thus, after compilation, the server may send the resulting executable back for execution, e.g., at the request of the user via the web browser, or automatically. Alternatively, the GDFP execution engine may further include a compiler, e.g., as part of a GDFP development environment downloaded with the GDFP execution engine, and the GDFP (in the form of graphical source code) may be compiled to create the executable. Thus, executing the GDFP in the web browser may include the GDFP execution engine executing the executable of the GDFP in the web browser.

As described above with respect to the methods of FIGS. 5A and 5B, in other embodiments, the GDFP execution engine is or includes an interpreter, and executing the GDFP in the web browser may include the GDFP execution engine interpreting the GDFP, and so rather than compiling the graphical source code of the GDFP to generate an executable, the GDFP execution engine may interpret the (graphical source code of the) GDFP at runtime, i.e., making a compiler unnecessary.

In 610, an indication of executing the GDFP may be displayed in the web browser. For example, output from the program may be displayed in the web browser, e.g., in a GUI, e.g., front panel, of the GDFP. More generally, a graphical user interface (GUI) of the GDFP may be displayed in the web browser on a display, where the GUI may be configured to display results of the GDFP execution, or receive user input specifying input to the GDFP. For example, in embodiments where the GDFP is a LabVIEW graphical program (also referred to as a virtual instrument (VI)), the GUI may be a front panel with one or more controls and indicators for interacting with the program. For example, the front panel may be displayed in a window of the web browser, and may be display output from and/or receive user input to the GDFP.

Further Embodiments

In some embodiments, depending on the application, the GDFP may utilize other resources on the client computer, or networked to the client computer, to perform its specified functionality. For example, executing the GDFP in a web browser via the GDFP execution engine may include accessing one or more web services over the network, or invoking execution of one or more programs or subprograms on other devices over the network. Examples of such resources may include data sources for the program, e.g., data servers, libraries (possibly stored remotely), data or program repositories, sensors, actuators, logs, and so forth, among others. The GDFP may be executable in the web browser via the GDFP execution engine to communicate with the embedded device via shared variables, or web services, among other communication means. As noted above, the GDFP may comprise a plurality of interconnected nodes that visually indicate the functionality of the program.

In one embodiment, receiving the GDFP from the server computer may include receiving the GDFP graphical source code and an executable of the GDFP program. The GDFP, the GDFP execution engine may then execute the executable of the GDFP; and the graphical source code of the GDFP may be displayed in the web browser on a display.

As with the above methods, the GDFP execution engine may be configured to execute in a sandbox. As also described above in detail, in some embodiments, the sandbox may be implemented by a plugin, and so executing the GDFP in the sandbox may include the GDFP execution engine executing the GDFP in or via the plugin.

In one embodiment, the GDFP may be embedded in a web page, where the URI references the web page, thereby indicating the GDFP, and where receiving the GDFP execution engine from the server includes receiving the web page from the server over the network, including the GDFP and the GDFP execution engine. Executing the GDFP in a web browser via the GDFP execution engine may include displaying the web page on a display, and displaying results of executing the GDFP in the web page on the display. Similarly, user input to the GDFP may include receiving user input to the web page.

Thus, a developer may create the GDFP conventionally (via the standard development environment), or via any of the web browser-based techniques disclosed herein, e.g., where the development environment is retrieved from a server, e.g., via a URI. The user may embed the graphical data flow program code via a webpage editor that may or may not be a part of the development environment, and may upload the webpage (file) to the server or functional equivalent (e.g., a networked device operable to store or host the webpage and an execution engine). Subsequently, a user may access the server and request the webpage, e.g., via a URI, and the server may provide the web page to the user's computer, including the embedded graphical data flow program, and an execution engine for executing the embedded graphical data flow program. The user may view the webpage and execute the graphical data flow program in a web browser (see, e.g., item 2 above). This technique may be particularly useful for presenting demo software to prospective customers.

The GDFP execution engine may be or include a GDFP player, and executing the GDFP in a web browser via the GDFP execution engine may include executing the GDFP in a web browser via the GDFP player. In one embodiment, the player is a program that provides for navigation and control functions such as Run, Stop, Open Diagram (program) (perhaps in another browser window), Rate (e.g., thumbs up/down), and, in some embodiments, additional information such as common branding (e.g., "Built with LabVIEW"). In another embodiment, the play may also provide references to similar programs (e.g., VIs), e.g., once the execution is complete. A player may not provide a secure execution environment, and thus is distinct from a sandbox.

By putting these functionalities in the player the users program may be much simpler. Two exemplary use scenarios are now described:

(1) Programs may be compiled into controls that can be embedded in a web page. For example, if a user makes a program that is a simulation of an inverted pendulum then that (web application) program can be embedded on a web page directly, in which case it will have none of the extra functions disclosed above. This approach (where a player is not used) may be particularly useful when embedded on a thin client for machine control. Alternatively a player may be embedded in the web page as a frame, and the simulation may in turn be embedded in the player, in which case the user gets all the community benefits of the functions described above with no additional work required.

(2) Programs that are not compiled into controls that can be directly embedded into a webpage (e.g., simple subroutines, or classes). The user may want to present a simple subroutine program. Since that program is not compiled into a component that can be directly embedded in the web page, the player provides a minimal shell that can invoke the user's program.

In one embodiment, the GDFP (e.g., possibly with the GDFP execution engine) may be or include a graphical dataflow web application for analysis and visualization of webhosted data. Thus, for example, multiple instances of the GDFP and execution engine may be downloaded to multiple client computers (executing respective web browsers), along with respective portions of a web-hosted data set, and may be executed in the respective web browsers of the client computers to analyze and/or visualize the data and/or results from the analysis. The analysis results may be transmitted back to the server (or another device) for storage and/or provision to the other client computers. Further details regarding such distributed analysis of data is described below with reference to FIGS. 18A and 18B.

Figure 6B:
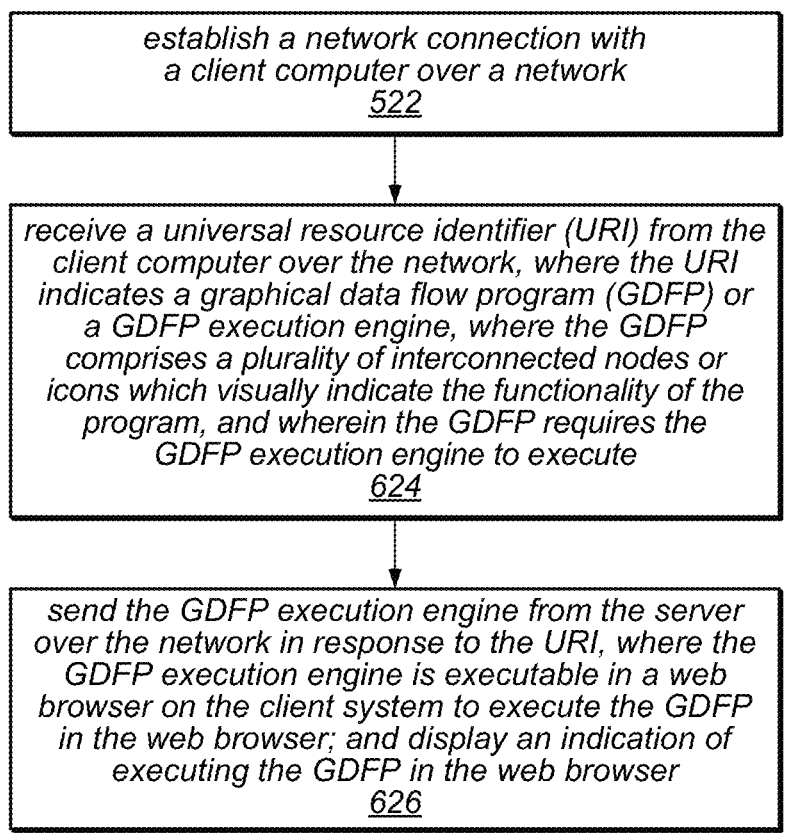

FIG. 6B—Flowchart of a Method for Editing a Graphical Program over a Network Via a Web Browser—Server Side FIG. 6B is a flowchart diagram illustrating one embodiment of a method for executing a graphical program a web browser, but from the perspective of a server computer, e.g., computer 90, or another computer. The method shown in FIG. 6B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network, as described above with reference to the method of FIG. 5B.

In 624, a universal resource identifier (URI) may be received from the client computer over the network, where the URI indicates a graphical data flow program (GDFP) or a GDFP execution engine for executing the GDFP, where method elements 522 and 624 may be performed together, e.g., the user of the client computer may click on a link or may otherwise indicate the URI, which may automatically invoke the connection with the server computer (or not). As noted above, the GDFP may include a plurality of interconnected nodes or icons which visually indicate the functionality of the program, and may require the GDFP execution engine to execute.

In 626, the GDFP execution engine may be sent to the client computer over the network in response to the URI. As described above, the GDFP execution engine may be executable in a web browser. As also described above, the GDFP execution engine may be configured to execute in a sandbox, e.g., a secure execution environment, possibly implemented as or by a plugin.

Moreover, as further described above, in various embodiments, the method (performed on or by program instructions executing on the server computer) may include sending the GDFP to the client computer, which may include sending graphical source code for the GDFP and/or sending an executable of the GDFP to the client computer, or, in embodiments where the GDFP is embedded in a web page, may include sending the web page to the client computer.

The nature and operation of the GDFP execution engine according to various embodiments are described above with reference to FIG. 6A, where, executing the GDFP in the web browser includes displaying an indication of executing the GDFP in the web browser. Moreover, any of the features and techniques described above with respect to the methods of FIGS. 5A and 5B (regarding the GDFP editor) may be applied to the GDFP execution engine-related methods of FIGS. 6A and 6B, as noted above. More generally, any of the features and techniques disclosed herein may be used with respect to any of the methods described herein.

Figure 7A:
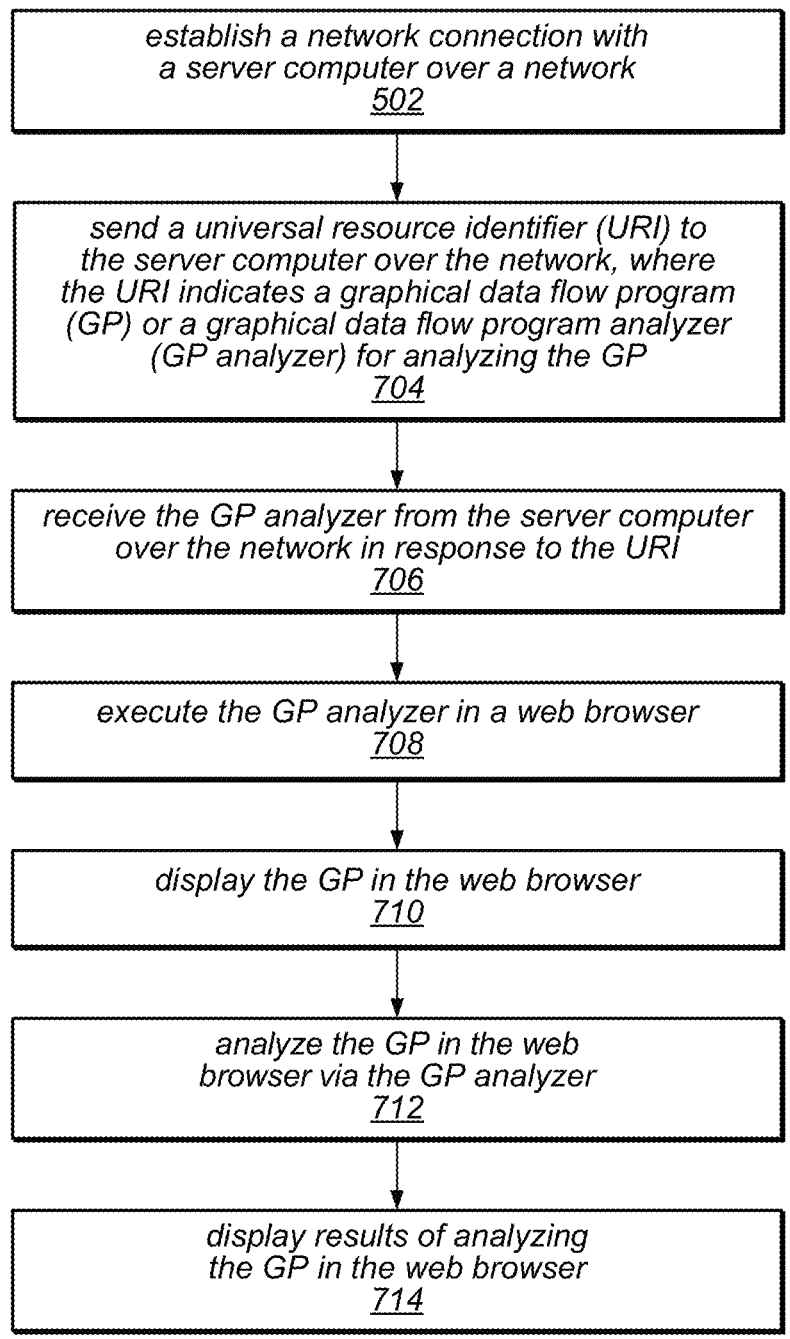
FIGS. 7A and 7B are flowchart diagrams illustrating embodiments of a method for statically analyzing a graphical program over a network via a web browser.

FIG. 7A—Flowchart of a Method for Statically Analyzing a Graphical Program Over a Network Via a Web Browser—Client Side FIG. 7A is a flowchart diagram illustrating one embodiment of a method for statically analyzing (i.e., at edit (or compile) time) a graphical program (GP) via a web browser, from the perspective of a client computer, e.g., computer 82, or another computer. The method shown in FIG. 7A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer over a network, e.g., a user may open a web browser and direct the browser to the server computer.

In 704, a universal resource identifier (URI) may be sent to the server computer over the network, where the URI indicates a GP or a graphical program analyzer or debugger for analyzing GPs, which in some embodiments may be or include an editor (GP editor) for creating, editing, and analyzing the GP. Similar to above, method elements 502 and 704 may (or may not) be performed together, e.g., the user of the client computer may click on a link or may otherwise indicate the URI, which may automatically invoke the connection with the server computer.

In 706, the GP analyzer may be received from the server computer over the network in response to the URI. The GP may be a pre-existing GP, where the GP analyzer is associated with the pre-existing GP, and where the URI specifies the pre-existing GP, thereby also indicating the associated GP analyzer. In this embodiment, the GP may also be received from the server computer in response to the URI. Alternatively, in embodiments where the GP is not a pre-existing GP, the URI may specify the GP analyzer, which, as indicated above, may be or include a GP editor, and the GP analyzer may be executable in the web browser to receive user input specifying creation of the GP, and create and edit the GP in response to the user input.

In 708, the GP analyzer may be executed in a web browser, e.g., in a sandbox, i.e., a secure execution environment. Executing the GP analyzer in the web browser may thus occur in the sandbox, thus preventing interference from or interfering with other programs executing on the (client) computer. As described above in detail, in some embodiments, the sandbox may be implemented by a plugin, and so executing the GDFP in the sandbox may include the GDFP execution engine executing the GDFP in or via the plugin. Note that in some embodiments, the analyzer may be executed within the web browser as part of editor functionality, e.g., as part of the editing or development process.

In 710, the GP may be displayed in the web browser, e.g., via the GP analyzer, where the GP comprises a plurality of interconnected nodes or icons which visually indicate the functionality of the program. For example, a GUI, e.g., a window, may be displayed in the web browser, and the GP may be displayed in the GUI. Note that in embodiments where the GP analyzer includes a GP editor, the GP may be displayed in an editor window in the web browser. An exemplary graphical program is illustrated in FIG. 21.

In some embodiments, the graphical program may be or include a graphical data flow program (GDFP), i.e., may have an architecture and behavior in accordance with a data flow model of computation. Accordingly, in such embodiments, the analyzer may be or include a graphical data flow program analyzer (and/or editor).

In 712, the GP may be analyzed in the web browser via the GP analyzer, and results of analyzing the GP may be displayed in the web browser, as indicated in 714. For example, the GP analyzer may analyze the GP graphical source code, including, for example, performing type propagation in the GP, constant folding in the GP, validation of coding conventions, or complexity analysis, among other aspects of the GP graphical source code.

Figure 7B:
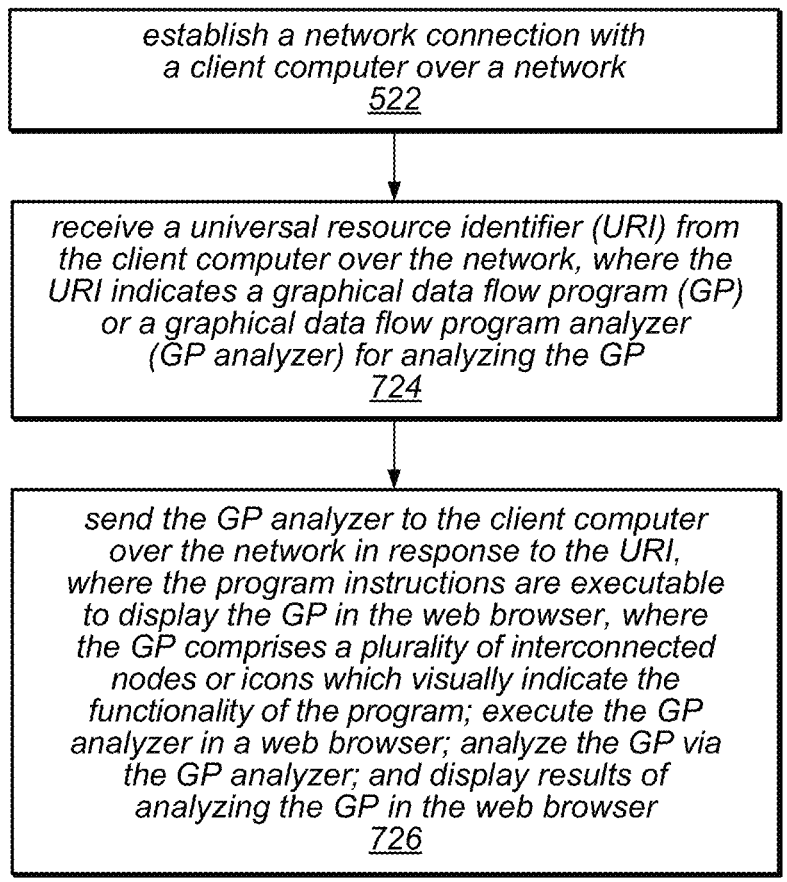

It should be noted that in the method of FIGS. 7A and 7B, the analysis referred to is static analysis, e.g., performed at edit and/or compile time. In other words, the analysis may be performed on or with respect to the source code of the GP, not with respect to its behavior during execution, referred to as dynamic analysis, which is discussed below with reference to FIGS. 8A and 8B. Similar to the display of the GP itself (710), the analysis results may be displayed in a GUI, e.g., a window, in the web browser.

In various embodiments, the results of analyzing the GP may be stored locally, and/or may be sent to the server or another device over the network for storage, analysis, or use by other users.

Further Embodiments

As noted above, in some embodiments, the GP analyzer may be or include a GP editor. The GP editor may be executable in the web browser to display the GP in the web browser, receive user input to the GP editor executing in the web browser, where the user input indicates one or more edit operations to be performed on the GP, and edit the GP in the web browser in accordance with the one or more edit operations, thereby generating an edited GP, which may be displayed in the web browser. The GP editor/analyzer may analyze the edited GP. The editing and analyzing may be performed multiple times in an iterative manner, e.g., to debug the program. Analysis results may be transmitted back to the server (or another device) for storage and/or provision to the other client computers.

In one embodiment, receiving the GP analyzer from the server computer over the network may include receiving a GP execution engine from the server computer over the network, i.e., the GP analyzer may also be or include a GP execution engine. The method may include sending the edited GP to the server computer for compilation, in response to which an executable for the GP may be received from the server computer, and the executable of the edited GP may be executed in the web browser via the GP execution engine.

Alternatively, the GP analyzer may be included in a graphical program development environment (GPDE), and receiving the GP analyzer from the server computer over the network may include receiving the GPDE from the server computer over the network, where the GPDE includes a GDFP compiler and a GP execution engine (e.g., and a GP editor). The GP compiler may be executable in the web browser to compile the edited GP in the web browser, thereby generating an executable of the edited GP, and the GP execution engine may execute the executable of the edited GP in the web browser.

Alternatively, in some embodiments, the GPDE or GP execution engine is or includes an interpreter, and executing the GP (and/or the edited GP) in the web browser includes the GP execution engine interpreting the GP (and/or the edited GP).

FIG. 7B—Flowchart of a Method for Statically Analyzing a Graphical Program Over a Network Via a Web Browser—Server Side FIG. 7B is a flowchart diagram illustrating one embodiment of a method for statically analyzing a graphical program over a network via a web browser, from the perspective of a server computer, e.g., computer 90, or another computer. The method shown in FIG. 7B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network, and in 724, a universal resource identifier (URI) may be received from the client computer over the network, where the URI indicates a graphical program (GP) or a graphical program analyzer (GP analyzer) for creating or editing the GP, where, as noted above, the GP may comprise a plurality of interconnected nodes or icons which visually indicate the functionality of the program. Note that in some embodiments, method elements 522 and 724 may be performed together. For example, the user of the client computer may click on a link or may otherwise indicate the URI, which may automatically invoke the connection with the server computer.

In 726, the GP analyzer may be sent to the client computer over the network in response to the URI. As described above, the GP analyzer may be executable in a web browser to statically analyze a graphical program.

The nature and operation of the GP analyzer according to various embodiments are described above with reference to FIG. 7A. For example, as described above, the GP analyzer may be configured to execute in a sandbox, i.e., a secure execution environment, possibly implemented by a plugin, and so analyzing the GDFP in the sandbox may include the GDFP analyzer analyzing the GDFP in or via the plugin. Moreover, as also discussed above, in various embodiments, the method (performed on or by program instructions executing on the server computer) may include sending the GP to the client computer, which may include sending graphical source code for the GP and/or sending a GP editor, compiler, and/or execution engine (which may be or include an interpreter), to the client computer; or, in embodiments where the GP is edited on the client side, the method (performed by program instructions executed on or by the server computer) may receive and compile the edited GP, and send an executable back to the client computer for execution in the browser. As further described above, the server computer may also receive analysis results from the client computer over the network, e.g., for storage, analysis, or use by other users, as desired.

Thus, in one embodiment, a user may open a browser and access a URI at a server, where the URI may reference the graphical program editor (with no existing graphical program), or the URI may reference a previously created graphical program, e.g., a graphical data flow program, along with its editor (or development environment. The server may provide a graphical program development environment (GPDE), e.g., a graphical data flow program development environment, including a graphical program editor whereby the user can create or edit a graphical program in the browser, and possibly an execution system for executing the program. The editor may thus be fully brought client side and run locally, e.g., a sandbox, e.g., a plugin, on the client.

Thus, for a graphical program being created/edited in a web browser, the analyzer, or suitably functional editor, may perform various edit time (and/or compile time) analyses, including any of various types of internal analysis of the graphical program desired. Further embodiments and details regarding functions and attributes of the server computer and its software are described above with respect to the method of FIG. 7A, and which are not repeated here for brevity, since the server side method may be considered to be complementary to the client side method, as is the case with all the methods disclosed herein.

Figure 8A:
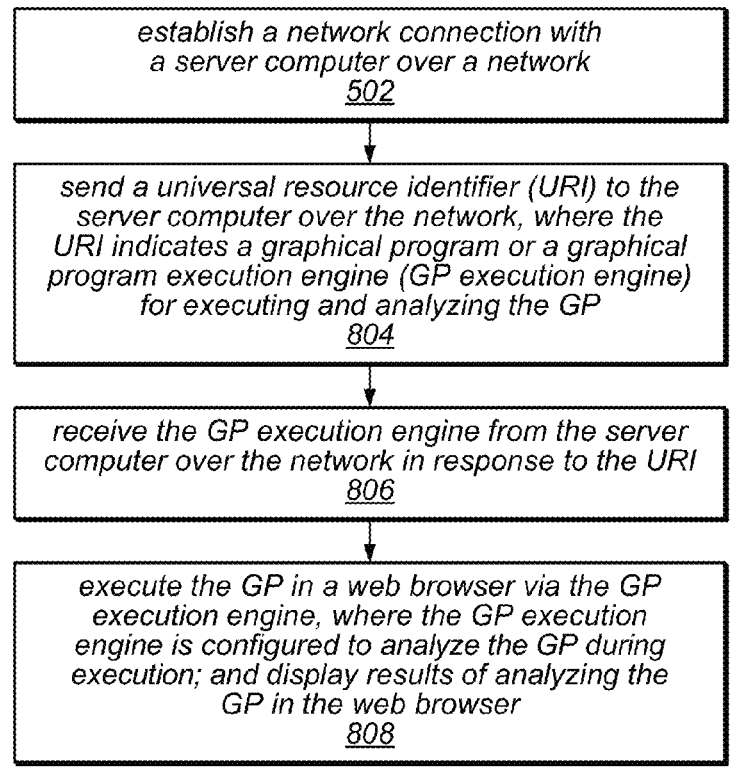
FIGS. 8A and 8B are flowchart diagrams illustrating embodiments of a method for executing and dynamically analyzing a graphical program over a network via a web browser.

FIG. 8A—Flowchart of a Method for Dynamically Analyzing a Graphical Program in a Web Browser FIG. 8A is a flowchart diagram illustrating one embodiment of a method for executing and dynamically analyzing a graphical program over a network via a web browser, from the perspective of a client computer, e.g., computer 82, or another computer. The method shown in FIG. 8A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer over a network, e.g., a user may open a web browser and direct the browser to the server computer.

In 804, a universal resource identifier (URI) may be sent to the server computer over the network, where the URI indicates a graphical program (GP) or a GP execution engine for executing and analyzing the (executing) GP, i.e., dynamically. In other words, the GP may require the GP execution engine to execute, and may be dynamically analyzed via the GP execution engine. Thus, the GP execution engine may be or include a GP dynamic analyzer. Method elements 502 and 804 may be performed together, e.g., the user of the client computer may click on a link or may otherwise indicate the URI, which may automatically invoke the connection with the server computer. As with methods 7A and 7B above, the GP may include a plurality of interconnected nodes that visually indicate functionality of the program, and in some embodiments, may be or include a graphical data flow program, i.e., may have an architecture and behavior in accordance with a data flow model of computation, although any other types of graphical programs may be used as desired.

In 806, the GP execution engine may be received from the server computer over the network in response to the URI. In one embodiment, the GP is a pre-existing GP, where the GP execution engine is associated with the pre-existing GP, and where the URI specifies the pre-existing GP, thereby also indicating the associated GP execution engine, similar to the method of FIGS. 6A and 6B, where, for example, the GP may also be received from the server computer in response to the URI, or alternatively, in embodiments where the GP is not a pre-existing GP, the URI may specify the GP execution engine, and the GP execution engine may be executable in the web browser to receive user input specifying creation of the GP, and create (and edit) the GP in response to the user input, i.e., the execution engine may include or be associated with a GP editor (and in some embodiments, a GP compiler or interpreter).

In 808, the GP may be executed and dynamically analyzed in a web browser via the GP execution engine, i.e., the GP execution engine may analyze the GP during execution. In other words, the GP execution engine may execute the GP within the web browser, and analyze the GP during execution, e.g., dynamically. Analyzing the GP during execution may include analyzing one or more of: performance of the executing GP, usability of the executing GP, execution speed of the GP, numerical overflow and underflow during execution of the GP, code coverage of the GP, utilization of multiple cores in executing the GP, or exceptions raised by subcomponents of the GP, among other aspects of the GP execution. In one embodiment, the method may include receiving user input to the web browser invoking execution of the GP, and the GP may be executed and dynamically analyzed in the browser in response to the received user input.

In 810, results of analyzing the GP may be displayed in the web browser. For example, output from dynamically analyzing the program may be displayed in a GUI displayed in the web browser. The analysis results may be stored locally, and/or may be transmitted back to the server (or another device) for storage and/or provision to the other client computers.

Further Embodiments

As with the above-described methods, in some embodiments, the GP is a pre-existing GP, e.g., stored on the server computer (or on a computer coupled to the server computer). The GP execution engine/dynamic analyzer may be associated with the pre-existing GP. The URI may specify the pre-existing GP, thereby also indicating the associated GP execution engine/dynamic analyzer, and the GP may be received from the server computer in response to the URI, e.g., in 806, along with the GP execution engine.

In one embodiment, receiving the GP from the server computer may include receiving the GP graphical source code and an executable of the GP program. The GP execution engine may then execute the executable of the GP; and the graphical source code of the GP may be displayed in the web browser on a display. Alternatively, the GP execution engine may further include a GP editor and/or compiler, e.g., as part of a GP development environment downloaded with the GP execution engine, and the GP graphical source code may be edited (and displayed) via the GP editor, and/or compiled to create the executable.

In embodiments where the GP is not a pre-existing GP, the URI may specify the GP execution engine (which may include the GP editor), the GP editor may be executable in the web browser to receive user input specifying creation of the GP, and to create the GP in response to the user input.

More generally, the GP execution engine may include a GP editor that is executable in the web browser to display the GP in the web browser, receive user input to the GP editor (e.g., the GP execution engine operating as a GP editor) executing in the web browser, where the user input indicates one or more edit operations to be performed on the GP, and to edit the GP in the web browser in accordance with the one or more edit operations, thereby generating an edited GP. The edited GP source code may be displayed in the web browser, and the GP execution engine may compile, execute, and analyze (and possibly optimize) the edited GP in the web browser.

Alternatively, the edited GP may be sent to the server computer for compilation, and an executable for the GP may be received from the server computer. The GP execution engine may be configured to execute and analyze the executable of the edited GP in the web browser.

Alternatively, in some embodiments, the GPDE or GP execution engine may be or include an interpreter, and executing the GP in the web browser may include the GP execution engine interpreting the GP.

As with the above methods, the GP execution engine may be configured to execute in a sandbox, e.g., implemented as or by a plugin, i.e., the GP execution engine may execute the GP in the sandbox.

Figure 8B:
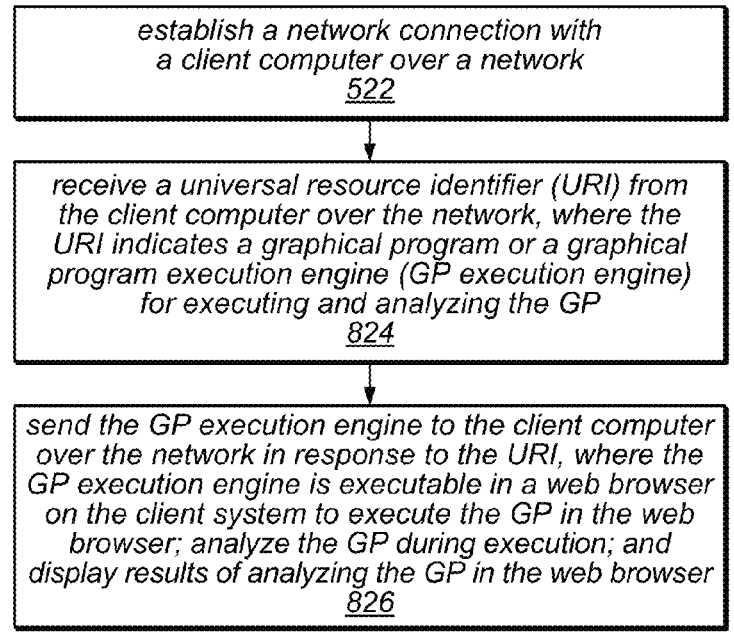

FIG. 8B—Flowchart of a Method for Dynamically Analyzing a Graphical Program Over a Network Via a Web Browser—Server Side FIG. 8B is a flowchart diagram illustrating one embodiment of a method for executing and dynamically analyzing a graphical program a web browser, but from the perspective of a server computer, e.g., computer 90, or another computer. The method shown in FIG. 8B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network.

In 824, a universal resource identifier (URI) may be received from the client computer over the network, where the URI indicates a graphical program (GP) or a GP execution engine for executing the GP, where method elements 522 and 824 may be performed together, e.g., the user of the client computer may click on a link or may otherwise indicate the URI, which may automatically invoke the connection with the server computer (or not). As noted above, the GP may include a plurality of interconnected nodes or icons which visually indicate the functionality of the program, and may require the GP execution engine to execute. In some embodiments, the graphical program may be or include a graphical data flow program.

In 826, the GP execution engine may be sent to the client computer over the network in response to the URI. As described above, the GP execution engine may be executable in a web browser, and may be configured to execute in a sandbox, e.g., a secure execution environment, which in some embodiments may be implemented as or by a plugin. For example, as indicated above, in embodiments where the GP is a pre-existing GP, the GP execution engine may be associated with the pre-existing GP, and the URI may specify the pre-existing GP, thereby also indicating the associated GP execution engine, in which case the GP may be sent to the client computer in response to the URI. Alternatively, in embodiments where the GP is not a pre-existing GP, the URI may specify the GP execution engine, which may include a GP editor executable in the web browser to receive user input specifying creation of the GP, and create the GP in response to the user input.

As also indicated above, in some embodiments, the created GP may be received from the client computer over the network, and compiled to generate an executable of the GP, which may be sent to the client computer over the network. Alternatively, the GP execution engine may include a compiler that is executable in the web browser to compile the created GP in the web browser (on the client computer), thereby generating an executable of the created GP, where the GP execution engine being executable in the web browser to execute the GP includes the GP execution engine being executable in the web browser to execute the executable of the created GP. Alternatively, as described above, in some embodiments, the GPDE or GP execution engine may be or include an interpreter, and so executing the GP in the web browser may include the GP execution engine interpreting the GP.

Operation of the GP execution engine according to various embodiments is described above with reference to FIG. 8A, where, executing the GP in the web browser includes the GP execution engine dynamically analyzing the GP in the web browser, and displaying results of analyzing the GP in the web browser. For example, the GP execution engine may include a GP editor executable in the web browser to display the GP in the web browser (where the GP comprises a plurality of interconnected nodes or icons which visually indicate the functionality of the program), receive user input to the GP editor executing in the web browser, where the user input indicates one or more edit operations to be performed on the GP, edit the GP in the web browser in accordance with the one or more edit operations, thereby generating an edited GP, and display the edited GP source code in the web browser. The GP execution engine may be further executable in the web browser to compile, execute, and analyze (and possibly optimize) the edited GP, or, alternatively, the method may include receiving the edited GP from the client computer for compilation, compiling the edited GP, thereby generating an executable for the GP, and sending the executable for the GP to the client computer. The GP execution engine may be configured to execute and analyze the executable of the edited GP in the web browser. Alternatively, as noted above, in some embodiments, the GPDE or GP execution engine may be or include an interpreter, and executing the GP in the web browser may include the GP execution engine interpreting the GP, thus rendering compilation unnecessary.

Further embodiments and details regarding functions and attributes of the server computer and its software are described above with respect to the method of FIG. 8A, and which are not repeated here for brevity, since the server side method may be considered to be complementary to the client side method, as is the case with all the methods disclosed herein.

Figure 9A:
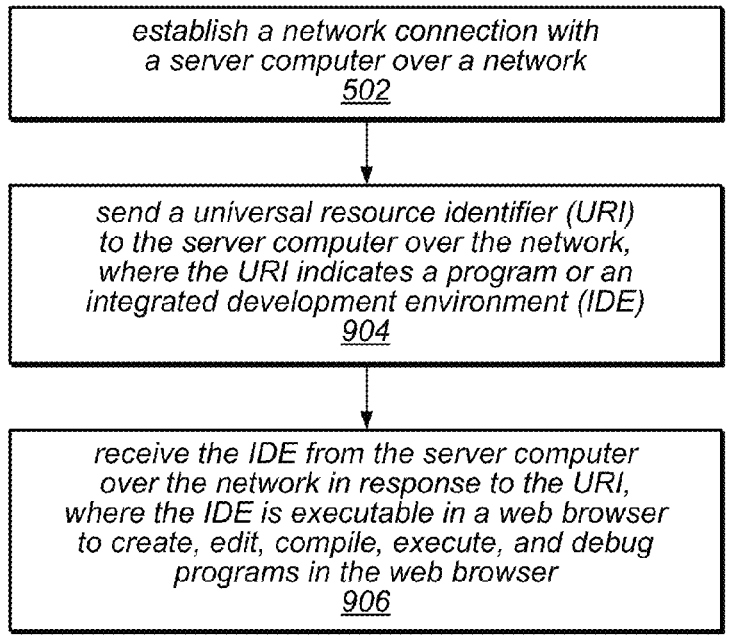
FIGS. 9A and 9B are flowchart diagrams illustrating embodiments of a method for developing a program over a network via a web browser.
Figure 9B:
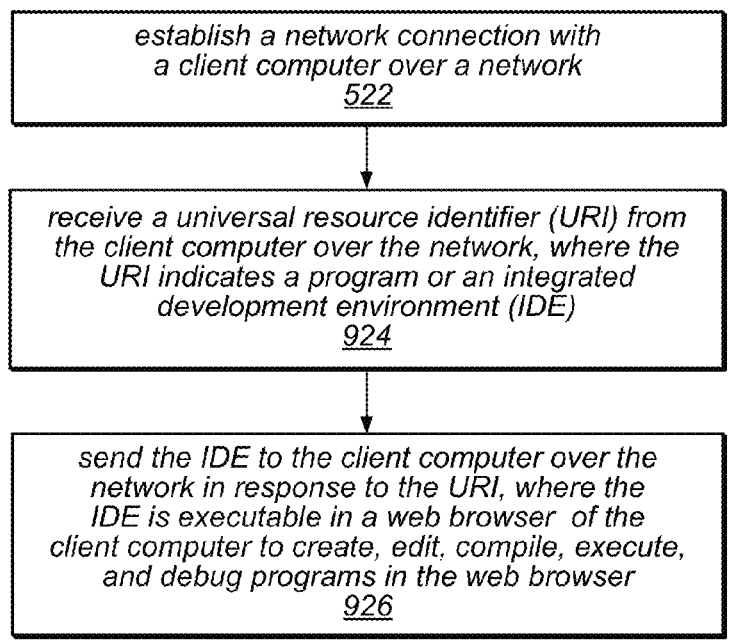

In some embodiments, a more general method of client side web hosted program development may be implemented, e.g., utilizing a client side web hosted program development environment, as described with respect to FIGS. 9A and 9B.

FIG. 9A—Flowchart of a Method for Developing a Program in a Web-Hosted Program Development Environment—Client Side FIG. 9A is a flowchart diagram illustrating one embodiment of a method for developing a program over a network via a web browser, from the perspective of a client computer, e.g., computer 82, or another computer. The method shown in FIG. 9A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer over a network, as described above.

In 904, a universal resource identifier (URI) may be sent to the server computer over the network, where the URI indicates a program or an integrated development environment (IDE).

In 906, the IDE may be received from the server computer over the network in response to the URI. The IDE may be executable in a web browser to create, edit, compile or interpret, execute, and debug (and possibly optimize) programs in the web browser, via any of the techniques described herein, as applied more generally to programs that may textual, graphical, data flow, and/or graphical data flow programs, as desired. Thus, in some embodiments, the program may be or include a graphical program (GP), and the IDE may be or include a graphical program development environment (GPDE). In other embodiments, the graphical program may be or include a graphical data flow program (GDFP), and the IDE may be a graphical data flow program development environment (GDFPDE). The IDE may include an editor, edit-time analyzer, compiler, execution engine (which may be or include an interpreter), and/or dynamic analyzer/debugger, and thus, may be referred to as an editor, a static analyzer, a compiler, an execution engine (and/or interpreter), and/or a dynamic analyzer or debugger, depending on the functionality being considered. In some embodiments, the IDE may be further executable to automatically parallelize one or more portions of the graphical program in response to analyzing the program, and/or otherwise optimize the program.

Further Embodiments

In one embodiment, the program is a pre-existing program, where the IDE is associated with the pre-existing program, and where the URI specifies the pre-existing program, thereby also indicating the associated IDE, where, for example, the program may also be received from the server computer in response to the URI, or alternatively, in embodiments where the program is not a pre-existing program, the URI may specify the IDE, and the IDE may be executable in the web browser to receive user input specifying creation of the program, and create (and edit) the program in response to the user input.

As with the above methods, the IDE may be configured to execute in a sandbox, i.e., a secure execution environment, possibly implemented by a plugin, and so creating, editing, compiling or interpreting, executing, and debugging programs in the web browser may include editing, compiling or interpreting, executing, and debugging programs in or by the plugin.

The IDE may be executable in the web browser to perform various functions for developing the program. For example, in one embodiment, the IDE is executable in the web browser to display the program in the web browser, receive user input indicating one or more edit operations to be performed on the program, edit the program in the web browser in accordance with the one or more edit operations, thereby generating an edited program, display the edited program (e.g., edited source code) in the web browser, and compile or interpret, execute, and analyze (and possibly optimize) the edited program.

Note that in various embodiments, the IDE may be configured to statically analyze the program at edit time, and/or to dynamically analyze the program at run time, i.e., during execution.

FIG. 9B—Flowchart of a Method for Developing a Program in a Web-Hosted Program Development Environment—Server Side FIG. 9B is a flowchart diagram illustrating one embodiment of a method for developing a program over a network via a web browser, but from the perspective of a server computer, e.g., computer 90, or another computer. The method shown in FIG. 9B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network.

In 924, a universal resource identifier (URI) may be received from the client computer over the network, where the URI indicates a program or an IDE, where method elements 522 and 924 may or may not be performed together.

In 926, the IDE may be sent to the client computer over the network in response to the URI. As described above, the IDE may be executable in a web browser (e.g., in a sandbox, possibly implemented as a plugin). As also described above with reference to FIG. 9A, the IDE may be executable in a web browser of the client computer to create, edit, compile or interpret, execute, and/or analyze/debug (and possibly optimize) programs in the web browser. For example, similar to the methods described above, in embodiments where the program is a pre-existing program, the IDE may be associated with the pre-existing program, and the URI may specify the pre-existing program, thereby also indicating the associated IDE, and the program may be sent to the client computer in response to the URI. Alternatively, in embodiments where the program is not a pre-existing program, the URI may specify the IDE, and the IDE may be executable in the web browser to receive user input specifying creation of the program, and create the program in response to the user input.

Further details of the nature and operation of the IDE are disclosed above with reference to the method of FIG. 9A.

Thus, an integrated development environment may be provided that is fully client side and web hosted, with editing, debugging and compilation or interpretation capabilities. In other words, the IDE may be deployed as a fully client side web hosted application, and may implement any of the features and techniques disclosed herein. Moreover, the server computer may include program instructions implementing any of the server-side methods and functions disclosed herein.

Hosting a Graphical Program Execution Engine on an Embedded Device

In some embodiments, various of the above techniques may also be utilized with respect to embedded devices, as described below with reference to FIGS. 10A and 10B, and 11A and 11B. More specifically, methods may be directed to hosting a graphical program/execution system (GPES) or development environment (GPDE) in or on an embedded device.

Figure 10A:
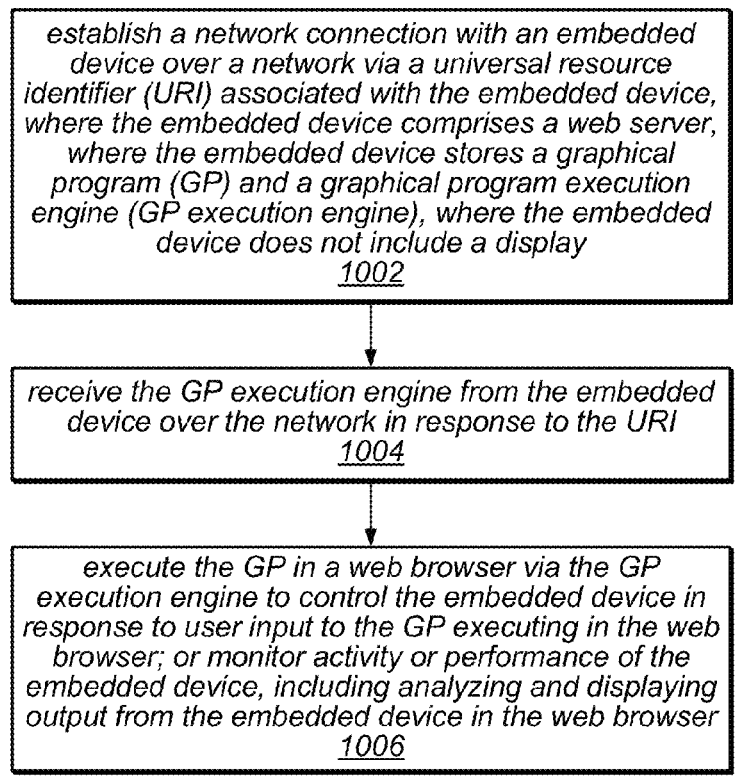
FIGS. 10A and 10B are flowchart diagrams illustrating embodiments of a method for monitoring or controlling an embedded device over a network via a web browser.

FIG. 10A—Flowchart of a Method for Monitoring or Controlling an Embedded Device—Client Side FIG. 10A is a flowchart diagram illustrating one embodiment of a method for monitoring or controlling an embedded device over a network via a web browser, from the perspective of a client computer, e.g., computer 82, or another computer. The method shown in FIG. 10A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1002, a network connection may be established with an embedded device over a network via a universal resource identifier (URI) associated with the embedded device, e.g., a user may open a web browser and direct the browser to the embedded device. The embedded device may store a graphical program (GP) and a graphical program execution engine (GPEE), where the GP requires the GPEE to execute.

In one embodiment, the URI specifies the GP, thereby also indicating the associated GPEE, while in another embodiment, the URI specifies the GPEE, and the associated GP is automatically indicated as a result. In yet another embodiment, the URI may simply specify the embedded device, and the GPEE and associated GP are automatically indicated via their association with the embedded device.

The embedded device may include a web server, e.g., may be configured to store and serve web pages and/or other web content over a network. The embedded device may include limited display capabilities, or may not even include a display, i.e., may be "headless", in that the device may not include a monitor or other display capabilities.

As noted above, the GP may include a plurality of interconnected nodes that visually indicate functionality of the program, and in some embodiments, the graphical program may be or include a graphical data flow program (GDFP), and the GP execution engine may be or include a graphical data flow program execution engine (GDFPEE), or a graphical data flow development environment (GDFDE). More generally, in some embodiments, the GP execution engine may be or be included in an interactive development environment (IDE), which may be executable in the web browser to create, edit, analyze/debug, compile or interpret, optimize, and/or execute the GP.

In 1004, the GP execution engine and the GP may be received from the embedded device over the network in response to the URI.

In 1006, the GP may be executed in a web browser via the GP execution engine to control the embedded device in response to user input to the GP executing in the web browser, or to monitor activity or performance of the embedded device, including analyzing and displaying output from the embedded device in the web browser, e.g., in a GUI displayed in the web browser. Note that in some embodiments, the development environment or GP execution engine may be or include an interpreter, and executing the GP in the web browser may include the GP execution engine interpreting the GP.

As with the above methods, the GP execution engine may be configured to execute in a sandbox. As also described above in detail, in some embodiments, the sandbox may be implemented by a plugin, and so executing the GP in the sandbox may include the GP execution engine executing the GP in or via the plugin.

Moreover, depending on the application, the GP may utilize other resources on the client computer, or networked to the client computer, to perform its specified functionality, e.g., executing the GP in a web browser via the GP execution engine may include accessing one or more web services over the network, or invoking execution of one or more programs or subprograms on other devices over the network. Examples of such resources may include data sources for the program, e.g., data servers, libraries (possibly stored remotely), data or program repositories, sensors, actuators, logs, and so forth, among others.

Summarizing the above, in one embodiment, a user can use a web browser to access a URI on the embedded device, which may cause the embedded device to provide a graphical program and an execution system to the user's browser. The graphical program may execute in the user's browser, where the graphical program execution enables the user to interact with (monitor or control) the embedded device in some fashion, e.g., through web services or shared variables; i.e., execution of the graphical program causes the graphical program to manipulate properties or settings of the device, e.g., may cause the device to begin acquiring data or supply acquired data, perform desired operations, etc.

Further Embodiments

In some embodiments, to monitor or control the embedded device in response to user input to the GP executing in the web browser, the GP may be executable to send commands to the embedded device over the network in response to the user input. The GP may be executable in the web browser via the GP execution engine to access one or more web services over the network, or to invoke execution of one or more programs or subprograms on other devices over the network. In one embodiment, the GP may be executable in the web browser via the GP execution engine to communicate with the embedded device via shared variables, or web services, among other communication means.

The embedded device itself may be coupled to one or more other devices over the network, and may be configured to perform a task using the one or more devices. The embedded device is configured to perform one or more of a measurement task, a control task, a simulation task, or an automation task, among others, as desired. Examples of measurement tasks contemplated include data acquisition, and data analysis, among others. In further embodiments, the embedded device may be configured to perform any tasks desired.

In some embodiments, executing the GP in a web browser via the GP execution engine includes displaying a graphical user interface (GUI) e.g., a front panel, of the GP in the web browser on a display, where the GUI is configured to display results of the GP execution, and/or receive user input specifying input to the GP.

Similar to the above described methods, in one embodiment, the GP may be embedded in a web page, where the URI references the web page, thereby indicating the GP. Thus, receiving the GP execution engine from the embedded device over the network in response to the URI may include receiving the web page from the embedded device over the network, including the GP and the GP execution engine. Executing the GP in a web browser via the GP execution engine may then include displaying the web page on a display, and displaying results of executing the GP in the web page on the display.

Additionally, in one embodiment, the embedded device may also store a graphical program editor/execution engine (GPEEE), and the method may include receiving the GPEEE from the embedded device over the network in response to the URI, and executing the GPEEE in the web browser to display the GP in the web browser, receive user input indicating one or more edit operations to be performed on the GP, edit the GP in the web browser in accordance with the one or more edit operations, thereby generating an edited GP, and display the edited GP source code in the web browser. Moreover, the GPEEE may be further executable in the web browser to compile or interpret, execute, and/or debug the edited GP in the web browser. The method may then further include deploying the edited GP to the embedded device, and the edited GP may be executable to perform updated one or more functions.

Subsequently, the edited GP may be downloadable from the embedded device and executable by client computers to control the embedded device in response to user input to the GP executing in web browsers of the client computers, or to monitor activity or performance of the embedded device, including analyzing and displaying output from the embedded device in the web browsers of the client computers.

Figure 10B:
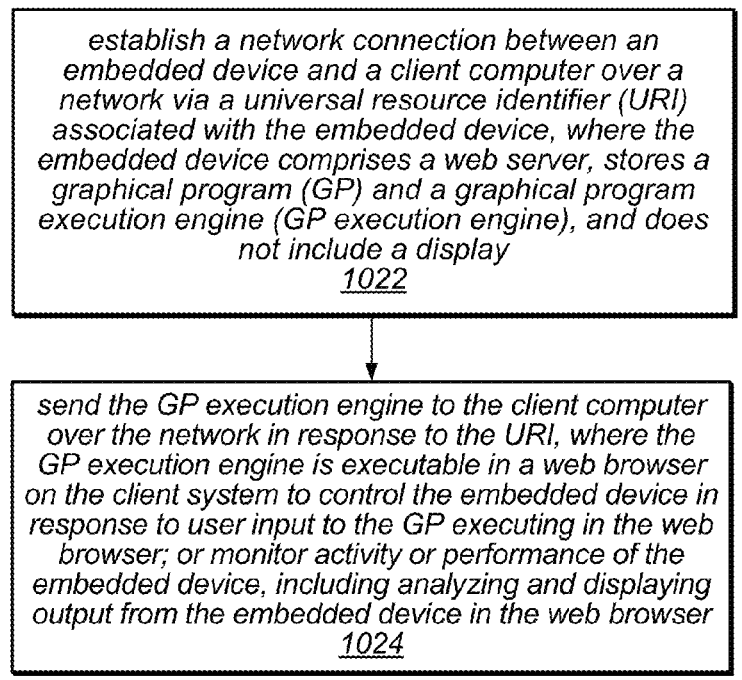

FIG. 10B—Flowchart of a Method for Monitoring or Controlling an Embedded Device—Embedded Device Side FIG. 10B is a flowchart diagram illustrating one embodiment of a method for monitoring or controlling an embedded device over a network via a web browser, from the perspective of an embedded device with web server functionality. The method shown in FIG. 10B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1022, a network connection may be established with a client computer over a network, i.e., between the client computer and the embedded device, via a universal resource identifier (URI) associated with the embedded device, e.g., the user of the client computer may click on a link or may otherwise indicate the URI, which may automatically invoke the connection with the embedded device (or not). As noted above, the GP may require the GP execution engine to execute, and may be executable by the embedded device to perform one or more functions.

Thus, the embedded device may store the graphical program (GP) and the GP execution engine for executing the GP, where the GP and the GP execution engine may be accessible to a client computer via a URI. For example, in one embodiment, the URI specifies the GP, thereby also indicating the associated GPEE, while in another embodiment, the URI specifies the GPEE, and the associated GP is automatically indicated as a result. In yet another embodiment, the URI may simply specify the embedded device, and the GPEE and associated GP are automatically indicated via their association with the embedded device.

The embedded device may include a web server, e.g., may be configured to store and serve web pages and/or other web content over a network. The embedded device may include limited display capabilities, or may not even include a display, i.e., may be "headless", in that the device may not include a monitor or other display capabilities.

As noted above, the GP may include a plurality of interconnected nodes that visually indicate functionality of the program, and in some embodiments, the graphical program may be or include a graphical data flow program (GDFP), and the GP execution engine may be or include a graphical data flow program execution engine (GDFPEE), or a graphical data flow development environment (GDFE). More generally, in some embodiments, the GP execution engine may be or be included in an interactive development environment (IDE), which may be executable in the web browser to create, edit, analyze/debug, compile or interpret, optimize, and/or execute the GP.

In 1026, the GP execution engine may be sent to the client computer over the network in response to the URI. As described above, the GP execution engine may be executable in a web browser to control the embedded device in response to user input to the GP executing in the web browser, and/or to monitor activity or performance of the embedded device, including analyzing and displaying output from the embedded device in the web browser. As also described above, the GP execution engine may be configured to execute in a sandbox, e.g., a secure execution environment, which may be implemented by or as a plugin.

Operation of the GP execution engine is described above with reference to FIG. 10A. Moreover, various of the above-described client side functionalities imply corresponding embedded device side functions. For example, in correspondence with the client computer sending commands to the embedded device over the network in response to the user input to control the embedded device, the method may include (the embedded device) receiving the commands, and configuring the embedded device to operate in accordance with the commands.

Further details of the nature and operation of the embedded device and related software are disclosed above with reference to the method of FIG. 10A.

Figure 11A:
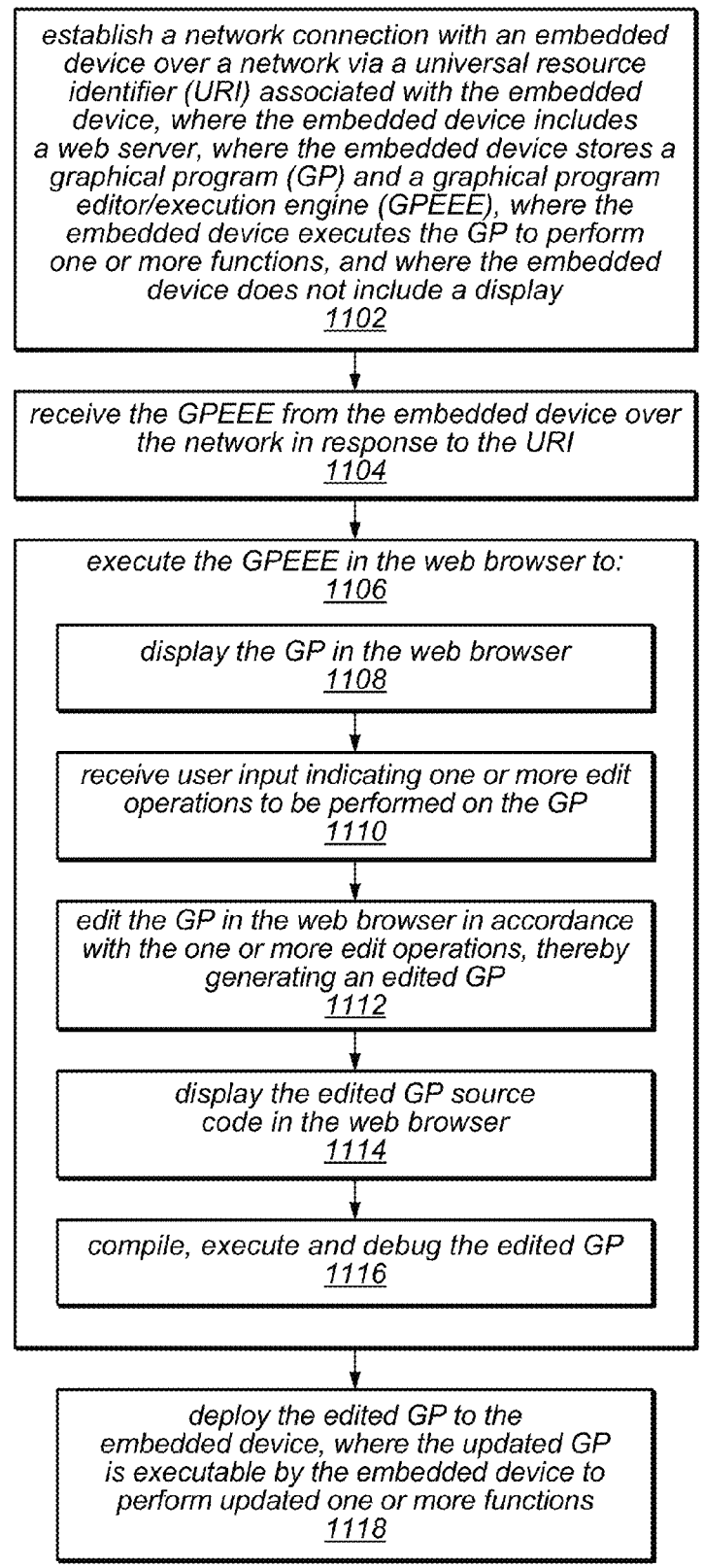
FIGS. 11A and 11B are flowchart diagrams illustrating embodiments of a method for updating an embedded device over a network via a web browser.

FIG. 11A—Flowchart of a Method for Updating an Embedded Device

FIG. 11A is a flowchart diagram illustrating one embodiment of a method for updating an embedded device over a network via a web browser, from the perspective of a client computer, e.g., computer 82, or another computer. The method shown in FIG. 11A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1102, a network connection may be established with an embedded device over a network via a universal resource identifier (URI) associated with the embedded device, e.g., a user may open a web browser and direct the browser to the embedded device. The embedded device may store a graphical program (GP) and a graphical program editor/execution engine (GPEEE).

The embedded device may be or include a web server, e.g., may be configured to store and serve web pages and/or other web content over a network, and may store a graphical program (GP), e.g., an embedded device application, that the embedded device executes to perform one or more functions, as well as a graphical program editor/execution engine (GPEEE). In other words, the GP may require the GPEEE to execute, and may also be edited in the GPEEE. In various embodiments, the embedded device may be configured to execute the GP to perform a measurement task, a control task, a simulation task, or an automation task, among others.

As noted above, the embedded device may not include a display, i.e., may be "headless", in that the device may not include a monitor or other display capabilities. As noted above, the GP may include a plurality of interconnected nodes that visually indicate functionality of the program, and in some embodiments, the graphical program may be or include a graphical data flow program, and the GPEEE may be or include a graphical data flow program development environment (GDFPDE).

In one embodiment, the URI specifies the GP, thereby also indicating the associated GPEEE, while in another embodiment, the URI specifies the GPEEE, and the associated GP is automatically indicated as a result. In yet another embodiment, the URI may simply specify the embedded device, and the GPEEE and associated GP are automatically indicated via their association with the embedded device.

In 1104, the GPEEE and the GP may be received from the embedded device over the network in response to the URI.

In 1106, the GPEEE may be executed within the web browser to display the GP in the web browser, as indicated in 1108, receive user input indicating one or more edit operations to be performed on the GP, as indicated in 1110, edit the GP in the web browser in accordance with the one or more edit operations, thereby generating an edited GP, as indicated in 1112, display the edited GP source code in the web browser, as indicated in 1114, and compile or interpret, execute, and/or debug (and possibly optimize) the edited GP, as indicated in 1116.

Moreover, in some embodiments, the method may also include deploying the edited GP to the embedded device, where the updated GP may be executable by the embedded device to perform updated one or more functions, as indicated in 1118. Additionally, similar to the above methods, and as indicated above, in some embodiments the embedded device may include an interpreter, and so the GP (or edited GP) may be interpretable by the interpreter on the embedded device.

Note that the client computer user may continue debugging the edited GP even after transmitting the GP to the server. For example, the method may include debugging the edited GP from the web browser by monitoring its execution on the embedded device.

Summarizing the above, in one embodiment, a browser accessing the URI on the embedded device may cause the embedded device to provide the graphical program to the user's browser, as well as the graphical program editor/execution system. The user can then view, edit, and/or debug the diagram, and then test the modified diagram by running it. The user may then store the modified graphical program on the embedded device for subsequent or future use. Thus, the functionality of the embedded device may be updated via a web browser running on a client computer coupled to the embedded device via a network, such as the Internet.

Further Embodiments

Similar to the above methods, in some embodiments, the GPEEE may be configured to execute in a sandbox, where executing the GPEEE in the web browser comprises executing the GPEEE in the sandbox. Moreover, in some embodiments, the sandbox may be implemented by or as a plugin, where executing the GPEEE in the sandbox comprises executing the GPEEE in the plugin.

In one embodiment, executing the GPEEE in the web browser includes displaying a graphical user interface (GUI) of the GPEEE in the web browser on a display, where the GUI is configured to display the GP in the web browser, and receive user input to edit, compile or interpret, execute, optimize or debug the GP in the web browser.

In some embodiments, the GP may be embedded in a web page, where the URI references the web page, thereby indicating the GP, and where receiving the GPEEE from the embedded device over the network in response to the URI comprises receiving the web page from the embedded device over the network, including the GP and the GPEEE. Similarly, executing the edited GP in a web browser via the GPDE comprises displaying the web page on a display, and displaying results of executing the GP in the web page on the display.

Figure 11B:
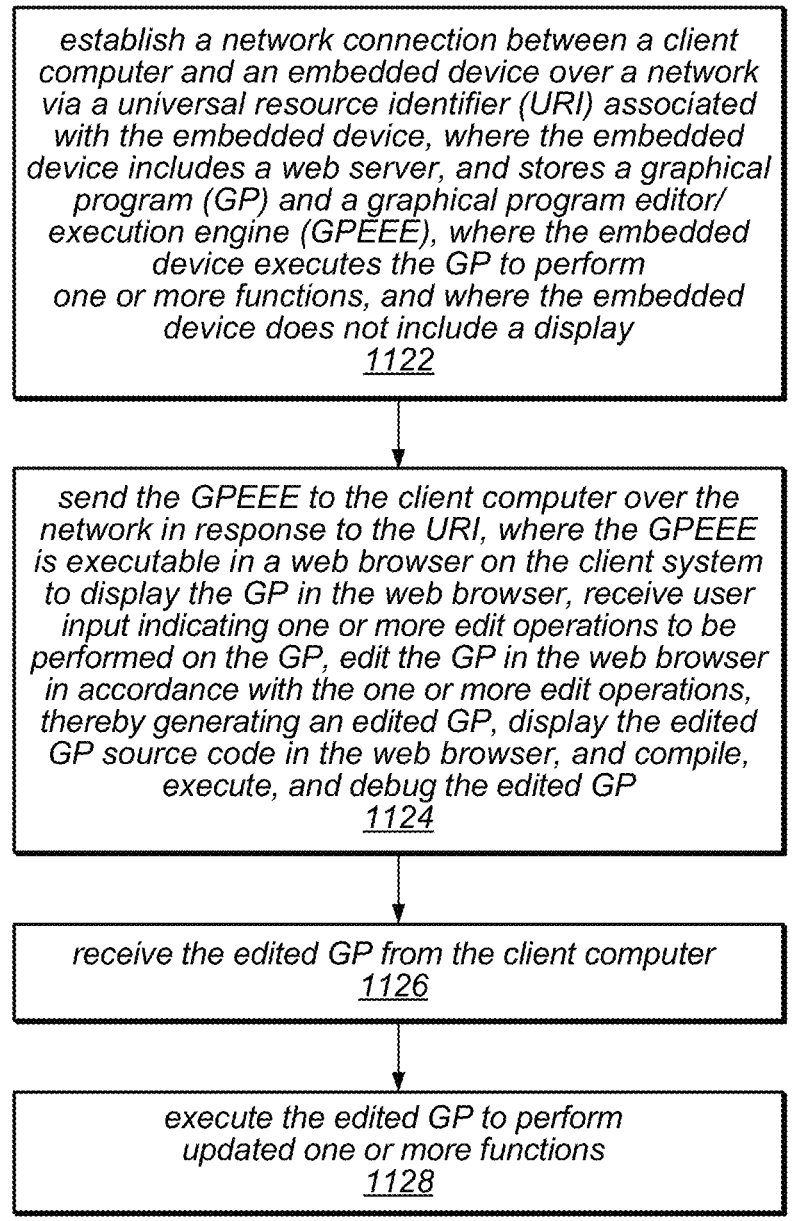

FIG. 11B—Flowchart of a Method for Updating an Embedded Device Over a Network Via a Web Browser—Embedded Device Side FIG. 11B is a flowchart diagram illustrating one embodiment of a method for updating an embedded device over a network via a web browser, from the perspective of an embedded device with web server functionality. The method shown in FIG. 11B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1122, a network connection may be established with a client computer over a network via a universal resource identifier (URI) associated with the embedded device, e.g., a user of the client computer may open a web browser and direct the browser to the embedded device. Thus, a network connection may be established between a client computer and the embedded device.

As described above, the embedded device may be or include a web server, e.g., may be configured to store and serve web pages and/or other web content over a network, and may store a graphical program (GP), e.g., an embedded device application, that the embedded device executes to perform one or more functions, as well as a graphical program editor/execution engine (GPEEE). In other words, the GP may require the GPEEE to execute, and may also be edited in the GPEEE. In various embodiments, the embedded device may be configured to execute the GP to perform a measurement task, a control task, a simulation task, or an automation task, among others.

As further noted above, the embedded device may not include a display, i.e., may be "headless". As also noted above, the GP may include a plurality of interconnected nodes that visually indicate functionality of the program, and in some embodiments, may be or include a graphical data flow program (GDFP), in which case, the GPEEE may be a GDFPEEE, or a graphical data flow program development environment (GDFPDE).

As mentioned above, in one embodiment, the URI specifies the GP, thereby also indicating the associated GPEEE engine, while in another embodiment, the URI specifies the GPEEE, and the associated GP is automatically indicated as a result. In yet another embodiment, the URI may simply specify the embedded device, and the GPEEE and associated GP are automatically indicated via their association with the embedded device.

In 1124, the GPEEE may be sent to the client computer over the network in response to the URI. As described above, the GPEEE may be executable in a web browser of the client computer to update (e.g., display, compile, edit, and debug, and/or possibly optimize) the GP and deploy the updated GP to the embedded device, as described above with reference to FIG. 11A. The method may then include receiving the edited GP from the client computer, as indicated in 1126, and executing (possibly via an interpreter, e.g., the GPEEE) the edited GP to perform updated one or more functions, as indicated in 1128. Moreover, as discussed above, in some embodiments, the method may include communicating with the GPEEE executing on the client computer to enable debugging of the edited GP during execution of the edited GP on the embedded device.

Thus, the functionality of the embedded device may be updated via a web browser running on a client computer coupled to the embedded device via a network.

Further details regarding the nature and operation of the embedded device, the GP, and the GPEEE, are discussed above with respect to the method of FIG. 11A, and for brevity, are not repeated here.

Figure 12:
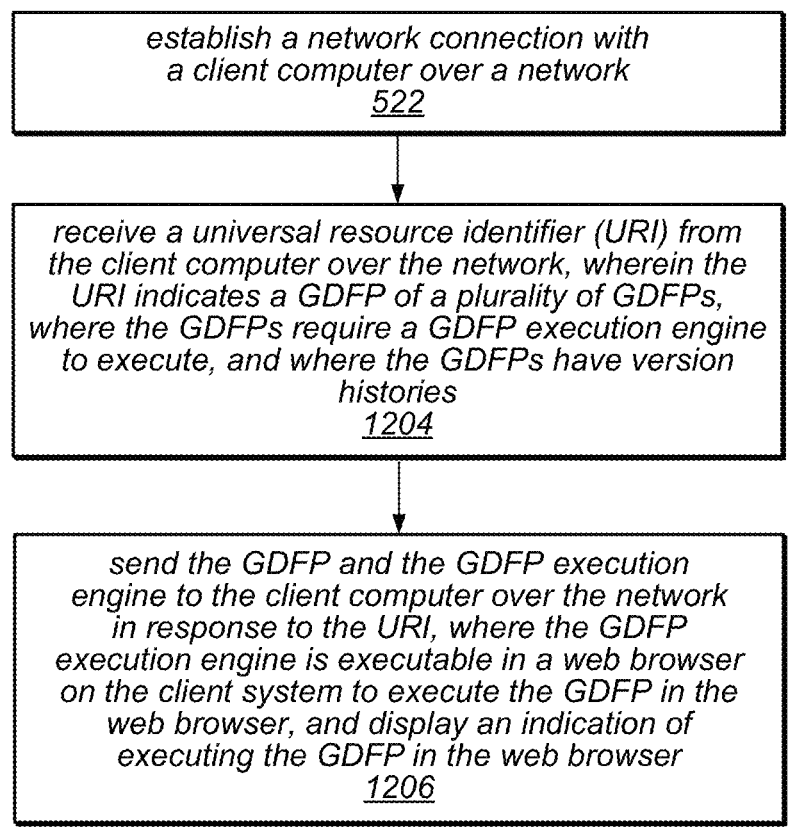
FIG. 12 is a flowchart diagram illustrating one embodiment of a method for implementing a graphical data flow web application repository with version control.

FIG. 12—Flowchart of a Method for Implementing a Graphical Data Flow Web Application Repository FIG. 12 is a flowchart diagram illustrating one embodiment of a method for implementing a graphical data flow web application repository with version control. The method shown in FIG. 12 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network. More specifically, the network connection may be established between the client computer and a device, e.g., a server computer such as computer 90, where the server computer stores a plurality of graphical data flow programs (GDFPs), where each GDFP comprises a respective plurality of interconnected nodes or icons which visually indicate the functionality of the program, as well as a graphical data flow program execution engine (GDFP execution engine) required by the GDFPs to execute. The server computer may also store version histories of the GDFPs and corresponding versions of the GDFPs. Note that the plurality of GPs may include one or more of a measurement program, a control program, a simulation program, or an automation program, among others. However, it should be noted that in other embodiments, any type of graphical data flow programs may be stored as desired.

In 1204, a universal resource identifier (URI) may be received from the client computer over the network, where the URI indicates a GDFP of the plurality of GDFPs, and where in some embodiments, method elements 522 and 1204 may be performed together, e.g., the user of the client computer may click on a link or may otherwise indicate the URI, which may automatically invoke the connection with the server computer (or not).

In 1206, the GDFP and the GDFP execution engine may be sent to the client computer over the network in response to the URI, where the GDFP execution engine may be executable in a web browser on the client system to execute the GDFP in the web browser, and display an indication of executing the GDFP in the web browser. Similar to the above methods, in some embodiments, the GDFP execution engine may be configured to execute in a sandbox, where executing the GDFP execution engine in the web browser comprises executing the GDFP execution engine in the sandbox. Moreover, in some embodiments, the sandbox may be implemented by or as a plugin, where executing the GDFP execution engine in the sandbox comprises executing the GDFP execution engine in the plugin.

Further Embodiments

Displaying an indication of executing the GDFP in the web browser may include displaying a graphical user interface (GUI) of the GDFP in the web browser on a display, where the GUI is configured to display results of the GDFP execution, or receive user input specifying input to the GDFP.

In one embodiment, the GDFP execution engine may executable in a web browser on the client system to execute the GDFP in the web browser in response to user input received to the web browser invoking execution of the GDFP. Alternatively, the GDFP execution engine may execute the GDFP in the web browser automatically, e.g., upon transmittal of the GDFP execution engine and the GDFP.

As with some of the above methods, in some embodiments, the GDFP execution engine executing the GDFP in a web browser may include the GDFP execution engine accessing one or more web services over the network, or invoking execution of one or more programs or subprograms on other devices over the network.

In some embodiments, the GDFP execution engine may include an editor that executes in the web browser on the client computer to receive user input indicating one or more edit operations to be performed on the GDFP, edit the GDFP in the web browser in accordance with the one or more edit operations, thereby generating an edited GDFP, and display the edited GDFP in the web browser. Additionally, the method may include receiving the edited GDFP from the client computer and storing the edited GDFP, where the edited GDFP is available for download by other users. The method may further include updating the version history of the GDFP. Thus, in some embodiments, a (subsequent) user may access the server computer and download a specific version of a GP on the server, e.g., based on the version history.

Moreover, the editor may be executable in the web browser to receive user input specifying creation of a new GDFP, create the new GDFP in response to the user input, and display the new GDFP in the web browser, in which case, the method may also include receiving the new GDFP from the client computer and storing the new GDFP, e.g., for download by other users. The method may also include creating and storing a version history of the new GDFP. Thus, new programs may be added to the repository.

In some embodiments, the GDFP execution engine may include a compiler that is executable in the web browser to compile the edited GDFP, thereby generating an executable of the edited GDFP. The GDFP execution engine may then be executable in the web browser to execute the executable of the edited GDFP in the web browser. Alternatively, in some embodiments, the development environment or GDFP execution engine may be or include an interpreter, and executing the GDFP in the web browser may include the GDFP execution engine interpreting the GDFP.

More generally, in some embodiments, the GDFP execution engine may be comprised in an interactive development environment (IDE) executable in the web browser to edit, analyze, compile, or interpret, the GDFP in the web browser.

In one embodiment, the GDFP execution engine and the GDFP may be savable on the client computer, where the saved GDFP execution engine is executable on the client computer to execute the saved GDFP without the web browser. In other words, the GDFP execution engine may not require a web browser or web browser plugin to execute the GDFP.

In another embodiment, the editor may be further executable in the web browser on the client computer to auto-save the GDFP during editing of the GDFP in the web browser, and store auto-save information on the client computer or send the auto-save information over the network. Thus, in this embodiment, the method may also include receiving the auto-save information for the GDFP from the client computer over the network, and storing the auto-save information for the GDFP, where the auto-save information is useable to restore previous versions of the GDFP on the client computer.

Similarly, in one embodiment, the editor may be executable in the web browser on the client computer to save the GDFP during editing of the GDFP in the web browser in response to user input, and to store save information on the client computer or send the save information over the network. Thus, in this embodiment, the method may also include receiving the save information for the GDFP from the client computer over the network, and storing the save information for the GDFP, where the save information is useable to restore previous versions of the GDFP on the client computer.

In one embodiment, sending the GDFP to the client computer may include sending graphical source code of the GDFP and an executable of the GDFP, and executing the GDFP in a web browser may include the GDFP execution engine executing the executable of the GDFP, where the graphical source code of the GDFP is displayable in the web browser on a display. For example, the GDFP execution engine may execute the executable while displaying the graphical source code of the GDFP. Alternatively, in embodiments where the GDFP execution engine is or includes an interpreter, the GDFP execution engine may interpret the graphical source code, thus executing the program without requiring a separately generated executable.

In some embodiments, the GDFP is embedded in a web page, where the URI references the web page, thereby indicating the GDFP, and where sending the GDFP execution engine to the client computer over the network in response to the URI includes sending the web page to the client computer over the network, including the GDFP and the GDFP execution engine. Moreover, the GDFP execution engine executing the GDFP in a web browser may include displaying results of executing the GDFP in the web page on the display.

In further embodiments, the GDFP execution engine may include or be a GDFP player, wherein executing the GDFP in a web browser via the GDFP execution engine includes the executing the GDFP in a web browser via the GDFP player.

In some embodiments, further programs may be retrieved from the repository. More specifically, the method may include receiving another universal resource identifier (URI) from the client computer over the network, where the URI indicates another GDFP of the plurality of GDFPs, and sending the GDFP to the client computer over the network in response to the URI, wherein the GDFP execution engine is executable in the web browser on the client system to execute the other GDFP in the web browser, and display an indication of executing the other GDFP in the web browser.

Thus, summarizing one embodiment of the above, a server may store a plurality of graphical data flow programs (GDFPs), with a GDFP execution engine (possibly including a development/analysis engine). Users may access the site via web browsers (and URIs), downloading the programs and execution engine as web applications for execution in the browsers. The users may edit (or even create new) programs, and upload the new versions to the server. The server may manage the graphical data flow programs, possibly maintaining version histories (and the different versions) of the programs. The server may also store any annotations, auxiliary programs, libraries, and/or engines, appropriate for each version. Compatibility of projects, programs, program components, and other resources may be tracked and managed. The server may provide auto-save functionality, whereby saves may be performed on the client during editing, e.g., in case of system malfunction, etc., as well as sending auto-saves to the server, e.g., after each edit operation. Version control functions may track auto-saves (or manual saves) for each client/user, although auto-save versions of the program may not be available to other clients. Note that embodiments of the above repository may facilitate cross-project sharing and references, among other community aspects. Moreover, in some embodiments, multiple users may edit a graphical data flow program at the same time, where management of such a shared development process may utilize graphical differencing and merging.

Note that in some embodiments, the method may be implemented with respect to the client side, e.g., from the perspective of client computer functionality, as indicated above in the server side method described, where, for example, the universal resource identifier (URI) is sent to the client computer over the network, the GDFP, the GDFP execution engine, and the portion of the data set are received (by the client computer) over the network in response to the URI, the GDFP is executed in a web browser via the GDFP execution engine to analyze the portion of the data set, thereby generating analysis results for the portion of the data set, and the analysis results for the portion of the data set send (to the server computer) over the network to a repository. Further details for the client side method are described above with respect to the server side method of FIG. 12.

Figure 13:
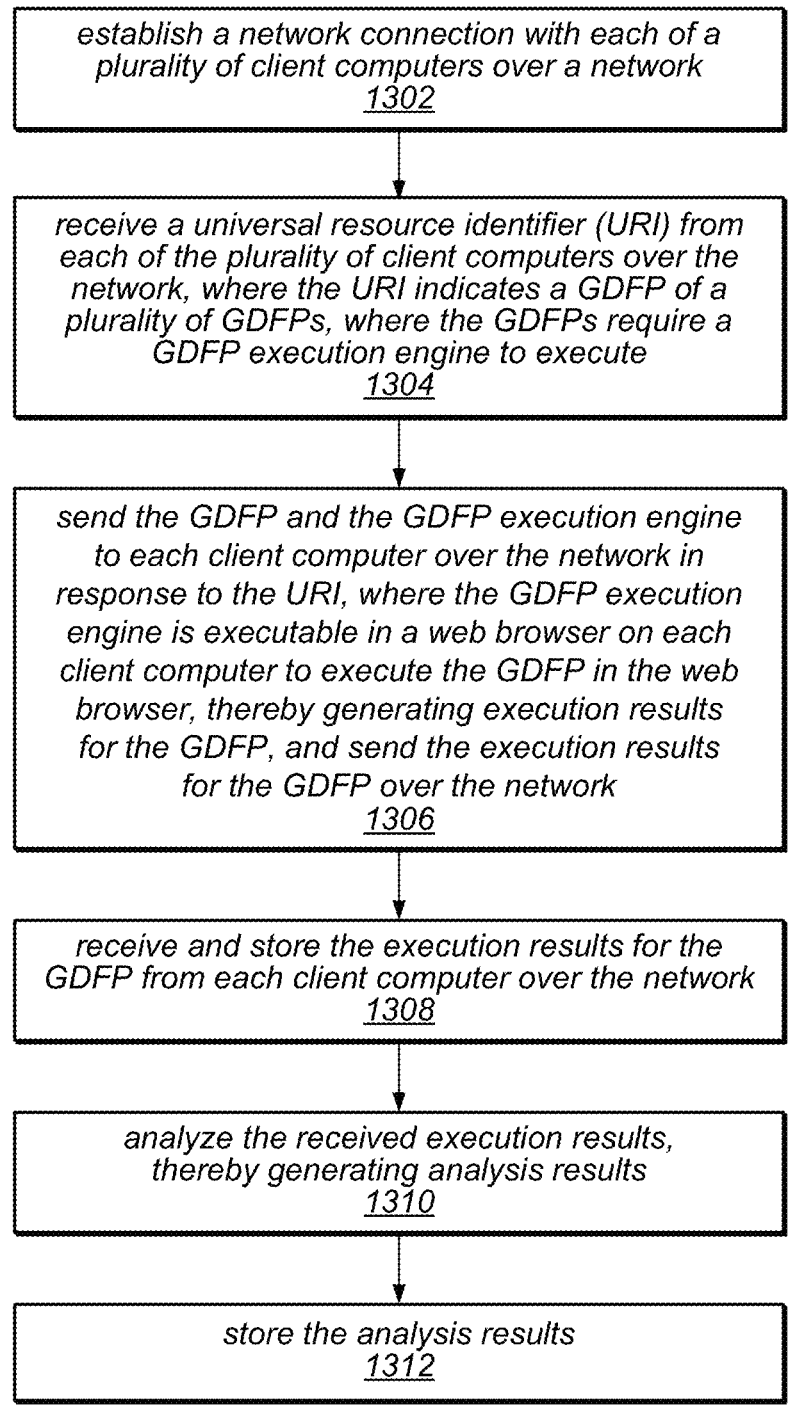
FIG. 13 is a flowchart diagram illustrating one embodiment of a method for collecting and analyzing graphical data flow web application results from multiple users.

FIG. 13—Flowchart of a Method for Collecting and Analyzing Graphical Data Flow Web Application Results from Multiple Users FIG. 13 is a flowchart diagram illustrating one embodiment of a method for collecting and analyzing graphical data flow web application results from multiple users. The method shown in FIG. 13 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1302, a network connection may be established with each of a plurality of client computers over a network. More specifically, the network connection may be established between each client computer and a device, e.g., a server computer such as computer 90, where the server computer stores a plurality of graphical data flow programs (GDFPs), where each GDFP comprises a respective plurality of interconnected nodes or icons which visually indicate the functionality of the program, as well as a graphical data flow program execution engine (GDFP execution engine) required by the GDFPs to execute.

In various embodiments, the plurality of GPs may include one or more of a measurement program, a control program, a simulation program, or an automation program, although any other type of graphical program may be included as desired.

In 1304, a universal resource identifier (URI) may be received from each of the client computers over the network, where the URI indicates a GDFP of the plurality of GDFPs, where method elements 1302 and 1304 may be performed together, e.g., the users of the client computers may click on a link or may otherwise indicate the URI, which may automatically invoke connecting with the server computer (or not).

In 1306, the GDFP and the GDFP execution engine may be sent to each client computer over the network in response to the URI. As described above, the GDFP execution engine may be configured to execute in a sandbox, e.g., a secure execution environment, possibly implemented by a plugin. The GDFP execution engine may be executable in a web browser on each client computer to execute the GDFP in the web browser, thereby generating execution results, and to send the execution results for the GDFP over the network to the server computer. As noted above, in some embodiments, the GDFP execution engine may be or include an interpreter, and executing the GDFP in the web browser via the GDFP execution engine may include the GDFP execution engine interpreting the GDFP in the web browser.

In 1308, the execution results for the GDFP may be received from each client computer over the network.

In 1310, the received execution results may be analyzed, thereby generating analysis results. In other words, the server computer may execute analysis software to analyze the execution results for the GDFP from the plurality of client computers. Further details regarding embodiments of the analysis are provided below.

In 1312, the analysis results may be stored, e.g., in a memory medium of the server computer, or some other computer, e.g., a data repository.

Further Embodiments

In some embodiments, the analysis results may be sent to each client computer over the network for display in the client computers' browsers. Accordingly, in some embodiments, the GDFP execution engine may be further executable in the web browser of each client computer to receive the analysis results over the network, and display the analysis results in the web browser.

In one embodiment, the analysis results may include one or more recommendations regarding the GDFP. In other words, based on the analysis of the execution results, the program instructions may generate recommendations regarding improvement of the GDFP and/or its execution. For example, analyzing the received execution results may include analyzing information regarding one or more of: performance of the executing GDFP, usability of the executing GDFP, execution speed of the GDFP, or compatibility of the GDFP, among others.

Similar to some of the methods described above, executing the GDFP in a web browser may include the GDFP execution engine accessing one or more web services over the network, or invoking execution of one or more programs or subprograms on other devices over the network.

The GDFP execution engine may be or include a GDFP player, discussed above, where executing the GDFP in a web browser via the GDFP execution engine includes the GDFP execution engine executing the GDFP in a web browser via the GDFP player.

The GDFP execution engine may be executable in the web browser to display a graphical user interface (GUI) in the web browser on a display, where the GUI is configured to display results of the GDFP execution, or receive user input specifying input to the GDFP. In one embodiment, the GDFP may be embedded in a web page, where the URI references the web page, thereby indicating the GDFP, and where sending the GDFP execution engine to the client computer over the network in response to the URI includes sending the web page to the client computer over the network, including the GDFP and the GDFP execution engine. Accordingly, executing the GDFP in a web browser may include the GDFP execution engine executing the GDFP in the web page, in which case, GDFP execution engine may also display results of executing the GDFP in the web page on the display.

The above embodiments are described with respect to a single GDFP; however, the method is generally applicable to multiple client computers executing different GDFPs, as well. For example, in some embodiments, the method may further include establishing a network connection with a plurality of other client computers over a network, and receiving universal resource identifier (URIs) from each of the plurality of other client computers over the network, where the URIs indicate respective GDFPs of the plurality of GDFPs. Note that the multiple URIs may specify different GDFPs, the same GDFPs, or any combination of the two. In other words, various of the client computers may specify different GDFPs via respective URIs.

The respective GDFPs and the GDFP execution engine may then be sent to each of the plurality of other client computers over the network in response to the URIs. The GDFP execution engine may be executable in a web browser on each client computer to execute the respective GDFP in the web browser, and display an indication of executing the respective GDFP in the web browser, as described above with respect to the single client computer. Similarly, the method may also include receiving and storing execution results from each of the plurality of other client computers over the network. The received execution results may be analyzed, thereby generating collective analysis results, and the collective analysis results stored.

The method may further include sending the collective analysis results to each client computer over the network for display in the client computers' browsers, where the GDFP execution engine may be further executable in the web browser of each client computer to receive the collective analysis results over the network, and display the collective analysis results in the web browser. Similar to above, the collective analysis results may include one or more recommendations regarding the GDFPs downloaded and executed on the client computers. For example, in various embodiments, the recommendations send to a client computer may be specific to the particular GDFP executed by that client computer, or may be applicable to all or some subset of the GDFPs stored on the server computer, e.g., including that particular GDFP. Thus, the method may analyze execution results from many client computers executing many different GDFPs, and/or from many client computers executing the same GDFP, and may determine recommendations accordingly. In some embodiments, each client computer may send information (e.g., with the execution results, with the URI, or as a separate communication) related to or describing the client computer and/or devices coupled to the client computer. Thus, the method may include receiving and storing system information from each of the plurality of client computers over the network, where the system information includes information regarding the client computer, or information regarding devices coupled to the client computer. Analyzing the received execution results may include analyzing the system information from each of the plurality of client computers, and so recommendations may be determined based at least partially on client computer attributes.

For example, in one exemplary embodiment directed to a measurement application, the analysis may determine that a particular data acquisition (DAQ) card works better than other models of card for the application and hardware of the client computer (measurement system), and so may recommend that DAQ card. As another example, the system information received from a client computer may indicate parallel processing capabilities, e.g., multiple processors or processing cores, and so the method may include generating a recommendation that the user of the client computer parallelize the GDFP, enable automatic parallelism, or even download another version of the program designed for parallel execution. Other exemplary analyses may relate to software and/or hardware compatibilities, program efficiencies (or inefficiencies), debugging, and so forth, as desired.

Thus, summarizing the above at a high level, in some embodiments, multiple users may download a graphical data flow program and a graphical data flow program execution system from a server and execute them in their browsers. Each browser may send results (and possibly input/context data) to the server. The server may analyze the results and provide the results (with possible recommendations) for display in the users' browsers.

Note that in some embodiments, the method may be implemented with respect to the client side, e.g., from the perspective of client computer functionality. In other words, the server side method described above clearly implies a corresponding client side method, e.g., for every server side sending operation there is necessarily a client side receiving operation, and vice versa, and so forth.

Figure 14:
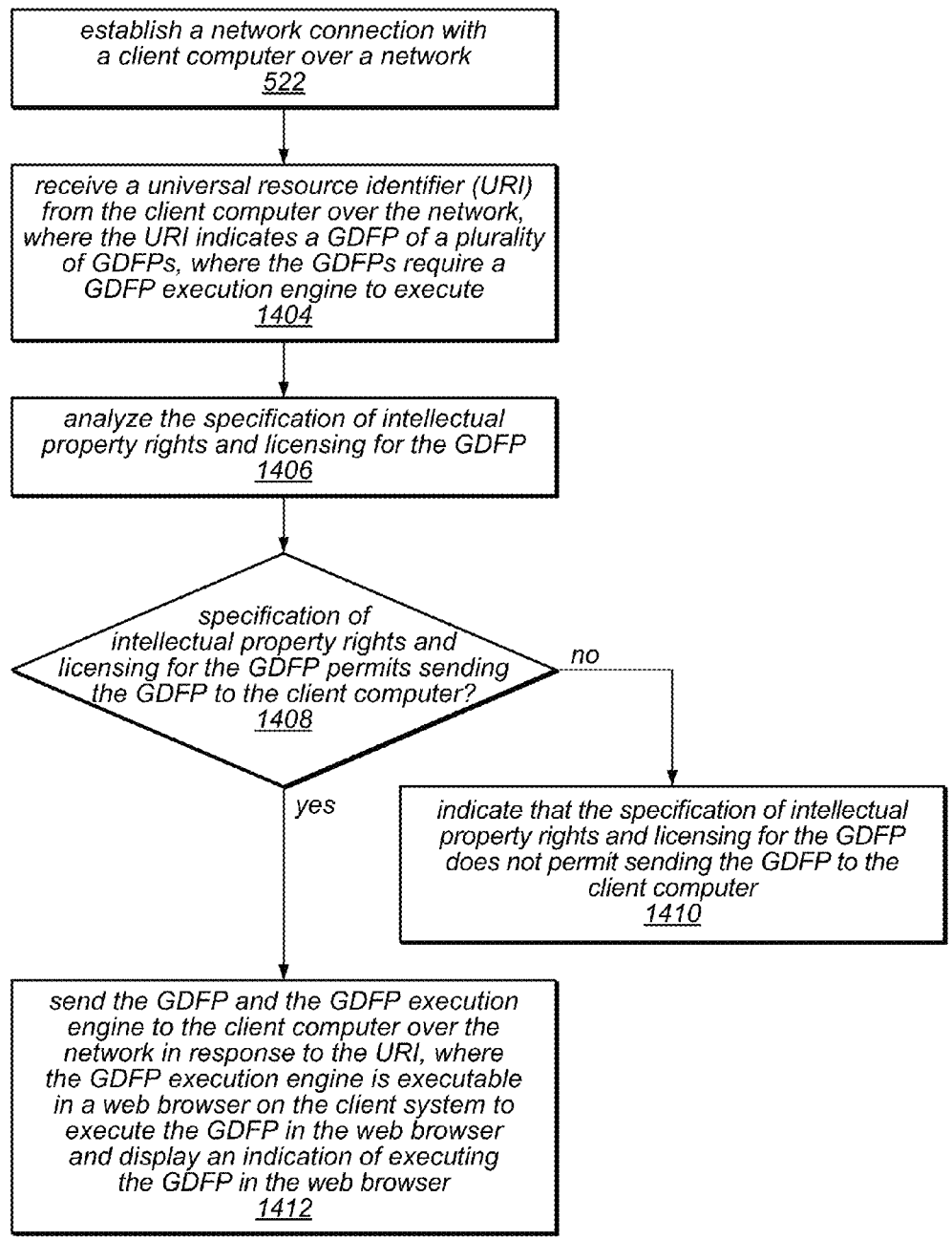
FIG. 14 is a flowchart diagram illustrating one embodiment of a method for licensing and managing shared graphical data flow web applications.

FIG. 14—Flowchart of a Method for Licensing and Managing Shared Graphical Data Flow Web Applications FIG. 14 is a flowchart diagram illustrating one embodiment of a method for licensing and managing shared graphical data flow web applications, from the perspective of a server computer. The method shown in FIG. 14 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network. More specifically, the network connection may be established between the client computer and a device, e.g., a server computer such as computer 90, where the server computer stores a plurality of graphical data flow programs (GDFPs), where each GDFP comprises a respective plurality of interconnected nodes or icons which visually indicate the functionality of the program, as well as a graphical data flow program execution engine (GDFP execution engine) required by the GDFPs to execute. The server computer may also store specification of intellectual property rights and licensing for each of the GDFPs.

As with the method of FIG. 13, in various embodiments, the plurality of GPs may include one or more of a measurement program, a control program, a simulation program, or an automation program, although any other type of graphical program may be included as desired.

In 1404, a universal resource identifier (URI) may be received from the client computer over the network, where the URI indicates a graphical data flow program (GDFP) or a GDFP execution engine for executing the GDFP, where method elements 522 and 1404 may be performed together, e.g., the user of the client computer may click on a link or may otherwise indicate the URI, which may automatically invoke the connection with the server computer (or not).

In 1406, the specification of intellectual property rights and licensing for the GDFP may be analyzed. For example, the specification of intellectual property rights and licensing for the GDFP may be analyzed with respect to constraints regarding terms of use of the GDFP, e.g., who may download the program, whether the program may be edited, whether or how the program may be used for commercial purposes, and so forth.

In 1408, a determination may be made based on the analysis of 1406 as to whether the specification of intellectual property rights and licensing for the GDFP permits sending the GDFP to the client computer. If the specification of intellectual property rights and licensing for the GDFP permits, the GDFP may be sent to the client computer over the network in response to the URI (and in accordance with the specification of intellectual property rights and licensing for the GDFP), as indicated in 1412, where the GDFP execution engine may be executable in a web browser on the client system to execute the GDFP in the web browser, and display an indication of executing the GDFP in the web browser. For example, the GDFP execution engine may be executable in the web browser to display a GUI in the web browser on a display, where the GUI is configured to display results of the GDFP execution, or receive user input specifying input to the GDFP.

If, on the other hand, the specification of intellectual property rights and licensing for the GDFP does not permit (the sending of the GDFP and the GDFP execution engine), an indication to that effect may be sent to the client computer over the network, as indicated in 1410. In other words, the method may indicate to the client computer that the specification of intellectual property rights and licensing for the GDFP does not permit sending the GDFP and the GDFP execution engine to the client computer, e.g., by sending a message for display on the client computer.

Further Embodiments

In some embodiments, the method may include sending information regarding the specification of intellectual property rights and licensing for the GDFP to the client computer over the network. The GDFP execution engine may be executable in the web browser to receive the information regarding the specification of intellectual property rights and licensing for the GDFP over the network, and to display a graphical user interface (GUI) in the web browser on a display, where the GUI may be configured to display the information regarding the specification of intellectual property rights and licensing for the GDFP, e.g., to the user of the client computer.

Moreover, the GDFP execution engine may also be configured to send user information (to the server computer) confirming that the user owns the rights to the GDFP, e.g., a user ID that may be compared to ownership information for the GDFP stored on the server computer. Accordingly, the GDFP execution engine may be configured to receive user input modifying the specification of intellectual property rights and licensing for the GDFP, and send an indication of the user input modifying the specification of intellectual property rights and licensing for the GDFP over the network.

The method may accordingly include receiving the user information confirming that the user owns the rights to the GDFP, and receiving the indication of the user input modifying the specification of intellectual property rights and licensing for the GDFP from the client computer over the network, in response to which the method may modify the specification of intellectual property rights and licensing for the GDFP in accordance with the received indication. Thus, in some embodiments, the owner of the rights to the GDFP may modify the specification of intellectual property rights and licensing for the GDFP.

More generally, in some embodiments, client user information may be provided to the server computer, e.g., via a login process, e.g., where a user ID sent by the client computer may be compared to information stored on the server computer, e.g., a user's account information, and used to determine the user's rights with respect to the GDFP in accordance with the specification of intellectual property rights and licensing for the GDFP.

In some embodiments, the GDFP execution engine sent to the client computer may include an editor that executes in the web browser on the client computer to receive user input indicating one or more edit operations to be performed on the GDFP, edit the GDFP in the web browser in accordance with the one or more edit operations, thereby generating an edited GDFP, and display the edited GDFP in the web browser. In other embodiments, subject to the specification of intellectual property rights and licensing for the GDFP, the GDFP execution engine sent to the client computer may include additional functionalities, e.g., static analysis, dynamic analysis, compilation or interpretation, deployment, and so forth, as desired.

As with the above-described methods, the GDFP execution engine may be configured to execute in a sandbox, e.g., a secure execution environment, possibly implemented as or by a plugin. The GDFP execution engine may be executable in a web browser on the client system to execute the GDFP in the web browser, and display an indication of executing the GDFP in the web browser. Alternatively, the GDFP execution engine may be or include a GDFP player, and executing the GDFP in a web browser via the GDFP execution engine may include the GDFP execution engine executing the GDFP in a web browser via the GDFP player.

Moreover, in some embodiments, the GDFP execution engine is or includes an interpreter, and executing the GDFP in the web browser may include the GDFP execution engine interpreting the GDFP. Thus, rather than compiling the graphical source code of the GDFP to generate an executable, the GDFP execution engine may interpret the (graphical source code of the) GDFP at runtime As also discussed above, in executing the GDFP, the GDFP execution engine may be executable to access one or more web services over the network, or invoke execution of one or more programs or subprograms on other devices over the network.

In one embodiment, the GDFP may be embedded in a web page, where the URI references the web page, thereby indicating the GDFP. Sending the GDFP execution engine to the client computer over the network in response to the URI may thus include sending the web page to the client computer over the network, including the GDFP and the GDFP execution engine. Accordingly, the GDFP execution engine may be executable in the web browser to execute the GDFP in the web page, and to display results of executing the GDFP in the web page on the display.

Thus, in some embodiments of the above method, a server may store a plurality of graphical data flow programs (GDFP), with a GDFP execution engine (possibly including a development/analysis engine or IDE, as described above). Legally binding intellectual property rights and licensing may be specified for each GDFP. For example, in various embodiments, there may be a site-wide rights/license policy (or policies), or the rights/license for each GDFP may be specified by the owner, e.g., the provider/developer/creator of the GDFP, e.g., based on or similar to the Creative Commons intellectual property framework.

Thus, embodiments of the above method may be used to implement digital rights management (DRM) applied to web hosted graphical data flow program execution. Note that in some embodiments, the method may be implemented with respect to the client side, e.g., from the perspective of client computer functionality.

Figure 15A:
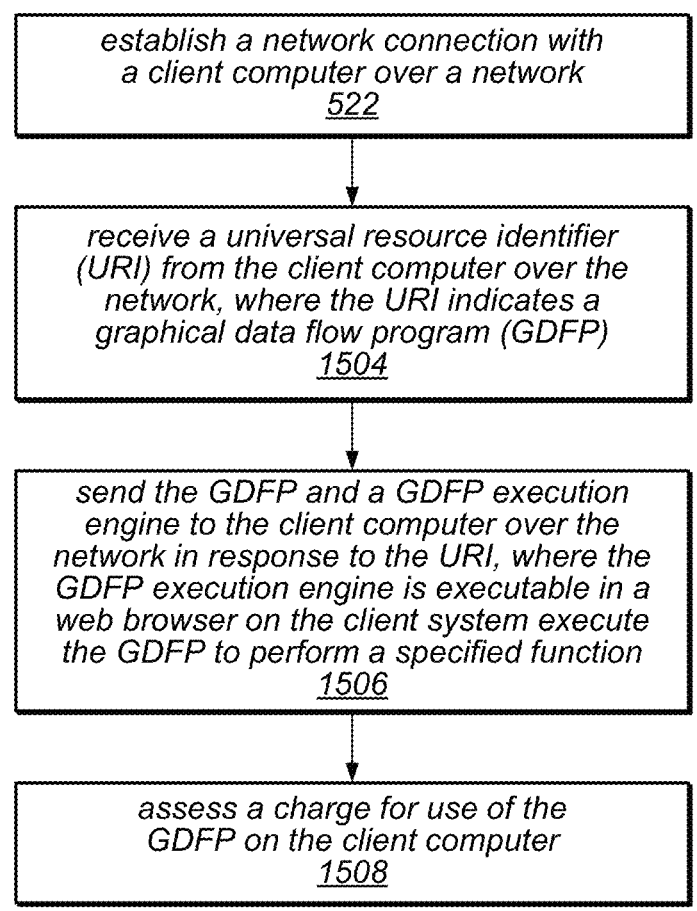
FIGS. 15A and 15B are flowchart diagrams illustrating embodiments of a method for providing online graphical data flow web application tools or services for charge.

FIG. 15A—Flowchart of a Method for Providing Online Graphical Data Flow Web Application Tools or Services for Charge—Server Side FIG. 15 is a flowchart diagram illustrating one embodiment of a method for providing online graphical data flow programs, e.g., graphical data flow web application programs, e.g., implementing various software tools or services, for charge, from the perspective of a server computer, e.g., computer 90, or another computer. The method shown in FIG. 15 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network, e.g., a network connection may be established between the client computer and a server computer. The server computer may store a plurality of graphical data flow programs, e.g., web applications, and possibly software tools, and so forth, where each GDFP is accessible and useable via web browsers executing on client computers. The server computer may also store a GDFP execution engine, where the GDFPs require the GDFP execution engine to execute. Note that in other embodiments only one GDFP may be stored on the server computer.

The GDFPs may be of any type or functionality desired. For example, in various embodiments, the GDFPs may include or be task or domain specific programs or applications for industrial, scientific, or even entertainment purposes, e.g., data analysis and processing, measurement, testing, control, or automation, among others. For example, the GDFP may be or include a measurement application, where the measurement application is executable in the web browser on the client computer to perform a specified measurement function. In another embodiment, the GDFP may be a model of a hardware device, e.g., useable to observe or test the functionality of the device without the device itself, where, for example, the model may "stand in" for the device during operation of a system, e.g., a measurement system, e.g., to determine the appropriateness (or not) of the device for the system. In some embodiments, the model may be of a hardware system, e.g., that includes multiple devices.

In 1504, a universal resource identifier (URI) may be received from the client computer over the network, where the URI indicates a GDFP of the plurality of GDFPs, or, in alternate embodiments, the lone GDFP.

In 1506, the GDFP and the GDFP execution engine may be sent to the client computer over the network in response to the URI. The GDFP execution engine may be executable in a web browser to execute the GDFP to perform the specified functionality of the GDFP.

In 1508, a charge for use of the GDFP on the client computer may be assessed. Note that charging for use of the GDFP may be accomplished in any way desired, e.g., charging a client account, charging/billing for a subscription service, charging/billing per use, e.g., "a la carte", and so forth.

Further Embodiments

In one embodiment, assessing a charge for use of the GDFP on the client computer may include assessing the charge in accordance with a specified use plan. For example, in one embodiment, the specified use plan may include a subscription to one or more levels of service, where each level of service specifies GDFPs available to users at that level of service, or conditions of use of GDFPs available to users at that level of service. In another embodiment, the specified use plan may be or include a pay per use plan. For example, the pay per use plan may specify time-metered use of the GDFP or use-metered use of the GDFP. In other words, the user may be charged for the amount of time the GDFP is used, or for the amount of use of the GDFP, either of which may be tracked or determined by the GDFP itself, or by software associated with the GDFP, e.g., that may be downloaded with the GDFP for execution on the client computer, or that may execute on the server and monitor the GDFP use, e.g., by receiving use information from the GDFP over the network.

The GDFP and the GDFP execution engine may be automatically deleted from the client computer after use in accordance with the specified use plan. Thus, for example, if the specified use plan specifies a single execution of the GDFP, after the GDFP executes on the client computer, the GDFP and the GDFP execution engine may be automatically deleted. Similarly, if the specified use plan specifies use of the GDFP for a specified time period, e.g., one week, then after the specified time period, e.g., from the time of download or from the time of first execution on the client computer, the GDFP and the GDFP execution engine may be automatically deleted. Alternatively, the GDFP and the GDFP execution engine may simply be disabled and left resident on the computer for some specified duration.

In some embodiments, the method may also include receiving an indication of the specified use plan from the client computer over the network, and storing information specifying the specified use plan for a user of the client computer, e.g., for determining user (or client) privileges with respect to the GDFPs (or related software). For example, the GDFP execution engine (or associated software) may execute on the client computer to present use plan options, e.g., via a GUI, and the user may provide input to the GUI specifying the desired use plan. An indication of the specified use plan may then be sent to the server computer.

In some embodiments, the method may include sending an indication of the assessed charge to a user of the GDFP, or a representative of the user. For example, an account associated with the user may be billed in accordance with the assessed charge, or a bill for the assessed charge may be sent to the user of the GDFP, or a representative, i.e., associate, of the user.

Accordingly, the method may further include receiving payment for the assessed charge. For example, receiving payment for the assessed charge may include receiving credit card information from the client computer over the network, and billing the assessed charge to the credit card. Note that any other billing/payment techniques may be used as desired, including using third party billing or collecting services.

In some embodiments, in addition to sending the GDFP execution engine, the method may include sending one or more additional programs to the client computer, in accordance with the specified use plan. For example, the specified use plan may specify and permit downloading and using one or more software tools for use with the GDFP, e.g., to create, edit, compile or interpret, execute, analyze, optimize, or debug GDFP programs in the web browser, or to otherwise provide, e.g., implement or facilitate, a web application software service, e.g., related to such programs, among other functionalities. Thus, for example, in some embodiments, the one or more software tools may be or include a GDFP editor, a GDFP static analyzer, a GDFP dynamic analyzer, a GDFP compiler or interpreter, or a GDFP interactive development environment (IDE), among others. In various embodiments, the one or more software tools may provide any functionality desired.

Thus, the method may include sending at least one software tool of the one or more software tools to the client computer over the network, where the at least one software tool is executable in the web browser on the client computer to perform one or more functions with respect to the GDFP. For example, in an embodiment where the software tool is a GDFP IDE, the user may execute the IDE in the web browser to edit, analyze, execute, debug, or otherwise modify or develop the GDFP. Note that in this embodiment, the GDFP execution engine may be included in the GDFP IDE.

The at least one software tool may be deleted from the client computer when the GDFP and the GDFP execution engine are deleted.

In embodiments where the GDFP is a model of a hardware device, mentioned above, the method may further include the GDFP execution engine (or associated software, e.g., a software tool) executing in the web browser to present an offer to sell the device, receive user input specifying purchase of the device, and send an indication of the purchase of the device over the network. In other words, once the user has tested the device via executing the model of the device, the user may be given the option to purchase the device. Thus, the method may also include receiving the indication of the purchase of the device from the client computer over the network. Assessing the charge for use of the GDFP on the client computer may include assessing a charge for the device, although in some embodiments, this purchase/charge may be handled as a separate transaction from the original use of the GDFP (model).

Once the device has been purchased, the device may be delivered to the user.

In some embodiments, the GDFP may be configured to execute in a sandbox, where the sandbox provides or implements a secure execution environment for the GDFP. The GDFP being executable in the web browser may thus include the GDFP being executable in the sandbox. As noted above, the sandbox may be implemented by a plugin, and so the GDFP being executable in the sandbox may include the GDFP being executable in the plugin.

In further embodiments, the GDFP execution engine is or includes an interpreter, and executing the GDFP in the web browser may include the GDFP execution engine interpreting the GDFP. Thus, rather than compiling the graphical source code of the GDFP to generate an executable, the GDFP execution engine may interpret the (graphical source code of the) GDFP at runtime Thus, embodiments of the above method may implement an e-commerce system for providing web-based graphical data flow programs for execution.

Figure 15B:
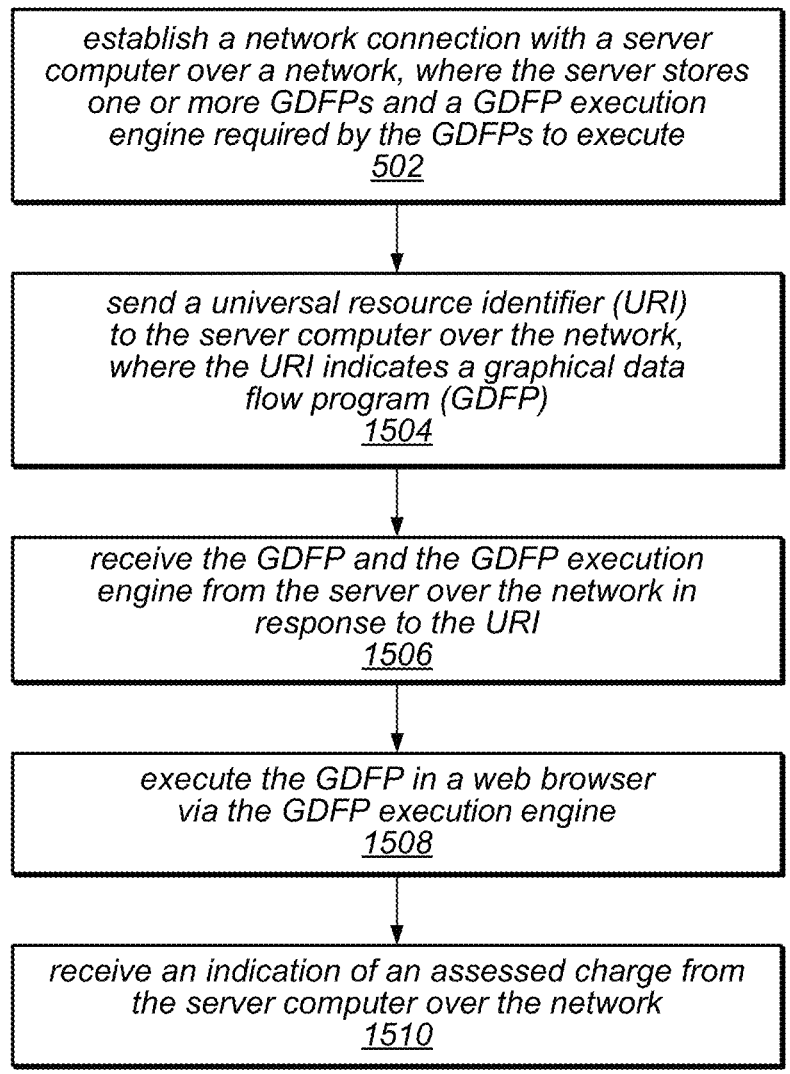

FIG. 15B—Flowchart of a Method for Providing Online Graphical Data Flow Web Application Tools or Services for Charge—Client Side FIG. 15B is a flowchart diagram illustrating one embodiment of a method for providing online graphical data flow programs, e.g., graphical data flow web application programs, e.g., implementing various software tools or services, for charge, from the perspective of a client computer, e.g., computer 82, or another computer. The method shown in FIG. 15B may be used in conjunction with any of the computer systems or devices shown in the above Figures, among other devices. Note that for brevity, details disclosed above with respect to the method of FIG. 15A that are applicable to the method of FIG. 15B may be omitted in the below description. In various embodiments, some of the method elements shown may be performed concurrently, in a different order than shown, or may be omitted. Additional method elements may also be performed as desired. As shown, this method may operate as follows.

In 502, a network connection may be established with a server computer over a network, e.g., a user may open a web browser and direct the browser to the server computer, where, as indicated above, the server computer stores a plurality of graphical data flow programs (or, alternatively, one GDFP), e.g., web applications, and possibly software tools, and so forth, where each GDFP is accessible and useable via web browsers executing on client computers. The server computer may also store a GDFP execution engine, where the GDFPs require the GDFP execution engine to execute.

Note, however, that in other embodiments, the server computer may store one GDFP, rather than a plurality.

In 1504, a universal resource identifier (URI) may be sent to the server computer over the network, where the URI indicates a GDFP (e.g., of the plurality of GDFPs). Method elements 502 and 1504 may be performed together, e.g., the user (e.g., of the client computer) may click on a link or may otherwise indicate the URI, which may automatically invoke the connection with the server computer.

In 1506, the GDFP and the GDFP execution engine may be received from the server computer over the network in response to the URI.

In 1508, the GDFP may be executed in a web browser via the GDFP execution engine. In other words, the GDFP execution engine may execute the GDFP within the web browser as a web application. In one embodiment, the method may include receiving user input to the web browser invoking execution of the GDFP, and the GDFP may be executed in the browser in response to the received user input.

As described above, some embodiments, the GDFP execution engine is or includes an interpreter, and executing the GDFP in the web browser may include the GDFP execution engine interpreting the GDFP. Thus, rather than compiling the graphical source code of the GDFP to generate an executable, the GDFP execution engine may interpret the (graphical source code of the) GDFP at runtime.

In 1510, an indication of an assessed charge for use of the GDFP may be received from the server computer over the network. In other words, the client computer may receive an indication of charges assessed by the server computer for use of the GDFP, e.g., per a specified use plan.

Further details regarding the nature and operation of the GDFP(s), the GDFP execution engine, software tools, payment methods, etc., are provided above with respect to FIG. 15A.

Figure 16A:
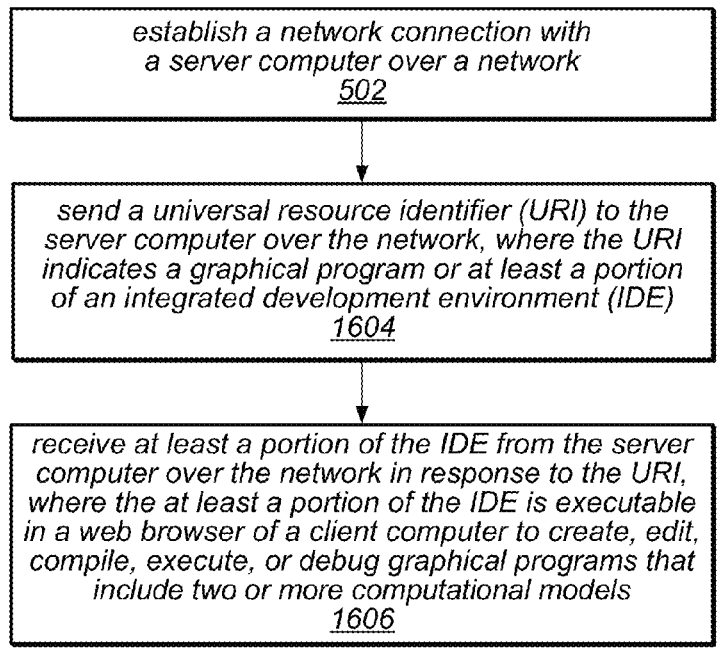
FIGS. 16A and 16B are flowchart diagrams illustrating embodiments of a method for developing a graphical program with multiple computational models over a network via a web browser.

FIG. 16A—Flowchart of a Method for Developing a Graphical Data Flow Program (GDFP) with Multiple Models of Computation in a Browser—Client Side FIG. 16A is a flowchart diagram illustrating one embodiment of a method for developing a graphical program with multiple computational models over a network via a web browser, from the perspective of a client computer, e.g., computer 82, or another computer. The method shown in FIG. 16A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer over a network, e.g., a user may open a web browser and direct the browser to the server computer.

In 1604, a universal resource identifier (URI) may be sent to the server computer over the network, where the URI indicates a graphical program (GP) or at least a portion of an integrated development environment (IDE), which may be referred to simply as the IDE for convenience. The at least a portion of the IDE may be executable to develop, e.g., to create, edit, analyze, execute, or debug, graphical programs that include two or more computational models. Similarly, the graphical program (which may or may not already exist) may include two or more computational models, e.g., graphical data flow (e.g., LabVIEW)/procedural, graphical data flow/simulation (e.g., Simulink), graphical data flow/textual (e.g., MathScript), and so forth. In some embodiments, the graphical program is or includes a graphical data flow program (GDFP), and the IDE is or includes a graphical data flow program development environment (GDFPDE). In other words, at least one of the models of computation may be graphical data flow.

In one embodiment, at least one of the two or more models of computation may include or be a physical domain, e.g., the physical domain may include one or more of an electrical domain, a chemical domain, a mechanical domain, an electromagnetic domain, a hydraulic domain, an acoustic domain, an optical domain, or a thermodynamic domain, among others.

In 1606, the IDE may be received from the server computer over the network in response to the URI. The IDE may be executable in a web browser to create, edit, compile or interpret, execute, analyze, test, optimize, and/or debug graphical programs in the web browser, via any of the techniques described herein (or others), as applied to graphical programs that contain multiple computational models (i.e., models of computation). Thus, the (at least a portion of the) IDE may include one or more of an editor, edit time analyzer, compiler, execution engine (which may include an interpreter), and/or dynamic (run time) analyzer, among others, as desired.

Thus, for example, in one embodiment, the graphical program is a pre-existing program, where the IDE is associated with the pre-existing program, and where the URI specifies the pre-existing program, thereby also indicating the associated IDE, where, for example, the graphical program may also be received from the server computer in response to the URI; or alternatively, in embodiments where the graphical program is not a pre-existing program, the URI may specify the IDE, and the IDE may be executable in the web browser to receive user input specifying creation of the graphical program, and create (and edit, debug, etc.) the graphical program in response to the user input.

As with the above methods, the IDE may be configured to execute in a sandbox, and so executing the IDE in the web browser may include executing the IDE in the sandbox. In embodiments where the sandbox is implemented as or by a plugin, the IDE may be executed in the plugin.

Moreover, as also with the above methods, in some embodiments, the GDFP execution engine is or includes an interpreter, and executing the GDFP in the web browser may include the GDFP execution engine interpreting the GDFP, and so rather than compiling the graphical source code of the GDFP to generate an executable, the GDFP execution engine may interpret the (graphical source code of the) GDFP at runtime, i.e., making a compiler unnecessary.

The IDE may be executable in the web browser to perform various functions, e.g., for developing graphical programs with multiple computational models. For example, in one embodiment, the IDE is executable in the web browser to display the graphical program in the web browser, receive user input indicating one or more edit operations to be performed on the graphical program, edit the graphical program in the web browser in accordance with the one or more edit operations, thereby generating an edited graphical program, display the edited graphical program (e.g., edited graphical source code) in the web browser, and compile or interpret, execute, and/or analyze (and possibly optimize) the edited graphical program. In some embodiments, the IDE may be further executable to automatically parallelize one or more portions of the graphical program in response to analyzing the program, and/or otherwise optimize the program.

Note that in various embodiments, to debug the graphical program the IDE may be configured to statically analyze the graphical program at edit time, and/or dynamically analyze the graphical program at run time, i.e., during execution. In other embodiments, the (at least a portion of the) IDE may provide any functionality desired. Note that the IDE may facilitate development of portions of the graphical program under respective computational models, and thus, for example, in one embodiment, the IDE may allow both graphical program editing, as well as textual editing, or graphical data flow development and simulation development, or graphical data flow development and domain specific application development, and so forth. Thus, the editing or development capabilities of the (at least a portion of the) IDE may support program development under multiple models of computation.

Moreover, in one embodiment, the IDE may executable in the web browser to display the graphical program in the web browser where respective portions of the graphical program are in accordance with the two or more computational models, and where the IDE displaying the graphical program in the web browser includes visually indicate each respective portion of the program in accordance with its model of computation. For example, in an exemplary embodiment where the graphical program includes graphical data flow and textual procedural models, the textual procedural program code may be visually demarcated, e.g., contained or enclosed in a rectangular box, from the graphical data flow code. Other exemplary visual designations or indications may utilize color, segregation/grouping within a single window or in respective windows, labeling, and so forth, although it should be noted that any techniques may be used to display or visually denote the computational model-specific program code, as desired.

Figure 16B:
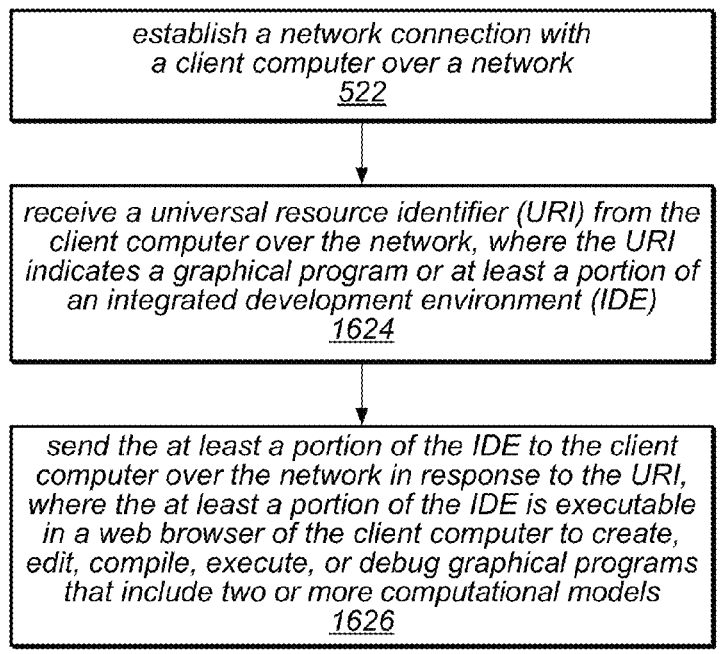

FIG. 16B—Flowchart of a Method for Developing a Graphical Program in a Web-Hosted Program Development Environment—Server Side FIG. 16B is a flowchart diagram illustrating one embodiment of a method for developing a graphical program with multiple computational models over a network via a web browser, but from the perspective of a server computer, e.g., computer 90, or another computer. The method shown in FIG. 16B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network.

In 1624, a universal resource identifier (URI) may be received from the client computer over the network, where the URI indicates a graphical program (GP) or at least a portion of an IDE for developing graphical program, which, as noted above, for brevity may be referred to simply as the IDE, where method elements 522 and 1624 may (or may not) be performed together, e.g., the user of the client computer may click on a link or may otherwise indicate the URI, which may automatically invoke the connection with the server computer. As noted above, the GP may include a plurality of interconnected nodes or icons which visually indicate the functionality of the program, and also includes multiple computational models (i.e., models of computation).

In 1626, the IDE may be sent to the client computer over the network in response to the URI. As described above, the IDE may be executable in a web browser, e.g., in a sandbox, possibly implemented by or via a plugin. Additionally, in some embodiments, the GDFP execution engine is or includes an interpreter, and executing the GDFP in the web browser may include the GDFP execution engine interpreting the GDFP.

The nature and operation of the IDE executing on the client computer is described above with reference to FIG. 16A, as are various embodiments of the graphical program, and so for brevity are not re-presented here.

Thus, summarizing one embodiment of the above methods, a user may open a browser and access a URI at a server, where the URI references an existing graphical program and/or a graphical program development system (or portion thereof), e.g., a graphical program editor, a graphical program execution system, and/or a graphical program analysis system, among others. The graphical program, whether pre-existing or to be developed, includes two or more computational models. The server may provide the graphical program development system (or portion), and if the graphical program already exists, may also provide the graphical program. The graphical program development system (or portion) then executes in the user's browser, allowing the user to develop, execute, optimize, and/or analyze (debug), the graphical program in the browser. The graphical program may be saved or deployed locally and/or to a remote device, e.g., the server.

It should be noted that in alternative embodiments, the methods of FIGS. 16A and 16B may be implemented where the at least a portion of the IDE is a graphical program editor, a graphical program execution engine, and/or a graphical program analyzer (e.g., static or dynamic). In other words, the methods may be similar to the methods of FIGS. 5A/5B, 6A/6B, and/or 7A/7B, (or others of the methods disclosed herein), but where the graphical programs each include multiple models of computation.

Figure 17A:
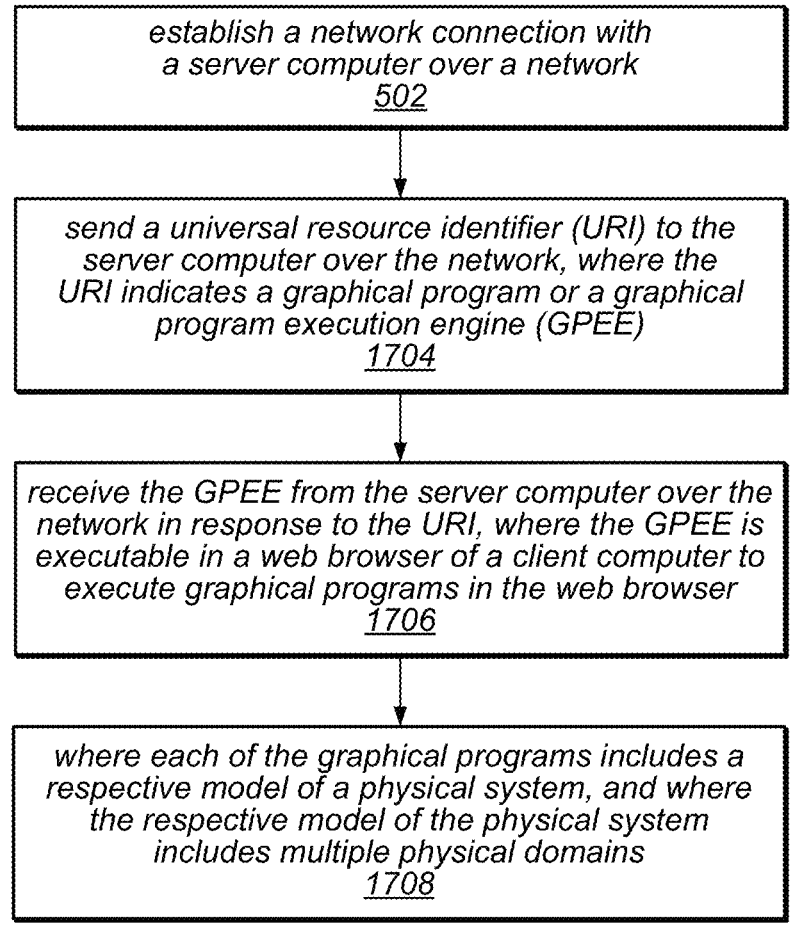
FIGS. 17A and 17B are flowchart diagrams illustrating embodiments of a method for executing a physical model with multiple physical domains via a web browser.

FIG. 17A—Flowchart of a Method for Executing a Physical Model with Multiple Physical Domains in a Browser—Client Side FIG. 17A is a flowchart diagram illustrating one embodiment of a method for executing a physical model with multiple physical domains via a web browser, from the perspective of a client computer, e.g., computer 82, or another computer. The method shown in FIG. 17A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer over a network, e.g., a user may open a web browser and direct the browser to the server computer.

In 1704, a universal resource identifier (URI) may be sent to the server computer over the network, where the URI indicates a graphical program (GP) or a graphical program execution engine (GPEE). The graphical program may comprise or implement a physical model (PM), and so the GPEE may be or include a PM execution engine (PMEE). Note that for brevity, the graphical program that implements the physical model may be referred to as the physical model. The GPEE may be executable in a web browser to execute graphical programs that comprise or implement physical models that include two or more physical domains, e.g., two or more of electrical, chemical, mechanical, hydrodynamic, thermodynamic, and so forth. Similarly, the implemented physical model (which may or may not already exist) may include two or more physical domains. Note that the graphical program/physical model may be implemented using any of a variety of approaches, e.g., graphical programming, graphical data flow (e.g., LabVIEW), simulation (e.g., Simulink), textual programming, state machines, etc., as desired. In some embodiments, a model of a physical phenomenon may be or include a simulation or emulation of the phenomenon, depending on the resolution and/or basis of the model.

In 1706, the GPEE may be received from the server computer over the network in response to the URI. The GPEE may be executable in a web browser (e.g., in a sandbox) to execute a graphical program implementing multi-domain physical models in the web browser, via any of the techniques described herein (or others), as applied physical models that contain multiple physical domains. Thus, in one embodiment, the GPEE may include respective portions or functionalities for executing respective physical domain specific portions of the graphical program/physical model.

In various embodiments, the GPEE may include further functionality, e.g., may include (possibly for each physical domain): a graphical program/physical model editor, a graphical program/physical model compiler or interpreter, a graphical program/physical model analyzer, a graphical program/physical model optimizer, and so forth, and so may be or include at least a portion of an IDE, e.g., a graphical program/physical model IDE (PMIDE), as desired.

Thus, for example, in one embodiment, the graphical program that implements the model is a pre-existing graphical program, where the GPEE is associated with the pre-existing graphical program, and where the URI specifies the pre-existing graphical program, thereby also indicating the associated GPEE, where, for example, the graphical program implementing the physical model may also be received from the server computer in response to the URI; or alternatively, in embodiments where the graphical program implementing the physical model is not a pre-existing graphical program, the URI may specify the GPEE, and the GPEE (e.g., a PMIDE) may be executable in the web browser to receive user input specifying creation of the graphical program, and create (and edit, debug, etc.) the graphical program in response to the user input.

As with the above methods, the GPEE may be configured to execute in a sandbox, and so executing the GPEE in the web browser may include executing the GPEE in the sandbox. In embodiments where the sandbox is implemented as or by a plugin, the GPEE may be executed in the plugin.

Moreover, in one embodiment, the GP execution engine and the GP may be savable on the client computer, where the saved GP execution engine is executable on the client computer to execute the saved GFP without the web browser. In other words, the GP execution engine may not require a web browser or web browser plugin to execute the GP.

In embodiments where the GPEE is a PMIDE, the PMIDE may be executable in the web browser to perform various functions for developing graphical programs implementing physical models with multiple physical domains. For example, in one embodiment, the PMIDE is executable in the web browser to display the graphical program/physical model in the web browser, receive user input indicating one or more edit operations to be performed on the physical model, edit the physical model in the web browser in accordance with the one or more edit operations, thereby generating an edited physical model, display the edited physical model (e.g., edited graphical source code) in the web browser, and compile or interpret, execute, and analyze (and possibly optimize, e.g., automatically parallelize) the edited graphical program/physical model. Note that in some embodiments, the PMIDE may be configured to statically analyze the graphical program/physical model at edit time, and/or dynamically analyze the graphical program/physical model at run time, i.e., during execution.

In other embodiments, the (at least a portion of the) PMIDE may provide any functionality desired. Note that the PMIDE may facilitate development of parts of the graphical program implementing portions of the physical model under respective physical domains, where, in some embodiments, the different physical domains may be modeled using various different models of computation or programming languages or paradigms. Thus, for example, in one embodiment, the PMIDE may allow physical model editing in the physical domains in accordance with their respective models of computation or programming languages. For example, in various embodiments, the PMIDE may facilitate editing the graphical program/physical model via textual editing, graphical data flow development, simulation development, object oriented programming, mathematical/symbolic editing, and so forth, as desired. In some embodiments, the GPEE may be a general IDE capable of the physical model functionality described above, as well as functionality for developing graphical programs in other domains or application areas. In some embodiments, e.g., where the GP comprises a graphical data flow program (GDFP), the GPEE may be or include at least a portion of a graphical data flow program development environment (GDFPDE).

In some embodiments, the GPEE may be operable to display a GUI in the web browser for receiving user input to and/or for displaying output from the GP implementing the physical model. For example, in some embodiments, the output may include animations illustrating the physical phenomena being modeled. As a simple example, a model of a pendulum may drive an animation of the pendulum which may be displayed in the GUI. Similarly, a thermodynamic model or simulation of a chemical heating tank may illustrate heat flow in the tank, e.g., via color. In another exemplary embodiment, a model of an electrical (or electronic) circuit implemented as a graphical program may illustrate the circuit as part of the graphical program itself, e.g., where, for example, the icons or nodes in the graphical program illustrate respective circuit components, and where, for example, an LED (light emitting diode) in the circuit may be shown to "light up" as appropriate per the circuit (model) operation. In other words, in some embodiments, the program may itself be or include an illustration of the physical phenomenon being modeled. In one particularly illustrative example, the implemented physical model may model or simulate heat flow or accumulation in a circuit, and thus may not only model the electronic behavior of the circuit, but may include thermodynamic aspects of the circuit, e.g., indicating heat flow or accumulation in the circuit by color. Thus, for example, if a particular component or region of the circuit indicates excessive heat, the developer may modify the model to add or modify a heat exchanger in the circuit (model), rearrange the components spatially, etc., to address the issues raised.

Figure 17B:
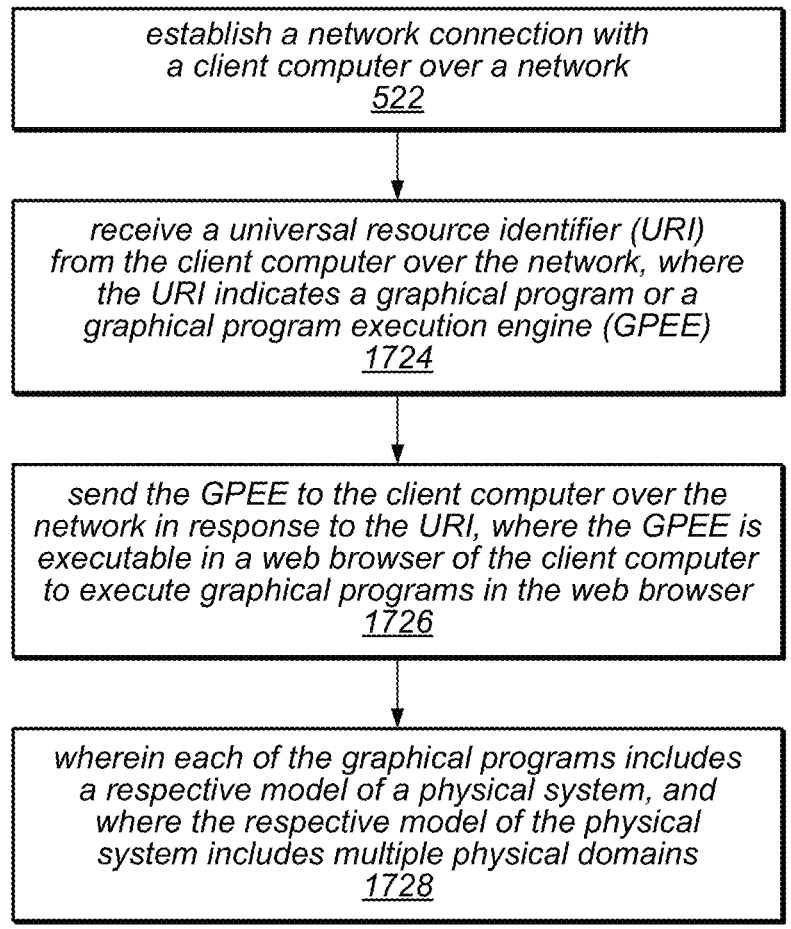

FIG. 17B—Flowchart of a Method for Executing a Physical Model with Multiple Physical Domains in a Browser—Server Side FIG. 17B is a flowchart diagram illustrating one embodiment of a method for executing a physical model with multiple physical domains via a web browser, from the perspective of a server computer, e.g., computer 90, or another computer. The method shown in FIG. 17B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 522, a network connection may be established with a client computer over a network.

In 1724, a universal resource identifier (URI) may be received from the client computer over the network, where the URI indicates a graphical program that implements a physical model (PM) or a GP execution engine (GPEE) that may be or include a physical model execution engine (PMEE). As noted above, the GPEE may be executable in a web browser to execute physical models that include two or more physical domains, e.g., two or more of electrical, chemical, mechanical, hydrodynamic, thermodynamic, and so forth, and the physical model (which may or may not already exist) may include two or more physical domains.

In 1726, the GPEE may be sent to the client computer over the network in response to the URI. As described above, the GPEE may be executable in a web browser, e.g., in a sandbox. Operation of the GPEE on the client computer is described above with reference to FIG. 17A. As noted above, in various embodiments, any of the features and techniques disclosed herein with respect to one method may be used in any others of the methods as desired. One particular example of such broadly applicable features is the ability to save a downloaded execution engine and a program, e.g., a graphical program, locally on the client computer, where the saved execution engine is executable to execute (which may include interpretation of) the saved program without a web browser.

Thus, summarizing one embodiment of the above methods, a user may open a browser and access a URI at a server, where the URI references an existing graphical program implementing a physical model and/or a development environment, e.g., a physical model development system, (or portion thereof), e.g., a graphical program/physical model editor, a graphical program/physical model execution system, and/or a graphical program/physical model analysis system, among others. As noted above, the physical model implemented by the graphical program, whether pre-existing or to be developed, includes two or more physical domains. The server may provide the GPEE, and if the graphical program already exists, may also provide the graphical program implementing the physical model. The GPEE then executes in the user's browser, allowing the user to execute, and possibly, to develop, and/or analyze, the graphical program/physical model in the browser. The graphical program/physical model may be saved or deployed locally and/or to a remote device, e.g., the server.

As described above, the GPEE (or PMIDE) may be executable in a web browser, e.g., in a sandbox, possibly implemented by or via a plugin. The nature and operation of the GPEE is described above with reference to FIG. 17A, as are various embodiments of the physical model, and so for brevity are not re-presented here.

Figure 18A:
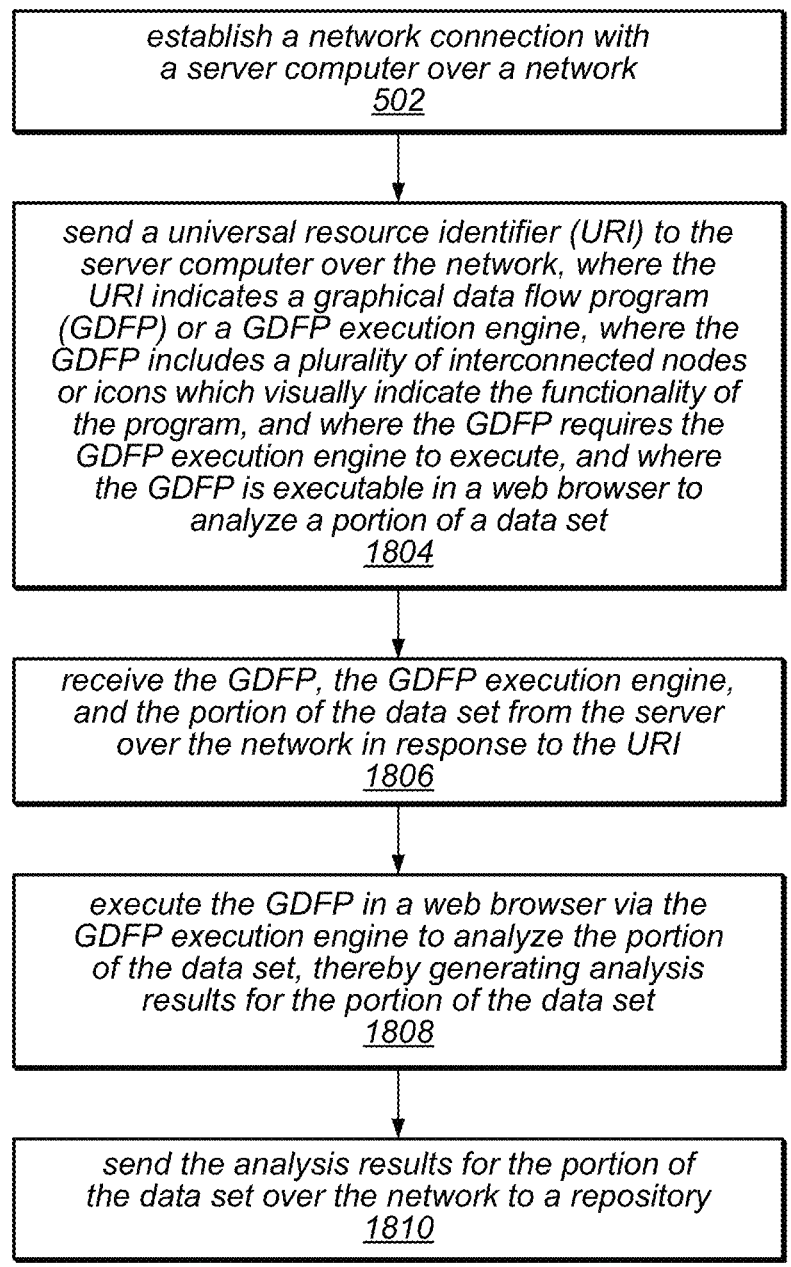
FIGS. 18A and 18B are flowchart diagrams illustrating embodiments of a method for cooperative execution of graphical data flow programs in multiple web browsers.

FIG. 18A—Flowchart of a Method for Cooperative Execution of Graphical Data Flow Programs in Multiple Web Browsers—Client Side FIG. 18A is a flowchart diagram illustrating one embodiment of a method for cooperative execution of graphical data flow programs in multiple web browsers, from the perspective of a client computer. The method shown in FIG. 18A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a network connection may be established with a server computer. In one embodiment, the network connection may be established between each of a plurality of client computers and the server computer, such as computer 90. The server computer may store a graphical data flow program (GDFP), where the GDFP includes a respective plurality of interconnected nodes or icons which visually indicate the functionality of the program, as well as a graphical data flow program execution engine (GDFP execution engine) required by the GDFP to execute. Additionally, the server computer may store a data set for which processing or analysis is desired. The GDFP may be executable in respective web browsers of the client computers to analyze or otherwise process respective portions of the data set.

In 1804, a universal resource identifier (URI) may be sent to the server computer from the client computer, or, in some embodiments, from each of the client computers over the network, where the URI indicates the GDFP, the GDFP execution engine, the data set, and/or the server itself.

In 1806, the GDFP and the GDFP execution engine may be received by the client computer, or in some embodiments, by each client computer, over the network in response to the URI. The GDFP execution engine may be configured to execute in a sandbox, e.g., a secure execution environment, possibly implemented by a plugin. Moreover, a respective portion of the data set may also be received by the client computer, or in some embodiments, respective portions of the data set may be received by each of the plurality of client computers.

In 1808, the GDFP execution engine may be executed in a web browser of the client computer to analyze the respective portion of the data set, thereby generating analysis results. In plural client system embodiments, the GDFP execution engine may be executed in a respective web browser of each of the plurality of client computers to analyze the respective portion of the data set, thereby generating respective analysis results. In some embodiments, the (client) user may aid in the analysis of the data. For example, the method may include receiving user input to and display output from the GDFP to allow the user to assist in the analysis of the portion of the data set.

As with the above methods, in some embodiments, the GDFP execution engine is or includes an interpreter, and executing the GDFP in the web browser may include the GDFP execution engine interpreting the GDFP, and so rather than compiling the graphical source code of the GDFP to generate an executable, the GDFP execution engine may interpret the (graphical source code of the) GDFP at runtime, i.e., making a compiler unnecessary.

Moreover, in one embodiment, the GDFP execution engine and the GDFP may be savable on the client computer, where the saved GDFP execution engine is executable on the client computer to execute the saved GDFP without the web browser. In other words, the GDFP execution engine may not require a web browser or web browser plugin to execute the GDFP.

In 1810, the analysis results for the portion of the data set may be sent to a repository, e.g., on a server computer, over the network, which in some embodiments may be included on the server computer. In plural client system embodiments, the respective analysis results for the respective portions of the data set may be sent to the repository over the network, e.g., for collection, assembly, storage, and possibly further analysis.

In some embodiments, the GDFP execution engine may further execute in the web browser of each client computer to receive analysis results for the data set (or portions of the data set) over the network, and display the analysis results in the web browser. More generally, in one embodiment, the method may include displaying a representation of the data set (or portion of the data set) in the web browser, or displaying the analysis results for the portion of the data set in the web browser.

In some embodiments, the GDFP may be embedded in a web page, where the URI references the web page, thereby indicating the GDFP, and where receiving the GDFP execution engine from the server computer over the network in response to the URI comprises receiving the web page from the server computer over the network, including the GDFP and the GDFP execution engine. Similarly, executing the GDFP in a web browser via the GDFP execution engine may include displaying the web page on a display, and displaying the analysis results for the portion of the data set in the web page on the display.

In one embodiment, the GDFP execution engine includes a GDFP player, and so executing the GDFP in a web browser via the GDFP execution engine may include executing the GDFP in a web browser via the GDFP player, e.g., an execution engine configured to execute in an unsecure execution environment.

In some embodiments, the GDFP execution engine may be executable in a web browser on the client system to execute the GDFP in the web browser as a screensaver. In other words, the GDFP execution engine may execute the GDFP in the web browser when an "idle" condition of the client computer occurs, and may display graphics that are dynamic enough to avoid static screen burn, or that are pleasing or interesting to the eye. Note that in various embodiments, the GDFP execution engine and GDFP may be downloaded from the server computer each time the screensaver triggers, or may be downloaded once, and executed each time the screensaver triggers.

Once the portion of the data set has been analyzed, an indication of completion of the analysis of the portion of the data set may be sent to the server computer. Another portion of the data set may then be received from the server computer over the network, and the GDFP may be executed in the web browser via the GDFP execution engine to analyze the other portion of the data set, thereby generating analysis results for the other portion of the data set, and the analysis results for the other portion of the data set sent over the network to the repository. Moreover, the sending an indication, receiving another portion, executing the GDFP, and sending the analysis results, may be repeated for further portions of the data set in an iterative manner. In other words, as each client computer finishes analyzing its respective portion of data, it may send an indication to that effect to the server computer, which may send further data for analysis in response, where this process is repeated one or more times in an iterative manner.

Figure 18B:
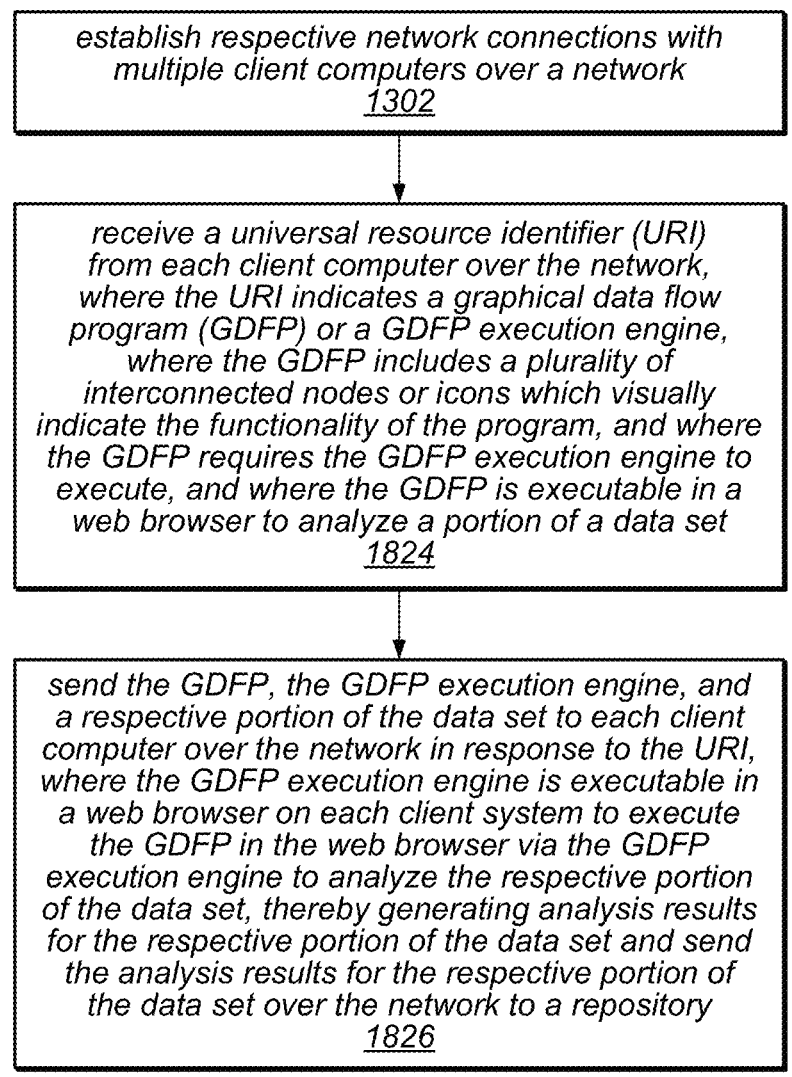

FIG. 18B—Flowchart of a Method for Cooperative Execution of Graphical Data Flow Programs in Multiple Web Browsers—Server Side FIG. 18B is a flowchart diagram illustrating one embodiment of a method for cooperative execution of graphical data flow programs in multiple web browsers, but from the perspective of a server computer, e.g., computer 90, or another computer. The method shown in FIG. 18B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1302, a network connection may be established with each of a plurality of client computers over a network. More specifically, the network connection may be established between each client computer and a server computer, such as computer 90, where the server computer stores a graphical data flow program (GDFP), where the GDFP comprises a respective plurality of interconnected nodes or icons which visually indicate the functionality of the program, as well as a graphical data flow program execution engine (GDFP execution engine) required by the GDFP to execute. Additionally, the server computer may store a data set for which processing or analysis is desired. The GDFP may be executable in web browsers of the client computers to analyze or otherwise process respective portions of the data set.

In 1824, a universal resource identifier (URI) may be received from each of the client computers over the network, where the URI indicates the GDFP, the GDFP execution engine, the data set, and/or the server itself.

In 1826, the GDFP, the GDFP execution engine, and a respective portion of the data set may be sent to each client computer over the network in response to the URI. As described above, the GDFP execution engine may be configured to execute in a sandbox, e.g., a secure execution environment. The GDFP execution engine may be executable in a web browser on each client computer (e.g., in the sandbox) to execute the GDFP in the web browser to analyze the respective portion of the data set, thereby generating analysis results, and to send the analysis results for the respective portion of the data set over the network to a repository, e.g., the server computer.

In embodiments, e.g., where the repository is the server computer (or another computer), the method may include the server computer executing analysis software to organize and/or analyze the analysis results for the respective portions of the data set analyzed by the plurality of client computers, and possibly sending the analysis results and/or the data set (or portion(s) of the data set) to each client computer over the network, e.g., for display in the web browser.

Operation of the GDFP execution engine on the client computer(s) is described above with reference to the method of FIG. 17A, which also indicates or implies various server operations and functionality. For example, as noted above, in some embodiments, the repository may be comprised on the server computer, e.g., in a memory medium of the server computer, and so the method may further include receiving and storing the analysis results from each client computer.

As another example, in some embodiments, the (server-side) method may further include analyzing the received analysis results from each client computer, and possibly sending the received analysis results to each client computer.

Moreover, as also mention or indicated above in the client side method, in some embodiments the (server side) method may include receiving an indication of completion of the analysis of the (respective) portion of the data set from each client computer, and sending another respective portion of the data set to each client computer over the network in response to the indication, where the receiving an indication, and sending another respective portion of the data set, may be repeated for further respective portions of the data set in an iterative manner.

Thus, summarizing one embodiment of the above methods, multiple users may open respective browsers and access a URI at a server, which provides a graphical program and graphical data flow program execution system to each user's browser, along with a respective portion of a data set to be analyzed or processed. The execution systems on each user system may execute the graphical program to analyze respective portions of a data set for the graphical program in the browser concurrently. Results of the execution may be provided to a server or repository, and/or to each of the browsers.

Figure 19:
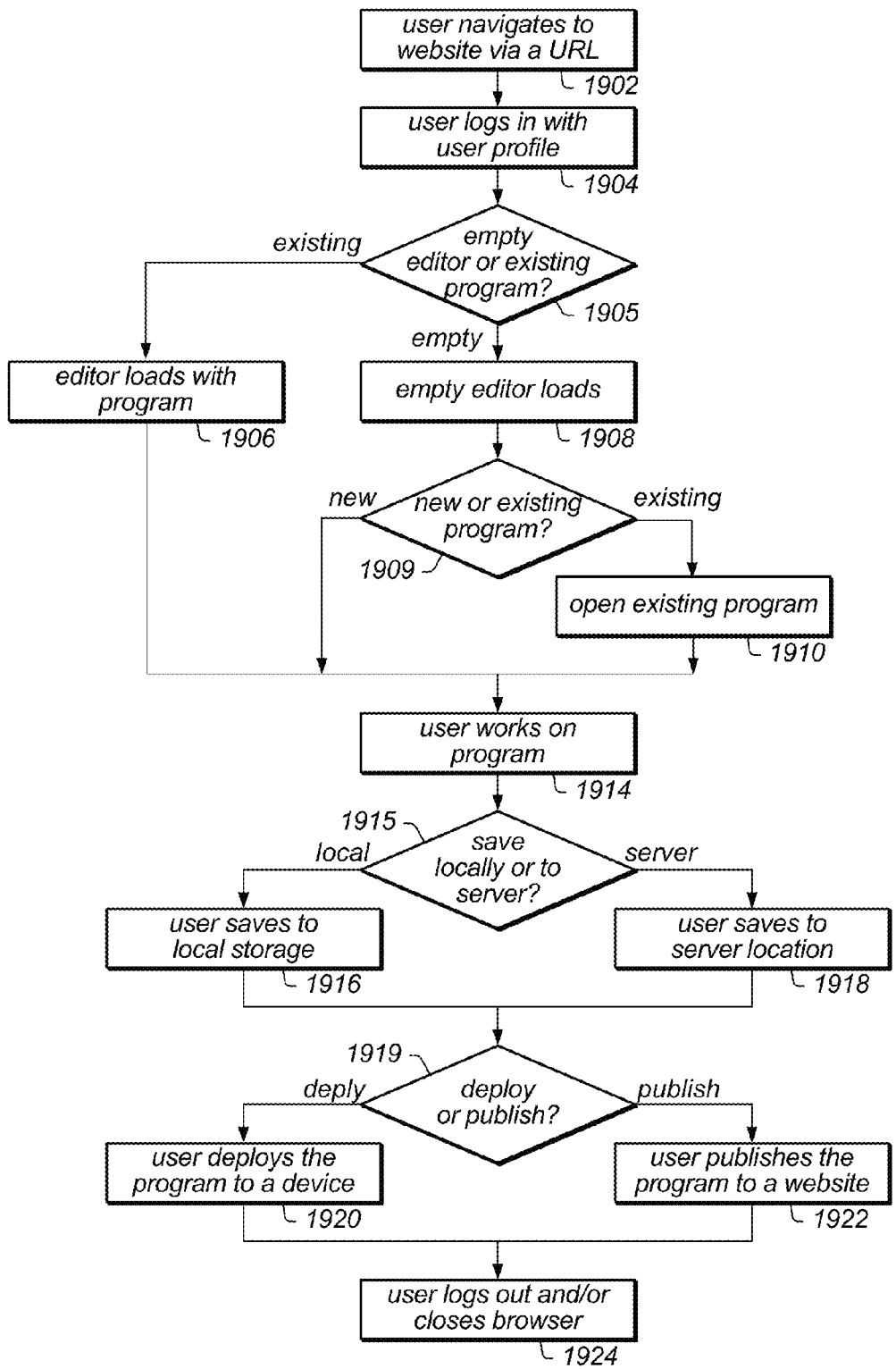
FIG. 19 is a flowchart diagram illustrating one embodiment of an exemplary user experience with respect to shared or community based program development.

FIG. 19—Flowchart of Exemplary User Experience

FIG. 19 is a flowchart of method that represents or illustrates an exemplary user experience with respect to shared or community based program development, according to one embodiment. It should be noted, however, that the method/experience shown is exemplary only, and is not intended to limit the method or user experience to any particular function, form, or appearance.

As may be seen, in 1902, a user may navigate to a website via URL, e.g., where the URL may refer to a specified or special web site or resource, e.g., a server, whereby graphical programs, possibly including experimental or untested programs, may be developed, and may log in with a user profile, as indicated in 1904. A determination as to whether an empty program editor or an example program is being accessed may be made, as shown in 1905.

In 1906, if the example program is indicated, the editor may load with the example program, otherwise, the editor may load empty, as indicated in 1908, where "load" refers to being deployed to the client computer for editing, viewing, or execution in a web browser. In other words, the user may invoke an editor to create a new program, or to edit an existing program.

Thus, a user may navigate to a developer and/or user community website or resource indicated by or associated with the URL, e.g., the URL may refer to a web site or resource where community programs may be stored for subsequent use, e.g., for replicating, linking, viewing, or editing, by a community of users or developers (e.g., where the level of access or privileges may be specified for users in the community through permissions), and may invoke an editor, which may be loaded with a specified program, or may load empty, e.g., for development of a new program. For example, the user may browse available graphical programs on the web site, and indicate one for use. Alternatively, in some embodiments, the URL provided by the user may specify the program (also thereby specifying the server indirectly), as discussed in various of the methods described above.

In 1909, since the editor is empty, a determination may be made as to whether the program to be edited is new or existing, and if existing, may be opened in the editor, as shown in 1910. In other words, if the editor is invoked empty, then the user may still specify a pre-existing graphical program to open (1910), or may decide to create a new graphical program.

In 1914, the user may work on the program (e.g., application), e.g., may edit the program. Exemplary descriptions of creating and editing graphical programs are provided below.

In 1915, a determination may be made as to whether to save the edited program locally or to the server, and the user may save to local storage, as indicated in 1916, or to the server location, indicated in 1918, accordingly.

In 1919, a determination may be made as to whether to deploy or publish the edited program, and the user may accordingly deploy to a device, e.g., to a server, a controller, a user computer, a thin client, etc., as desired, as indicated in 1920, or may publish the program to the web, e.g., as a release program to the community, as indicated in 1922, e.g., for subsequent downloading by other community members.

Finally, in 1924, the user may log out and/or close the browser. Alternatively, prior to logging our or closing the web browser, the method may proceed to 1905 and continue as described above, e.g., with respect to another pre-existing graphical program, or creating a new graphical program. In other words, the method may iterate, allowing the user to create and/or edit multiple graphical programs, as desired.

The following describes one exemplary embodiment of the above user experience where the graphical program is a Web LabVIEW application and the website is operated and maintained by National Instruments Corporation (NI), although it should be noted that the user experience described is illustrative only, and is not intended to limit the experience to any particular form or functionality.

In this exemplary embodiment, the user navigates to a Web LabVIEW landing page via a URL (e.g., hosted on an NI server). The user can now either open an example program (e.g., created by developers at NI) or a program created by a member of the community (possibly by himself) in a Web LabVIEW IDE, or the user can just launch the Web LabVIEW IDE (e.g., editor) with no starting program open. With the latter case, the IDE opens up blank, at which point the user can either create a new program or open an existing program from the server or from his local machine. The user then works on the program, and when ready to save the work, the user can save it either to the ni.com server or to the user's local machine. Any program created by a user may be deployed (e.g., to a hardware target) from within the IDE (editor). If the user chooses to do this, a URL may be provided that may be used to access the program that is now being served up from the hardware target. A user may also choose to share the program with the community (e.g., of developers or users). Again, the user may choose this option within the editor and will then be given a choice on whether other community users can only view the running application or view the graphical source code as well. The user may receive an embed tag (should the user choose to embed a LabVIEW player to host the running program on a webpage of the user's choice) or a Web LabVIEW community web page that already contains the LabVIEW player to host the running program. When the user is done with the Web LabVIEW editor, the user can simply close the browser (or logoff the website).

Other Embodiments

Figure 22:
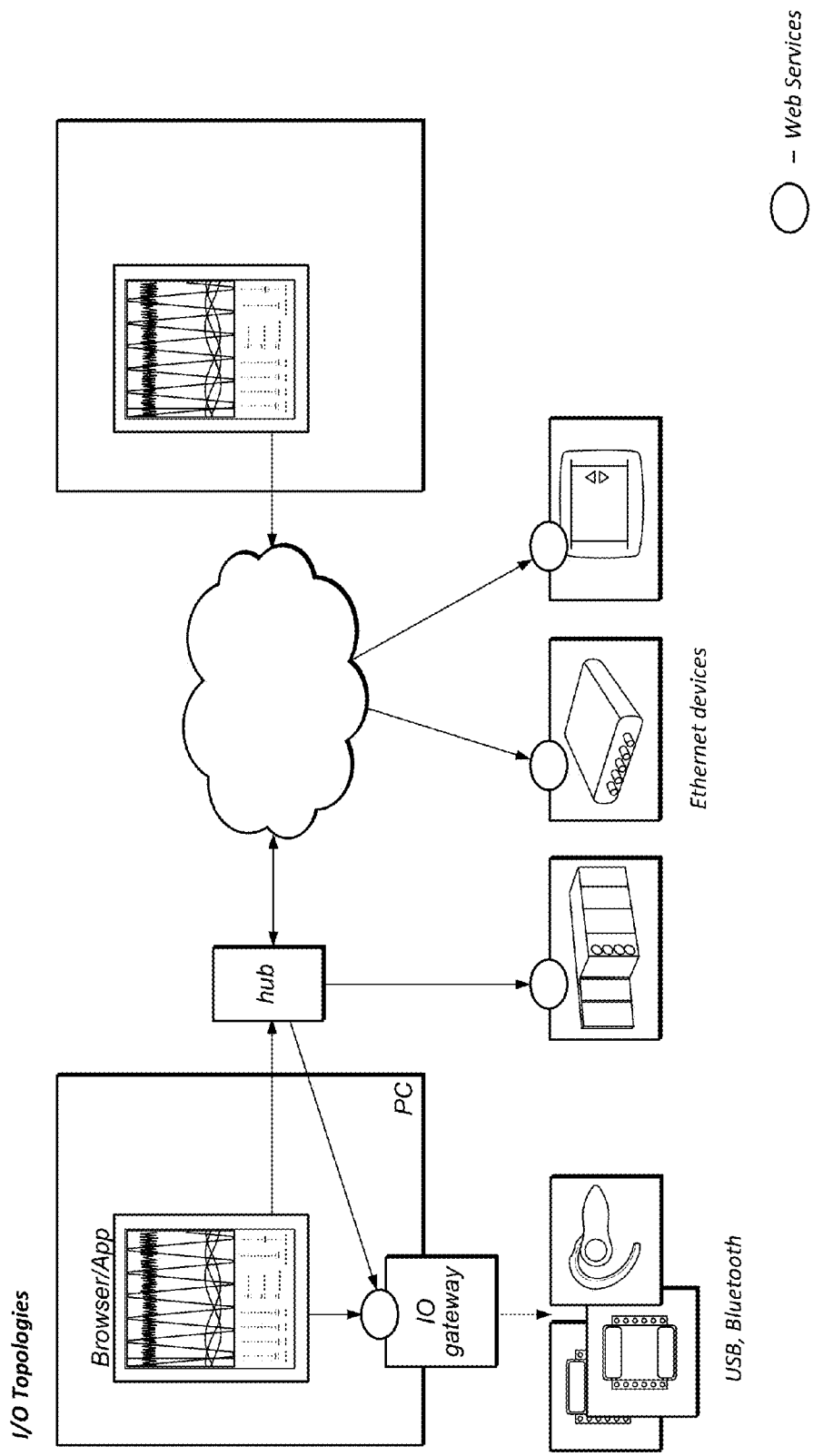
FIG. 22 illustrates exemplary I/O topologies for a web application, according to one embodiment.

The following describes various exemplary embodiments and variants of some of the above-described methods.
Implementing a Dynamically Typed Mathematical Scripting Language in a Browser In one embodiment, a dynamically typed mathematical scripting language, e.g., Mathscript™, provided by National Instruments Corporation, or MatLab™, provided by The MathWorks, may be implemented in a web browser, similar to the graphical programming languages and programs discussed above. For example, in a Mathscript embodiment, a user may open a browser and access a URI at a server, and the server may provide the Mathscript editor and execution engine (and possibly a script, i.e., a Mathscript program) to the user's computer system, or more specifically, to a web browser executing on the computer system, and the user may execute (and in some embodiments, create, edit, analyze, debug, etc.) the script. In various embodiments, any of the techniques discussed above with respect to programs, e.g., graphical programs, may be implemented for such mathematical scripting languages and scripts or programs.
Static Program Analysis In one embodiment, a server computer (or collection of server computers) may receive graphical programs, e.g., graphical program source code, from a plurality of developers, e.g., via any of the applicable techniques discussed above, and the server may execute analysis software to statically (e.g., at edit (or compile) time, or, more generally, not at runtime) analyze the graphical programs and provide feedback to the developers regarding their programs, either singly, or collectively. For example, the server may determine all graphical programs (VIs) that use a particular set of graphical program nodes, or may determine and suggest ways for developers to speed up their code, or otherwise optimize the programs, among others. In some embodiments, other developers or users may contribute to the analysis, and may provide developer feedback regarding any of the programs. For example, developers may access programs and/or program execution results on the server, and post comments or suggestions regarding the programs. In another embodiment, program developers may post questions regarding their or other programs, and other developers (members of the community) may respond, e.g., after analyzing the programs in question. Thus, in various embodiments, both automatic and manual static analysis of the graphical programs may be performed.
FIG. 22—I/O Topologies FIG. 22 illustrates exemplary I/O topologies wherein a web application, e.g., a program as discussed above, running in an execution sandbox may access hardware through web services, represented by ovals at the tips of arrows that themselves represent transmission media, e.g., routes, paths, etc. For example, as FIG. 22 shows, the web application, labeled "Browser/App" may utilize web serves to access local hardware, e.g., USB devices, Bluetooth devices, etc., via an I/O gateway, to access intranet devices, e.g., Ethernet devices, via a hub, or to access internet devices, e.g., Ethernet devices, via the Internet (or other WAN). Per the legend at the bottom right of the figure, the web service functionalities facilitating hardware access are denoted by respective ovals.

Figure 23:
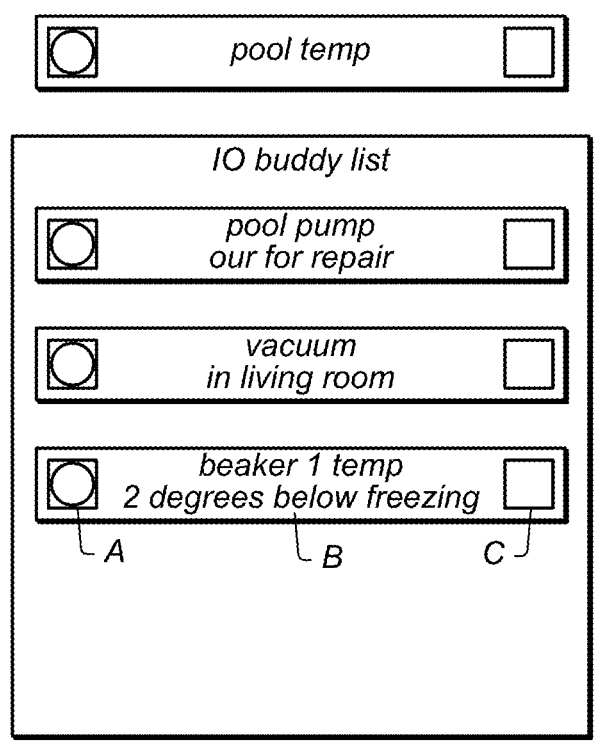
FIG. 23 illustrates an exemplary embodiment of a "hardware buddy list" of I/O devices for a web application.

Note that in prior art approaches, when a hardware device or other resource is being used or accessed by an application, no other applications may use or access that device. In contrast, according to embodiments presented herein, multiple browser applications may access or use the same devices or resources simultaneously, as indicated by the second browser/app shown in the right side of FIG. 22.
FIG. 23—I/O Resources Buddy List Related to the above capability of browser applications accessing and using hardware resources, FIG. 23 illustrates an exemplary embodiment of GUI fir displaying such hardware resources, where the GUI is implemented as a "hardware buddy list", similar to the buddy lists of social networking sites. In one embodiment, a development environment (or some portion thereof) downloaded to the user's client computer may execute in the web browser to determine and display the hardware buddy list. The hardware buddy list may display I/O devices for possible use by the user's programs (e.g., web applications), and may indicate each I/O device's status, e.g., whether the device is in use, offline, restarting, fault, pin level, and so forth, among others, based on which devices are currently "logged on" to the network.

Figure 24:
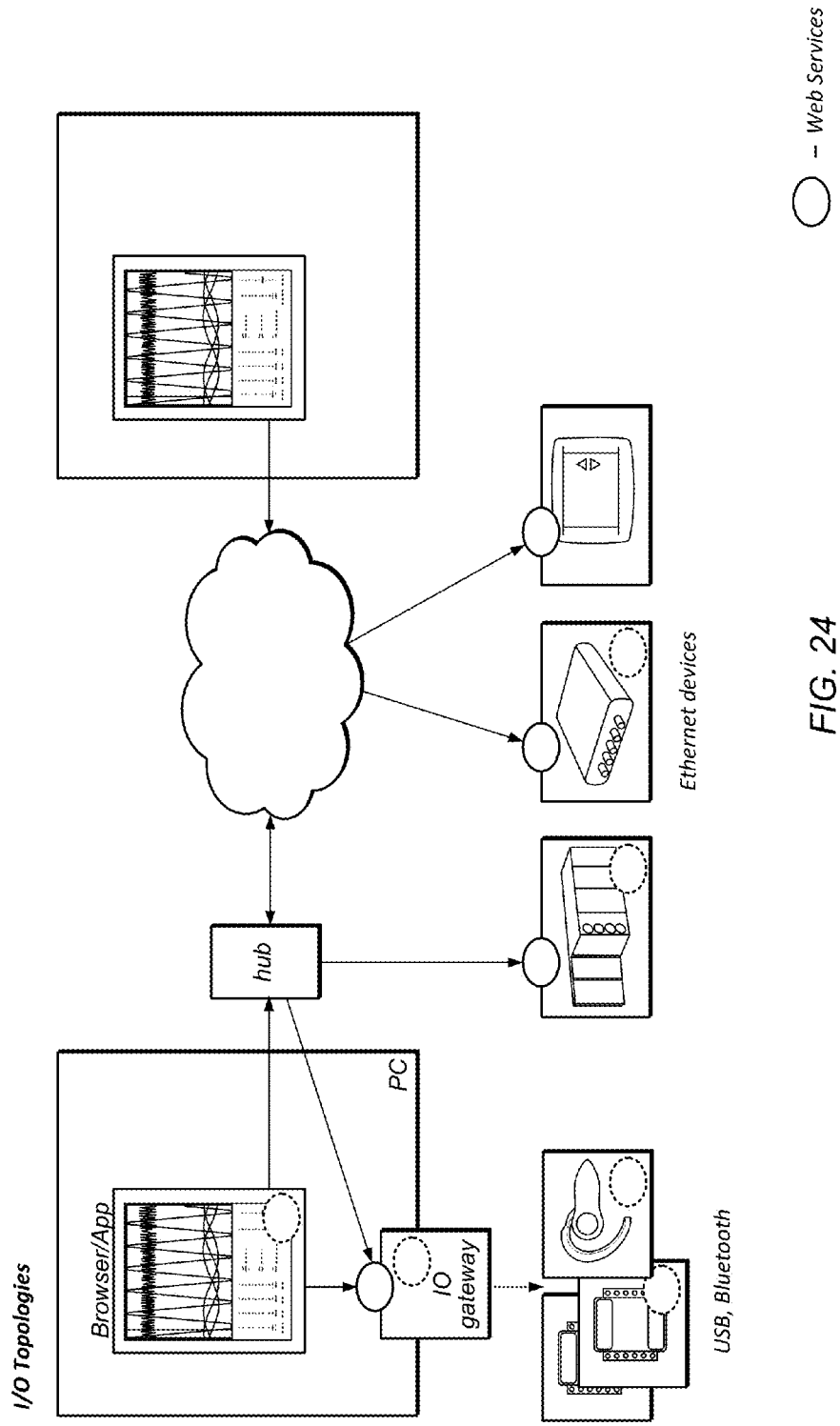
FIG. 24 illustrates exemplary execution topologies for a web application, according to one embodiment.
Figure 25:
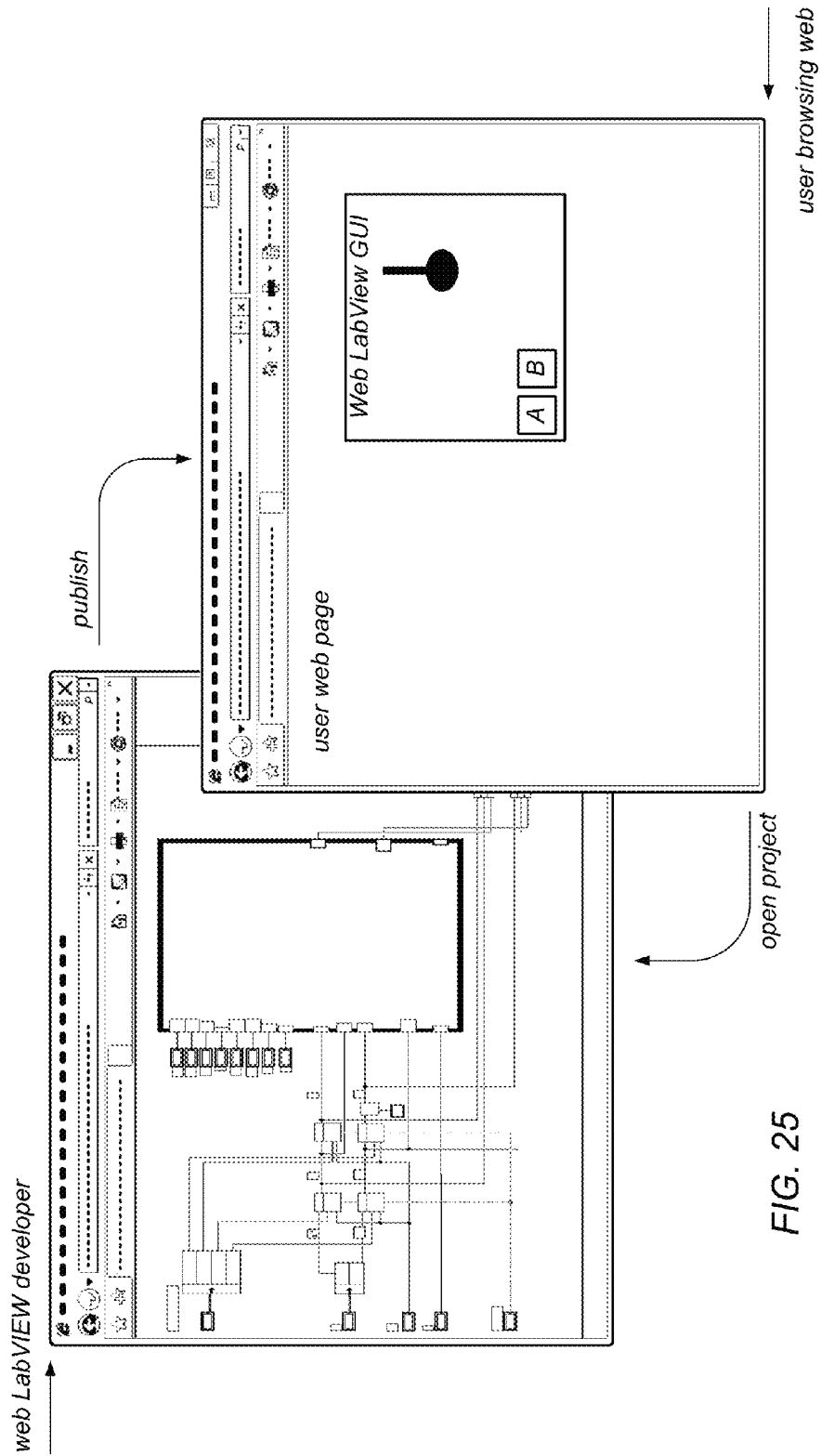
FIG. 25 illustrates an exemplary development system or cycle for a web-based interactive development environment (IDE), according to one embodiment.

In various embodiments, further hardware resources, e.g., hardware "buddies", may be added, e.g., via a hardware gateway application GUI, or through remote administration of a gateway application, among other methods. Moreover, in some embodiments, such a hardware gateway may implement or participate with instant messaging type services.
FIG. 24—Execution Topologies FIG. 24 illustrates exemplary execution topologies wherein a web application, e.g., a program as discussed above, running in an execution sandbox (possibly implemented via a plugin) may be deployed to and may execute on various hardware devices through web services, represented by ovals at the tips of arrows representing transmission media, e.g., routes, paths, etc., in "virtual machine" environments, as indicated by the legend. For example, as FIG. 24 shows, the web application, labeled "Browser/App" may utilize web serves to execute on local hardware, e.g., USB devices, Bluetooth devices, etc., via an I/O gateway, on intranet devices, e.g., Ethernet devices, via a hub, or on internet devices, e.g., Ethernet devices, via the Internet (or other WAN).
FIG. 25—Web-Based Program Development FIG. 25 illustrates an exemplary development system and cycle, where the developer, e.g., a Web LabVIEW developer, builds programs, e.g., graphical data flow programs (e.g., VIs) in a web based IDE, within which the programs can be create/edited, and possibly tested. An exemplary IDE is shown in the top left portion of FIG. 25. As indicated, once the developer has developed the program or project (in the developers web browser), the developer may publish the program, e.g., to a web server accessible to others. As also indicated, in some embodiments, a user that has examined or otherwise used the published program may (under certain circumstances, e.g., with the appropriate permissions) open a corresponding project and edit the program, after which the edited program may be published, and so forth, in an iterative manner. See, for example, embodiments described above with respect to the graphical program repository of FIG. 12. Note that version control may be utilized to retain previous versions of the programs.

In some embodiments, once a project has been published, other users may embed the user interface of the program in other web pages. Thus, people that visit these web pages may see the user/web content with the program's GUI (e.g., front panel) embedded. The embedded program may begin running when the containing web page is loaded, or may start running in response to user input, e.g., when a button on the page is pressed (e.g., "A"), among other initiation means. In some embodiments, controls or GUI panels may also contain a link (e.g., "B") that may take users directly to the original project, e.g., stored in a repository, or on the developer's computer. If the link is followed (for example, by clicking on it in the browser) then the project may be loaded immediately, allowing new users to see how the program was implemented, make their own copy of it and modify it, etc. without the need to install a specific development tool.

Figure 26:
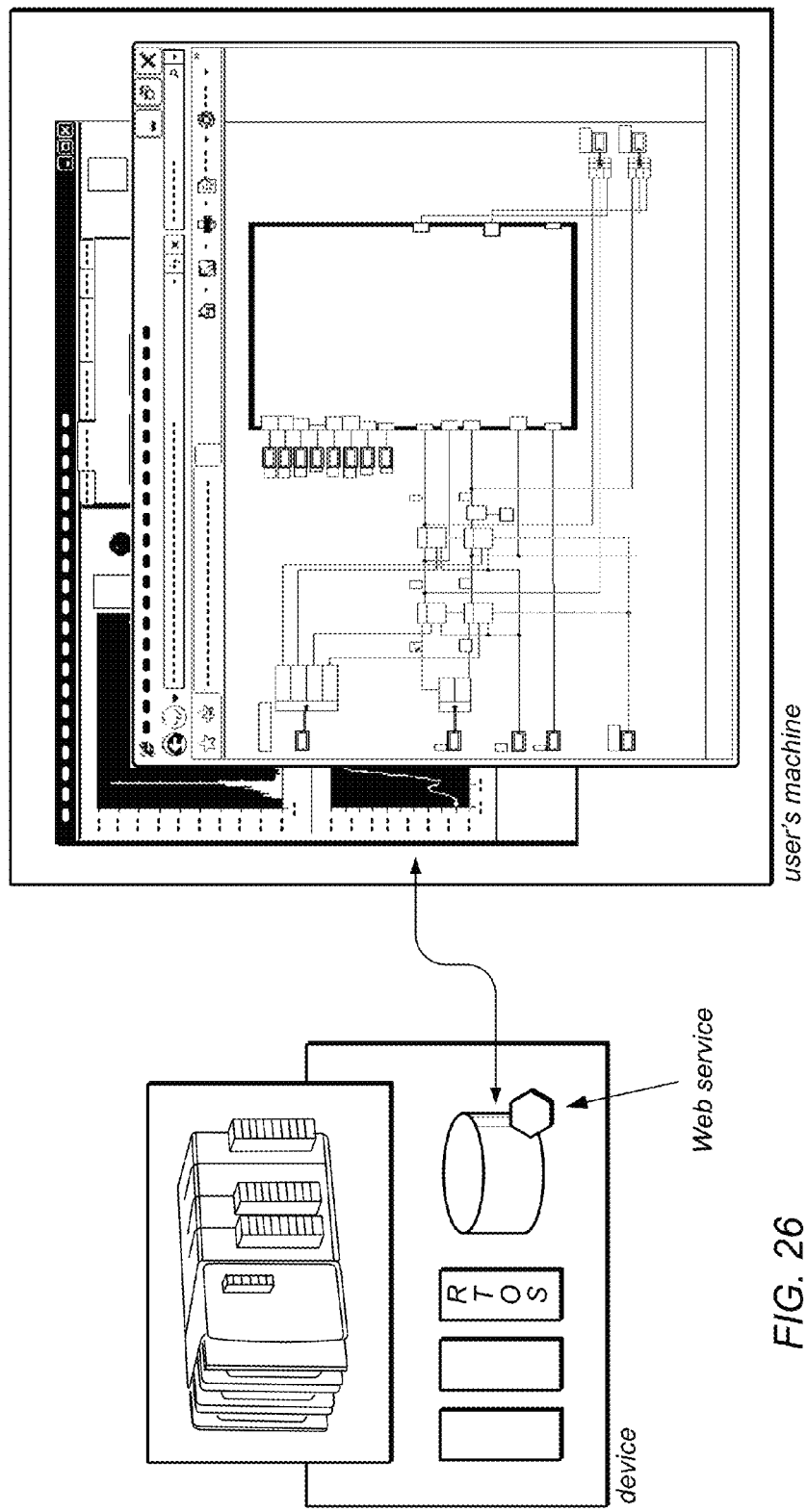
FIG. 26 illustrates utilization of resources by a web application without requiring the Internet.

FIG. 26—Smart Hardware

FIG. 26 illustrates utilization of resources by a web application without requiring the Internet (or other WAN). More specifically, a user's machine, e.g., a client computer, may communicate with hardware via a web server that provides I/O web service, here denoted by a hexagon, and labeled accordingly. The web server may also serve content that implements a web-hosted IDE or portion of such an IDE, as described in detail above. Thus, in one embodiment, an IDE, such as Web LabVIEW™, may provide authoring tool for panels (e.g., GUIs) or programs ultimately stored directly on embedded Ethernet devices. In another embodiment, a "light weight" IDE, e.g., Web LV with a reduced feature set or footprint, may be hosted by the device for diagram configuration of state machines, system diagrams, or perhaps graphical programs themselves.

Note that in some embodiments, the hardware may be an embedded device, e.g., running a real time operating system (RTOS), as also indicated in FIG. 26. The exemplary device shown includes a chassis and multiple modules, e.g., for providing industrial functionality such as measurement, automation, control, or analysis, among others. Thus, a graphical program executing on a client computer may use, communicate with, or otherwise invoke functionality of hardware (including software executing on the device) coupled to the client computer.

Figure 27:
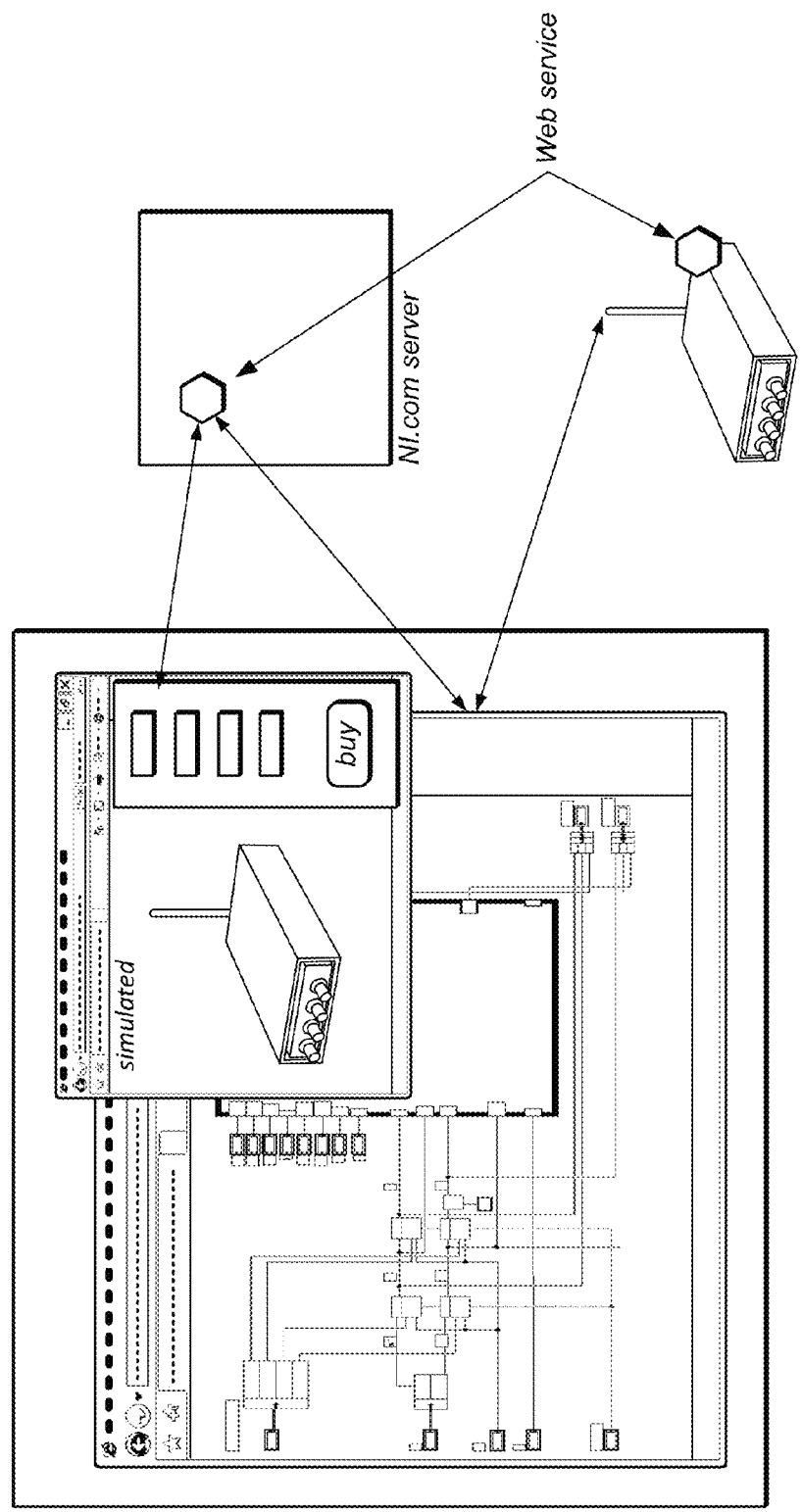
FIG. 27 illustrates utilization of a "hardware" resource by a web application, where the resource is a hardware device, or a simulation of the hardware device, according to one embodiment.

FIG. 27—Hardware and Simulations

FIG. 27 illustrates utilization of a "hardware" resource by a web application, e.g., a graphical program per embodiments disclosed herein, where the "hardware" may be actual hardware, or a simulation of such hardware, via a web server that provides I/O web services, again, denoted here by hexagons. As indicated in FIG. 27, a user's machine, e.g., a client computer, executing the web application (represented by the graphical program on the left side of FIG. 27), may communicate with or utilize a hardware device via an embedded web server executing on the device, or may communicate with or utilize a simulation of the hardware device via an a web server executing on a networked computer system, e.g., a simulation server computer.

As also indicated in FIG. 27, in some embodiments, once the user has tested the web application with the simulation, the user may be provided the opportunity to purchase the actual hardware corresponding to the simulated device, e.g., via a "buy" option, as shown.

Further Concepts:

The below describes additional ideas related to embodiments of the above systems and methods particularly directed to LabVIEW-based implementations. It should be noted that these implementations are intended to be exemplary only, and are not intended to limit the inventions to any particular platform, programming language, or programming paradigm.

Device Based Web LabVIEW

Device based LabVIEW may be a version of LabVIEW accessible from a browser and served from a web server embedded in an embedded device, e.g., somewhat similar to configurations pages on a Ethernet router, except that it refers to a more general IDE for program development. For example, in one embodiment, the embedded web content supplied with the device may include the Web LabVIEW and quick-start sample applications, e.g., tuned to ensure success with that specific hardware. The source for the sample applications may be loaded in Web LabVIEW for users to try out or to modify.

Internet Based Web LabVIEW

Internet Web LabVIEW may use the same browser hosted graphical program editor as the device based version, but may be hosted from a server, e.g., ni.com, not an embedded device, and may include all the standard social networking elements of a web community, such as, for example, sharing projects, making copies, tracking usage, commenting, and so forth.

The graphical program (e.g., VI) may be compiled within the browser application directly, or may be saved to the server (embedded or Internet), where a web service may perform the compilation and return the results for execution in the browser. The compiled result of the program (compiled in the browser or by the server) may also be deployed to execute on targets other than the original browser, e.g., embedded devices, cloud computing hosts, web servers, and so forth.

As indicated above, in some embodiments, the graphical program may be executed by an interpreter, and so a compiler or separate compilation step may not be required.

Creation of a Graphical Program

The following describes various exemplary ways and means for creating a graphical program.

The graphical program may be created or assembled by the user arranging on a display a plurality of nodes or icons (e.g., by dragging and dropping the nodes or icons onto a block diagram) and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. In other embodiments, the graphical program may be generated automatically, or received from an external source.

In a more specific embodiment, a graphical user interface or front panel for the graphical program may be created, e.g., in response to user input. The graphical user interface may be created in any of various ways, e.g., depending on the graphical programming development environment used. A block diagram for the graphical program may be created. The block diagram may be created in or using any graphical programming development environment, such as LabVIEW, Simulink, VEE, or another graphical programming development environment. The block diagram may be created and edited in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, where the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-accessible memory medium that stores program instructions executable by a processor to:
   establish a network connection with a client computer over a network;
   receive a universal resource identifier (URI) from the client computer over the network, wherein the URI indicates a graphical data flow program (GDFP) or a graphical data flow program editor (GDFP editor) for creating or editing the GDFP;
   send the GDFP editor to the client computer over the network in response to the URI, wherein the GDFP editor is executable in a web browser on the client computer to:
     display the GDFP in the web browser on the client computer, wherein the GDFP comprises a plurality of interconnected nodes or icons which visually indicate the functionality of the program;
     receive user input indicating one or more edit operations to be performed on the GDFP;
     edit the GDFP in the web browser on the client computer in accordance with the one or more edit operations, thereby generating an edited GDFP; and
     display the edited GDFP in the web browser;
   wherein the GDFP has an associated representation implemented in a browser supported format, wherein the representation of the GDFP does not include the GDFP;
   wherein the representation of the GDFP is indexable for searching by search engines; and
   wherein the representation of the GDFP is downloadable to client systems for display in browsers on the client systems, including browsers that do not support execution of the GDFP.

2. The non-transitory computer-accessible memory medium of claim 1,
   wherein the GDFP is a pre-existing GDFP, wherein the GDFP editor is associated with the pre-existing GDFP, and wherein the URI specifies the pre-existing GDFP, thereby also indicating the associated GDFP editor; and
   wherein the program instructions are further executable to:
     send the GDFP to the client computer in response to the URI.

3. The non-transitory computer-accessible memory medium of claim 1,
   wherein the GDFP is not a pre-existing GDFP, wherein the URI specifies the GDFP editor; and
   wherein the GDFP editor is executable in the web browser to:
     receive user input specifying creation of the GDFP; and
     create the GDFP in response to the user input.

4. The non-transitory computer-accessible memory medium of claim 1, wherein the GDFP editor is configured to execute in a sandbox, wherein the sandbox comprises a secure execution environment for the GDFP editor, and wherein the GDFP editor being executable in the web browser comprises the GDFP editor being executable in the sandbox.

5. The non-transitory computer-accessible memory medium of claim 4, wherein the sandbox is implemented by a plugin, wherein the GDFP editor being executable in the sandbox comprises the GDFP editor being executable in the plugin.

6. The non-transitory computer-accessible memory medium of claim 1, wherein the GDFP editor is comprised in a graphical program development environment (GPDE), and wherein to send the GDFP editor to the client computer over the network, the program instructions are executable to:
   send the GPDE to the client computer over the network, wherein the GPDE further comprises a GDFP compiler and a GDFP execution engine;
   wherein the GDFP compiler is executable in the web browser of the client computer to:
     compile the edited GDFP in the web browser, thereby generating an executable of the edited GDFP; and
   wherein the GDFP execution engine is executable in the web browser of the client computer to:
     execute the executable of the edited GDFP in the web browser.

7. The non-transitory computer-accessible memory medium of claim 1, wherein the GDFP editor is comprised in a graphical program development environment (GPDE), and wherein to send the GDFP editor to the client computer over the network, the program instructions are executable to:

send the GPDE to the client computer over the network, wherein the GPDE further comprises a GDFP execution engine, and wherein the GDFP execution engine comprises an interpreter; and wherein the GDFP execution engine is executable in the web browser to:

execute the edited GDFP in the web browser by interpreting the edited GDFP.

8. The non-transitory computer-accessible memory medium of claim 1, wherein the program instructions are further executable to:

receive the edited GDFP from the client computer over the network for storage, compilation, analysis, or download by other users.

9. The non-transitory computer-accessible memory medium of claim 1, wherein to send the GDFP editor to the client computer over the network, the program instructions are further executable to:

send a GDFP execution engine to the client computer over the network;

wherein the program instructions are further executable to:

receive the edited GDFP from the client computer for compilation;

compile the edited GDFP, thereby generating an executable for the edited GDFP; and send the executable for the GDFP to the client computer;

wherein the executable is executable in the web browser of the client computer via the GDFP execution engine.

10. The non-transitory computer-accessible memory medium of claim 1, wherein to send the GDFP editor to the client computer over the network, the program instructions are further executable to:

send a GDFP execution engine to the client computer over the network wherein the GDFP execution engine comprises an interpreter;

wherein the GDFP execution engine is executable to:

execute the edited GDFP in the web browser by interpreting the edited GDFP in the web browser.

11. The non-transitory computer-accessible memory medium of claim 1, wherein the program instructions are further executable to:

receive the edited GDFP from the client computer; and
deploy the edited GDFP to one or more target devices.

12. The non-transitory computer-accessible memory medium of claim 1, wherein the representation of the GDFP comprises one or more of:

comments in the GDFP;
an indication of components referenced by the GDFP with links to the referenced components; or
notes regarding the GDFP.

13. The non-transitory computer-accessible memory medium of claim 1, wherein the browser supported format comprises one or more of:

HyperText Markup Language (HTML);
an image format; or
Portable Document Format (PDF).

14. The non-transitory computer-accessible memory medium of claim 1, wherein the program instructions are further executable to:
receive the edited GDFP from the client computer; and
generate and store the associated representation of the edited GDFP, wherein the representation of the edited GDFP does not include the edited GDFP;
wherein the representation of the GDFP is downloadable to client systems for display in browsers on the client systems, including browsers that do not support execution of the edited GDFP.

15. A computer-implemented method, comprising utilizing a computer to perform:

establishing a network connection with a client computer over a network;

receiving a universal resource identifier (URI) from the client computer over the network, wherein the URI indicates a graphical data flow program (GDFP) or a graphical data flow program editor (GDFP editor) for creating or editing the GDFP;

sending the GDFP editor to the client computer over the network in response to the URI, wherein the GDFP editor is executable in a web browser on the client computer to:

display the GDFP in the web browser on the client computer, wherein the GDFP comprises a plurality of interconnected nodes or icons which visually indicate the functionality of the program;

receive user input indicating one or more edit operations to be performed on the GDFP;

edit the GDFP in the web browser on the client computer in accordance with the one or more edit operations, thereby generating an edited GDFP; and display the edited GDFP in the web browser;

wherein the GDFP has an associated representation implemented in a browser supported format, wherein the representation of the GDFP does not include the GDFP;

wherein the representation of the GDFP is indexable for searching by search engines; and wherein the representation of the GDFP is downloadable to client systems for display in browsers on the client systems, including browsers that do not support execution of the GDFP.

16. The computer-implemented method of claim 15, wherein the GDFP is a pre-existing GDFP, wherein the GDFP editor is associated with the pre-existing GDFP, and wherein the URI specifies the pre-existing GDFP, thereby also indicating the associated GDFP editor, the method further comprising:

sending the GDFP to the client computer in response to the URI.

17. The computer-implemented method of claim 15, wherein the GDFP is not a pre-existing GDFP, wherein the URI specifies the GDFP editor; and wherein the GDFP editor is executable in the web browser to:

receive user input specifying creation of the GDFP; and
create the GDFP in response to the user input.

18. The computer-implemented method of claim 15, wherein the GDFP editor is configured to execute in a sandbox, wherein the sandbox comprises a secure execution environment for the GDFP editor, and wherein the GDFP editor being executable in the web browser comprises the GDFP editor being executable in the sandbox.

19. The computer-implemented method of claim 18, wherein the sandbox is implemented by a plugin, wherein the GDFP editor being executable in the sandbox comprises the GDFP editor being executable in the plugin.

20. The computer-implemented method of claim 15, wherein the GDFP editor is comprised in a graphical program development environment (GPDE), and wherein said sending the GDFP editor to the client computer over the network comprises:

sending the GPDE to the client computer over the network, wherein the GPDE further comprises a GDFP compiler and a GDFP execution engine;

wherein the GDFP compiler is executable in the web browser of the client computer to:
compile the edited GDFP in the web browser, thereby generating an executable of the edited GDFP; and
wherein the GDFP execution engine is executable in the web browser of the client computer to:
execute the executable of the edited GDFP in the web browser.

21. The computer-implemented method of claim 15, wherein the GDFP editor is comprised in a graphical program development environment (GPDE), and wherein said sending the GDFP editor to the client computer over the network comprises:
sending the GPDE to the client computer over the network, wherein the GPDE further comprises a GDFP execution engine, and wherein the GDFP execution engine comprises an interpreter; and
wherein the GDFP execution engine is executable in the web browser to:
execute the edited GDFP in the web browser by interpreting the edited GDFP.

22. The computer-implemented method of claim 15, the method further comprising:
receiving the edited GDFP from the client computer over the network for storage, compilation, analysis, or download by other users.

23. The computer-implemented method of claim 15, wherein said sending the GDFP editor to the client computer over the network comprises sending a GDFP execution engine to the client computer over the network, the method further comprising:
receiving the edited GDFP from the client computer for compilation;
compiling the edited GDFP, thereby generating an executable for the edited GDFP; and
sending the executable for the GDFP to the client computer;
wherein the executable is executable in the web browser of the client computer via the GDFP execution engine.

24. The computer-implemented method of claim 15, wherein said sending the GDFP editor to the client computer over the network further comprises:
sending a GDFP execution engine to the client computer over the network wherein the GDFP execution engine comprises an interpreter;
wherein the GDFP execution engine is executable to:
execute the edited GDFP in the web browser by interpreting the edited GDFP in the web browser.

25. The computer-implemented method of claim 15, further comprising:
receiving the edited GDFP from the client computer; and
deploying the edited GDFP to one or more target devices.

26. The computer-implemented method of claim 15, wherein the representation of the GDFP comprises one or more of:
comments in the GDFP;
an indication of components referenced by the GDFP with links to the referenced components; or
notes regarding the GDFP.

27. The computer-implemented method of claim 15, wherein the browser supported format comprises one or more of:
HyperText Markup Language (HTML);
an image format; or
Portable Document Format (PDF).

28. The computer-implemented method of claim 15, further comprising:
receiving the edited GDFP from the client computer; and
generating and storing the associated representation of the edited GDFP.

29. A non-transitory computer-accessible memory medium that stores program instructions executable by a processor to:
establish a network connection with a client computer over a network;
receive a universal resource identifier (URI) from the client computer over the network, wherein the URI indicates a graphical data flow program (GDFP) or a graphical data flow program editor (GDFP editor) for creating or editing the GDFP;
send the GDFP editor to the client computer over the network in response to the URI, wherein the GDFP editor is executable in a web browser on the client computer to:
display the GDFP in the web browser on the client computer, wherein the GDFP comprises a plurality of interconnected nodes or icons which visually indicate the functionality of the program;
receive user input indicating one or more edit operations to be performed on the GDFP;
edit the GDFP in the web browser on the client computer in accordance with the one or more edit operations, thereby generating an edited GDFP; and
display the edited GDFP in the web browser;
wherein the program instructions are further executable to:
receive the edited GDFP from the client computer; and
generate and store an associated representation of the edited GDFP, wherein the representation of the edited GDFP does not include the edited GDFP;
wherein the representation of the GDFP is downloadable to client systems for display in browsers on the client systems, including browsers that do not support execution of the edited GDFP.

30. The non-transitory computer-accessible memory medium of claim 29,
wherein the GDFP is a pre-existing GDFP, wherein the GDFP editor is associated with the pre-existing GDFP, and wherein the URI specifies the pre-existing GDFP, thereby also indicating the associated GDFP editor; and
wherein the program instructions are further executable to:
send the GDFP to the client computer in response to the URI.

31. The non-transitory computer-accessible memory medium of claim 29,
wherein the GDFP is not a pre-existing GDFP, wherein the URI specifies the GDFP editor; and
wherein the GDFP editor is executable in the web browser to:
receive user input specifying creation of the GDFP; and
create the GDFP in response to the user input.

32. The non-transitory computer-accessible memory medium of claim 29, wherein the GDFP editor is configured to execute in a sandbox, wherein the sandbox comprises a secure execution environment for the GDFP editor, and wherein the GDFP editor being executable in the web browser comprises the GDFP editor being executable in the sandbox.

33. The non-transitory computer-accessible memory medium of claim 32, wherein the sandbox is implemented by a plugin, wherein the GDFP editor being executable in the sandbox comprises the GDFP editor being executable in the plugin.

34. The non-transitory computer-accessible memory medium of claim 29, wherein the GDFP editor is comprised in a graphical program development environment (GPDE), and wherein to send the GDFP editor to the client computer over the network, the program instructions are executable to:
send the GPDE to the client computer over the network, wherein the GPDE further comprises a GDFP compiler and a GDFP execution engine;
wherein the GDFP compiler is executable in the web browser of the client computer to:
compile the edited GDFP in the web browser, thereby generating an executable of the edited GDFP; and
wherein the GDFP execution engine is executable in the web browser of the client computer to:
execute the executable of the edited GDFP in the web browser.

35. The non-transitory computer-accessible memory medium of claim 29, wherein the GDFP editor is comprised in a graphical program development environment (GPDE), and wherein to send the GDFP editor to the client computer over the network, the program instructions are executable to:
send the GPDE to the client computer over the network, wherein the GPDE further comprises a GDFP execution engine, and wherein the GDFP execution engine comprises an interpreter; and
wherein the GDFP execution engine is executable in the web browser to:
execute the edited GDFP in the web browser by interpreting the edited GDFP.

36. The non-transitory computer-accessible memory medium of claim 29, wherein the program instructions are further executable to:
receive the edited GDFP from the client computer over the network for storage, compilation, analysis, or download by other users.

37. The non-transitory computer-accessible memory medium of claim 29, wherein to send the GDFP editor to the client computer over the network, the program instructions are further executable to:
send a GDFP execution engine to the client computer over the network;
wherein the program instructions are further executable to:
receive the edited GDFP from the client computer for compilation;
compile the edited GDFP, thereby generating an executable for the edited GDFP; and
send the executable for the GDFP to the client computer;
wherein the executable is executable in the web browser of the client computer via the GDFP execution engine.

38. The non-transitory computer-accessible memory medium of claim 29, wherein to send the GDFP editor to the client computer over the network, the program instructions are further executable to:
send a GDFP execution engine to the client computer over the network wherein the GDFP execution engine comprises an interpreter;
wherein the GDFP execution engine is executable to:
execute the edited GDFP in the web browser by interpreting the edited GDFP in the web browser.

39. The non-transitory computer-accessible memory medium of claim 29, wherein the program instructions are further executable to:
receive the edited GDFP from the client computer; and
deploy the edited GDFP to one or more target devices.

40. The non-transitory computer-accessible memory medium of claim 29,
wherein the representation of the GDFP is implemented in a browser supported format; and
wherein the representation of the GDFP is indexable for searching by search engines.

41. The non-transitory computer-accessible memory medium of claim 40, wherein the browser supported format comprises one or more of:
HyperText Markup Language (HTML);
an image format; or
Portable Document Format (PDF).

42. The non-transitory computer-accessible memory medium of claim 29, wherein the representation of the GDFP comprises one or more of:
comments in the GDFP;
an indication of components referenced by the GDFP with links to the referenced components; or
notes regarding the GDFP.

43. A computer-implemented method, comprising utilizing a computer to perform:
establishing a network connection with a client computer over a network;
receiving a universal resource identifier (URI) from the client computer over the network, wherein the URI indicates a graphical data flow program (GDFP) or a graphical data flow program editor (GDFP editor) for creating or editing the GDFP;
sending the GDFP editor to the client computer over the network in response to the URI, wherein the GDFP editor is executable in a web browser on the client computer to:
display the GDFP in the web browser on the client computer, wherein the GDFP comprises a plurality of interconnected nodes or icons which visually indicate the functionality of the program;
receive user input indicating one or more edit operations to be performed on the GDFP;
edit the GDFP in the web browser on the client computer in accordance with the one or more edit operations, thereby generating an edited GDFP; and
display the edited GDFP in the web browser;
receiving the edited GDFP from the client computer; and
generating and storing an associated representation of the edited GDFP, wherein the representation of the edited GDFP does not include the edited GDFP;
wherein the representation of the GDFP is downloadable to client systems for display in browsers on the client systems, including browsers that do not support execution of the edited GDFP.

44. The computer-implemented method of claim 43, wherein the GDFP is a pre-existing GDFP, wherein the GDFP editor is associated with the pre-existing GDFP, and wherein the URI specifies the pre-existing GDFP, thereby also indicating the associated GDFP editor, the method further comprising:
sending the GDFP to the client computer in response to the URI.

45. The computer-implemented method of claim 43,
wherein the GDFP is not a pre-existing GDFP, wherein the URI specifies the GDFP editor; and
wherein the GDFP editor is executable in the web browser to:
receive user input specifying creation of the GDFP; and
create the GDFP in response to the user input.

46. The computer-implemented method of claim 43, wherein the GDFP editor is configured to execute in a sandbox, wherein the sandbox comprises a secure execution environment for the GDFP editor, and wherein the GDFP editor being executable in the web browser comprises the GDFP editor being executable in the sandbox.

47. The computer-implemented method of claim 46, wherein the sandbox is implemented by a plugin, wherein the GDFP editor being executable in the sandbox comprises the GDFP editor being executable in the plugin.

48. The computer-implemented method of claim 43, wherein the GDFP editor is comprised in a graphical program development environment (GPDE), and wherein said sending the GDFP editor to the client computer over the network comprises:

sending the GPDE to the client computer over the network, wherein the GPDE further comprises a GDFP compiler and a GDFP execution engine;

wherein the GDFP compiler is executable in the web browser of the client computer to:

compile the edited GDFP in the web browser, thereby generating an executable of the edited GDFP; and wherein the GDFP execution engine is executable in the web browser of the client computer to:

execute the executable of the edited GDFP in the web browser.

49. The computer-implemented method of claim 43, wherein the GDFP editor is comprised in a graphical program development environment (GPDE), and wherein said sending the GDFP editor to the client computer over the network comprises:

sending the GPDE to the client computer over the network, wherein the GPDE further comprises a GDFP execution engine, and wherein the GDFP execution engine comprises an interpreter; and wherein the GDFP execution engine is executable in the web browser to:

execute the edited GDFP in the web browser by interpreting the edited GDFP.

50. The computer-implemented method of claim 43, the method further comprising:

receiving the edited GDFP from the client computer over the network for storage, compilation, analysis, or download by other users.

51. The computer-implemented method of claim 43, wherein said sending the GDFP editor to the client computer over the network comprises sending a GDFP execution engine to the client computer over the network, the method further comprising:

receiving the edited GDFP from the client computer for compilation;

compiling the edited GDFP, thereby generating an executable for the edited GDFP; and sending the executable for the GDFP to the client computer;

wherein the executable is executable in the web browser of the client computer via the GDFP execution engine.

52. The computer-implemented method of claim 43, wherein said sending the GDFP editor to the client computer over the network further comprises:

sending a GDFP execution engine to the client computer over the network wherein the GDFP execution engine comprises an interpreter;

wherein the GDFP execution engine is executable to:

execute the edited GDFP in the web browser by interpreting the edited GDFP in the web browser.

53. The computer-implemented method of claim 43, wherein the representation of the GDFP is implemented in a browser supported format; and wherein the representation of the GDFP is indexable for searching by search engines.

54. The computer-implemented method of claim 53, wherein the browser supported format comprises one or more of:

HyperText Markup Language (HTML);

an image format; or

Portable Document Format (PDF).

55. The computer-implemented method of claim 43, wherein the representation of the GDFP comprises one or more of:

comments in the GDFP;

an indication of components referenced by the GDFP with links to the referenced components; or notes regarding the GDFP.

\* \* \* \* \*